United States Patent
Onishi et al.

(10) Patent No.: US 7,848,871 B2
(45) Date of Patent: Dec. 7, 2010

(54) GAS-MIXTURE-STATE ESTIMATION APPARATUS FOR INTERNAL COMBUSTION ENGINE AND EMISSION-GENERATION-AMOUNT ESTIMATION APPARATUS

(75) Inventors: Tomomi Onishi, Susoso (JP); Shigeki Nakayama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 523 days.

(21) Appl. No.: 11/886,595

(22) PCT Filed: Mar. 24, 2006

(86) PCT No.: PCT/JP2006/306769

§ 371 (c)(1),
(2), (4) Date: Sep. 18, 2007

(87) PCT Pub. No.: WO2006/106893

PCT Pub. Date: Oct. 12, 2006

(65) Prior Publication Data

US 2009/0055076 A1      Feb. 26, 2009

(30) Foreign Application Priority Data

Mar. 30, 2005   (JP) ............................. 2005-098148

(51) Int. Cl.
*B60T 7/12*   (2006.01)
*F02B 23/00*  (2006.01)

(52) U.S. Cl. ...................................... 701/104; 123/585

(58) Field of Classification Search ................. 701/103, 701/104, 105, 108, 109, 114; 123/434, 672, 123/673

See application file for complete search history.

(56) References Cited

U.S. PATENT DOCUMENTS 5,765,372 A * 6/1998 Mitobe et al. .................. 60/301

(Continued)

FOREIGN PATENT DOCUMENTS

EP   1 321 650 A2   6/2003

(Continued)

OTHER PUBLICATIONS

Hiroyuki Hiroyasu, et al.: *Combustion Model of Direct-Injection-Type Diesel Engine and Performance Prediction*, The Transactions of the Japanese Society of Mechanical Engineers (Book B), vol. 48, No. 432, Aug. 1982.

(Continued)

*Primary Examiner*—John T Kwon
(74) *Attorney, Agent, or Firm*—Kenyon & Kenyon LLP

(57) ABSTRACT

This apparatus equally divides an injection period TAU into three periods; i.e., front, intermediate, and rear periods, and assumes that first injection (mass Q(1)) corresponding to the "front period" is executed at one time at a fuel injection start timing, second injection (mass Q(2)) corresponding to the "intermediate period" is executed at one time when ⅓ TAU has elapsed after the first injection, and third injection (mass Q(3)) corresponding to the "rear period" is executed at one time when ⅓ TAU has elapsed after the second injection. A first gas mixture based on the first injection, a second gas mixture based on the second injection, and a third gas mixture based on the third injection are individually handled, and the excess air ratio of gas mixture, the state (temperature, etc.) of gas mixture, and the emission generation amounts in gas mixture are estimated for each gas mixture.

13 Claims, 32 Drawing Sheets

U.S. PATENT DOCUMENTS

| | | | |
|---|---|---|---|
| 6,148,611 A * | 11/2000 | Sato | 60/274 |
| 6,269,632 B1 * | 8/2001 | Schmitz | 60/274 |
| 6,360,531 B1 * | 3/2002 | Wiemero et al. | 60/284 |
| 6,463,734 B1 * | 10/2002 | Tamura et al. | 60/277 |
| 6,644,020 B2 * | 11/2003 | Kuenstler et al. | 60/286 |
| 6,755,176 B2 * | 6/2004 | Takeuchi et al. | 123/299 |
| 7,337,766 B2 * | 3/2008 | Nakayama et al. | 123/435 |
| 7,401,602 B2 * | 7/2008 | Nakayama et al. | 123/585 |
| 2001/0015194 A1 * | 8/2001 | Shiraishi et al. | 123/301 |
| 2003/0111041 A1 | 6/2003 | Kimura | |
| 2005/0087169 A1 * | 4/2005 | Yoshida et al. | 123/299 |
| 2005/0092286 A1 | 5/2005 | Sasaki et al. | |
| 2007/0044781 A1 * | 3/2007 | Nakayama et al. | 123/704 |
| 2007/0169748 A1 * | 7/2007 | Nakayama et al. | 123/435 |

FOREIGN PATENT DOCUMENTS

| | | |
|---|---|---|
| FR | 2 861 808 A | 5/2005 |
| JP | 06-108903 | 4/1994 |
| JP | 07-034894 | 2/1995 |
| JP | 07-166922 | 6/1995 |
| JP | 2001-254645 | 9/2001 |
| JP | 2002-054491 | 2/2002 |
| JP | 2002-371893 | 12/2002 |
| JP | 2003-184609 A | 7/2003 |
| JP | 2005-155603 A | 6/2005 |
| JP | 2007-085233 | 4/2007 |

OTHER PUBLICATIONS

Wakuri, Yutaro et al., "Studies on the Penetration of Fuel Spray of Diesel Engine," The Transactions of the Japanese Society of Mechanical Engineers, p. 820, 25-156 (1959).

* cited by examiner

POST INJECTION TIME t = 0

POST INJECTION TIME t = t

FIG.28
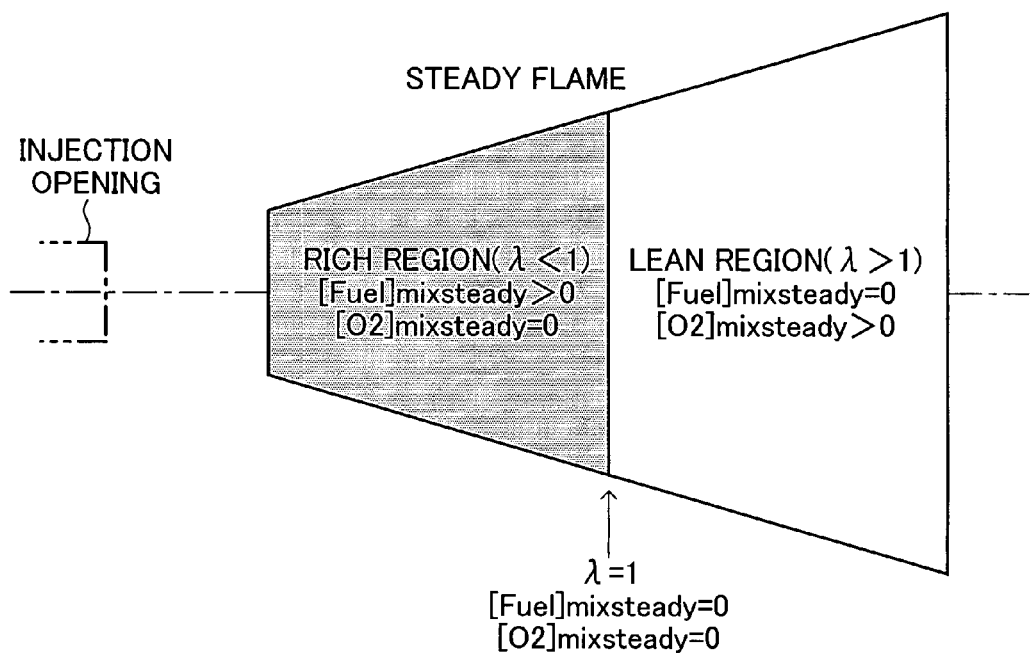
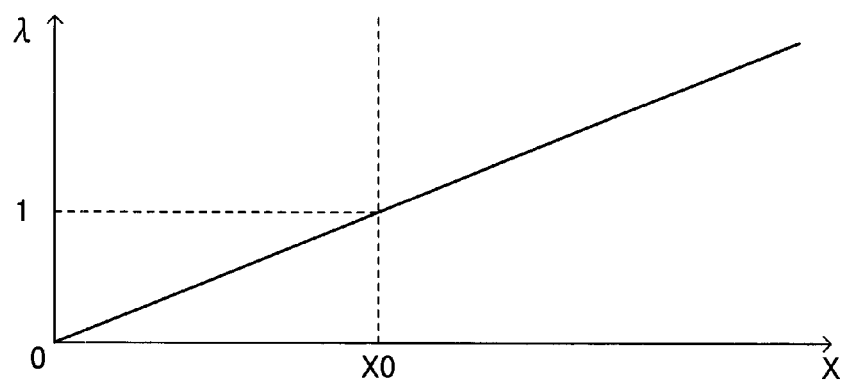

FIG.40 CALCULATION OF GAS MIXTURE TEMPERATURE AND VARIOUS CONCENTRATIONS IN STEADY FLAME

US 7,848,871 B2

GAS-MIXTURE-STATE ESTIMATION APPARATUS FOR INTERNAL COMBUSTION ENGINE AND EMISSION-GENERATION-AMOUNT ESTIMATION APPARATUS

This is a 371 national phase application of PCT/JP2006/306769 filed 24 Mar. 2006, claiming priority to Japanese Patent Application No. 2005-098148 filed 30 Mar. 2005, the contents of which are incorporated herein by reference.

TECHNICAL FIELD

The present invention relates to a gas-mixture-state estimation apparatus for an internal combustion engine, which apparatus estimates the state (temperature, etc.) of gas mixture produced through mixing of fuel injected into a combustion chamber of the internal combustion engine and cylinder interior gas (gas taken into the combustion chamber), and to an emission-generation-amount estimation apparatus which estimates generation amounts of emissions, which are harmful substances generated as a result of combustion of the gas mixture.

BACKGROUND ART

The amounts of emissions, such as soot and $NO_x$, generated in a combustion chamber of an internal combustion engine (in particular, a diesel engine) have a strong correlation with the state (in particular, temperature, fuel concentration, etc.) of gas mixture advancing within the combustion chamber (in particular, the state of the gas mixture after ignition). Therefore, in order to accurately control the generation amounts of emissions and reduce the generation amounts (discharge amounts) of the emissions, the state of the gas mixture must be accurately estimated.

There have been known various techniques for estimating the state of gas mixture. A fuel injection apparatus for a diesel engine disclosed in Japanese Patent Application Laid-Open (kokai) No. 2001-254645 estimates the temperature of gas mixture on the basis of various operation conditions, such as temperature of engine cooling water, temperature of intake air, and pressure of intake air, which affect the temperature of the gas mixture.

Incidentally, the state (temperature, etc.) of gas mixture advancing within the combustion chamber is successively determined depending on the temperature, etc. of cylinder interior gas, which change momentarily upon movement of the piston. Further, the state of gas mixture also depends on the degree of mixing of cylinder interior gas with fuel (accordingly, depends on, for example, excess air ratio, fuel concentration, etc. of the gas mixture). The excess air ratio of gas mixture is a value determined depending on the injection pressure of fuel contained in the gas mixture at the time of injection, and the density of cylinder interior gas at the time of injection. That is, the state of gas mixture is successively determined depending on the injection pressure of fuel contained in the gas mixture at the time of injection, and the density of the cylinder interior gas at the time of injection as well.

Meanwhile, the temperature, etc. of cylinder interior gas, which correspond to a time elapsed after fuel injection, change depending on a time point at which the fuel is injected. Further, the fuel injection pressure at the time of fuel injection, and the cylinder interior gas density at the time of fuel injection also change depending on the time point at which the fuel is injected. Accordingly, the state of gas mixture advancing within the combustion chamber changes depending on the time point at which the fuel contained in the gas mixture is injected.

In addition, when a certain quantity of fuel is injected into a combustion chamber, the fuel is continuously injected over an injection period set in accordance with the injection quantity. Accordingly, when a gas mixture advancing within the combustion chamber is microscopically observed, fuel contained in a portion near the front of the gas mixture has been injected earlier than fuel contained in the remaining portion. In other words, the injection time point of fuel contained in a certain portion changes depending on the position of the certain portion within a region occupied by the gas mixture (specifically, a distance from the front position of the gas mixture as measured along a direction toward an injection opening).

As can be understood from the above, when a gas mixture advancing within the combustion chamber is microscopically observed, the state (temperature, etc.) of the gas mixture (which corresponds to a time elapsed after fuel injection) changes depending on the position within the region occupied by the gas mixture. Accordingly, the degree of generation of emissions which are generated as a result of combustion of the gas mixture changes depending on the position within the region occupied by the gas mixture. In other words, since the state of the gas mixture advancing within the combustion chamber is not uniform, the degree of generation of emissions becomes non-uniform, so that the total generation amount of emissions generated within the combustion chamber is greatly influenced by such non-uniformity.

However, the gas mixture temperature (i.e., the state of gas mixture) estimated by the conventional apparatus is a value calculated under the assumption that fuel is injected at one time (instantaneously at a point in time at which injection is started), without consideration of the above-described injection period. That is, the gas mixture temperature is a value calculated without consideration of the above-described non-uniformity of gas mixture. Accordingly, if the total generation amount of emissions is estimated on the basis of the gas mixture temperature estimated by the conventional apparatus, the estimated total emission generation amount contains an error, raising a problem in that the generation amounts (discharge amounts) of emissions cannot be accurately controlled.

DISCLOSURE OF THE INVENTION

The present invention has been accomplished in order to cope with such a problem, and an object of the present invention is to provide a gas-mixture-state estimation apparatus for an internal combustion engine which can accurately estimate the state of gas mixture in consideration of non-uniformity of the gas mixture advancing within a combustion chamber, as well as an emission-generation-amount estimation apparatus which can accurately estimate the total amount of emissions generated within the combustion chamber in consideration of non-uniformity of the degree of generation of emissions attributable to the non-uniformity of the gas mixture.

A gas-mixture-state estimation apparatus of the present invention is characterized by comprising injection fuel dividing means for diving, into a plurality of portions, fuel continuously injected into a combustion chamber of an internal combustion engine over a predetermined injection period from a predetermined injection start time; and gas-mixture-state estimation means for individually estimating the state of each of gas mixtures formed from mixing of the plurality of portions of the injection fuel with a cylinder interior gas, which is a gas taken into the combustion chamber, under the assumption that the plurality of portions of the divided injection fuel are individually and successively injected in accordance with elapse of time from the predetermined injection start time. Here, examples of the state of the gas mixture include the temperature of the gas mixture, the fuel concentration within the gas mixture, the oxygen concentration within the gas mixture, and the nitrogen concentration within the gas mixture.

As described above, the state of the gas mixture is determined on the basis of the degree of mixing of the cylinder interior gas with fuel (e.g., the excess air ratio, fuel concentration, etc. of the gas mixture). Therefore, the gas-mixture-state estimation means is preferably configured to individually obtain a value representing a degree of mixing of the cylinder interior gas with each portion of the divided injection fuel, and individually estimate the state of a gas mixture formed based on each portion of the injection fuel by using the obtained value representing the degree of mixing of the cylinder interior gas with said each portion of the injection fuel. Here, examples of the value representing the degree of mixing of the cylinder interior gas include the excess air ratio of the gas mixture and the fuel concentration within the gas mixture.

By virtue of the above-described configuration, under the assumption that portions of the divided injection fuel are injected individually and successively injected in accordance with elapse of time from the predetermined injection start time, the state of each gas mixture formed based on each portion of the injection fuel is individually estimated, while fuel of the corresponding portion is considered as being injected at the injection time of the corresponding portion. Accordingly, the state of each gas mixture can be estimated individually and accurately in consideration of non-uniformity among gas mixtures formed based on the respective portions of the injection fuel.

In this case, preferably, the injection fuel dividing means is configured to divide the predetermined injection period into a plurality of periods in accordance with a predetermined rule, and divide the injection fuel into portions which are successively injected in the corresponding periods.

The plurality of (division number) periods of the divided injection period may be set to a length equal to that of periods obtained by dividing the injection period by the division number. In this case, the plurality of periods become uniform. In this case, the fuel amounts of portions of the injection flue corresponding to the respective periods may become non-uniform, for example, because the injection pressure cannot be maintained constant over the injection period. Further, the plurality of periods may be set so that the fuel amounts of portions of the injection flue corresponding to the respective periods become equal to one another. In this case, the plurality of periods may become non-uniform.

Further, the division number may be changed in accordance with the injection period. That is, the division number may be set such that the longer the injection period (the greater the total fuel injection quantity), the greater the division number. According to the above-described configuration, the plurality of portions of the injection fuel can be readily obtained through a simple operation of dividing the injection period into a plurality of periods with respect to time in accordance with a simple rule.

The gas-mixture-state estimation apparatus of the present invention may further comprise ignition timing obtaining means for obtaining a value representing an ignition timing of the gas mixture, wherein the injection fuel dividing means divides the injection fuel into a portion injected before ignition of the gas mixture and a portion injected after the ignition of the gas mixture on the basis of the obtained value representing the ignition timing. Examples of the value representing the ignition timing includes the ignition timing of the gas mixture itself and a time between the fuel injection start time and ignition of the gas mixture (hereinafter referred to as "ignition delay time").

In general, it is known that pre-mixture-like combustion mainly occurs in a gas mixture formed based on fuel injected before ignition, and diffusion-like combustion occurs in a gas mixture formed based on fuel injected after ignition. The pre-mixture-like combustion and the diffusion-like combustion differ in reaction speed (accordingly, the amount of heat generation stemming from combustion) (the details will be described later).

In other words, the gas mixture formed based on fuel injected before ignition and the gas mixture formed based on fuel injected after ignition differ in temperature increase with time elapsed after the fuel injection.

The above-described configuration is based on such a viewpoint. That is, according to the above-described configuration, since the injection fuel is divided into a portion injected before ignition of the gas mixture and a portion injected after the ignition of the gas mixture, the state (temperature, etc.) of the gas mixture formed based on fuel injected before ignition and the state (temperature, etc.) of the gas mixture formed based on fuel injected after ignition can be individually estimated.

Accordingly, the optimal reaction speed (accordingly, heat generation amount) can be set in the estimation of the state of each gas mixture. As a result, the state (in particular, temperature) of each gas mixture can be estimated more accurately.

The gas-mixture-state estimation apparatus of the present invention may further comprise mixing index value obtaining means for obtaining a first-portion mixing index value, which is a value (e.g., the above-described excess air ratio) representing a degree of mixing of the cylinder interior gas with a first injected portion of the divided injection fuel, so that the value corresponds to advancement of the first injected portion within the combustion chamber. The gas-mixture-state estimation means estimates the state of a gas mixture formed based on the first injected portion by making use of the obtained first-portion mixing index value. Under the assumption that a value representing a degree of mixing of the cylinder interior gas with a second or later injected portion of the divided injection fuel and corresponding to advancement of the second or later injected portion within the combustion chamber is determined on the basis of the obtained first-portion mixing index value corresponding to the advancement, the gas-mixture-state estimation means estimates the state of a gas mixture formed based on the second or later injected portion by making use of the determined value representing a degree of mixing of the cylinder interior gas with the second or later injected portion.

In this case, more preferably, the "value representing a degree of mixing of the cylinder interior gas with a second or later injected portion of the divided injection fuel and corresponding to advancement (e.g., time elapsed after injection, the position in relation to the injection opening, or the like) of the second or later injected portion within the combustion chamber" is determined to a value equal to the obtained first-portion mixing index value corresponding to the advancement.

In general, a value (e.g., excess air ratio or the like) representing a degree of mixing of the cylinder interior gas with fuel is calculated by use of a very complicated empirical formula or the like, which includes power calculation or the like involving a large calculation load. Accordingly, such calculation entails a huge calculation load, and therefore, reducing the number of times of such calculation is desired.

The above-described configuration is based on such a viewpoint. That is, according to the above-described configuration, since the "value representing a degree of mixing of the cylinder interior gas with the second or later injected portion" is determined on the basis of the above-described first-portion mixing index value, it becomes unnecessary to calculate the "value representing a degree of mixing of the cylinder interior gas with the second or later injected portion" by use of a very complicated empirical formula or the like. As a result, the state of each gas mixture formed based on each portion of the injection fuel can be estimated simply and individually in consideration of non-uniformity among gas mixtures formed based on the respective portions of the injection fuel, and the calculation load can be reduced.

An emission-generation-amount estimation apparatus of the present invention comprises emission-generation-amount estimation means for individually estimating generation amounts of emissions, which are harmful substances, generated as a result of combustion of each gas mixture, on the basis of the state of the corresponding gas mixture estimated by any one of the above-described gas-mixture-state estimation apparatuses of the present invention. Preferably, the emissions include at least soot and NOx, reduction of which is strongly desired in recent years.

According to the above-described configuration, the generation amounts of emissions (soot, NOx, etc.) generated as a result of combustion of each gas mixture are individually estimated on the basis of the corresponding state among the individually estimated states of the plurality of gas mixtures. Accordingly, the total generation amount of emissions can be accurately estimated in consideration of the above-described non-uniformity of the degree of generation of emissions.

Another emission-generation-amount estimation apparatus of the present invention comprises emission-generation-amount estimation means for estimating generation amounts of emissions under the assumption that a steady flame is generated in a combustion chamber of an internal combustion engine after ignition of a gas mixture formed through mixing of fuel injected into the combustion chamber with a cylinder interior gas, which is a gas taken into the combustion chamber, wherein the emission-generation-amount estimation means individually estimates amounts of emissions, which are harmful substances, generated as a result of combustion in a region of the steady flame in which the fuel is excessive, and amounts of emissions generated as a result of combustion in a region of the steady flame in which oxygen is excessive.

When the fuel injection period is relatively long, a so-called steady flame (or flame very similar to steady flame) is generated after a gas mixture is ignited in some cases. In such a case, as described below, a region occupied by the steady flame can be divided into a region in which fuel is excessive (accordingly, a region in which the steady-state oxygen concentration becomes zero) and a region in which oxygen is excessive (accordingly, a region in which the steady-state fuel concentration becomes zero).

Meanwhile, as will be described later, a representative known empirical formula used for calculation of the generation amount of soot (more specifically, the generation speed of soot) includes two terms; i.e., a term for obtaining a formation speed (accordingly, an increasing speed) of soot, which term includes the value of fuel concentration, and a term for obtaining an oxidation speed (accordingly, a decreasing speed) of soot, which term includes the value of oxygen concentration.

Accordingly, in the case where a region occupied by the steady flame is divided into a region in which the steady-state oxygen concentration becomes zero and a region in which the steady-state fuel concentration becomes zero as in the above-described configuration, when the generation amount of soot in each region is calculated by the above-mentioned representative empirical formula, the value of either of the two terms is always maintained at zero in the corresponding region. Accordingly, when the generation amount of soot in each region is calculated, calculation of either of the two terms can be omitted, whereby the calculation load associated with calculation of the soot generation amount can be reduced.

In this case, preferably, the emission-generation-amount estimation means is configured to individually calculate generation speeds of the emissions for each gas mixture or each region of the steady flame, and integrate the calculated emission generation speeds with respect to time to thereby individually estimate the generation amounts of the emissions.

In general, in calculation of generation amounts of emissions, a known empirical formula or the like (e.g., the above-described empirical formula or the like for obtaining the generation speed of soot) is used. Accordingly, the above-described configuration enables the generation amounts of emissions to be calculated by use of a known empirical formula or the like, which is highly reliable.

In this case, preferably, the emission-generation-amount estimation means is configured such that when the temperature of the gas mixture or the temperature within the regions of the steady flame becomes less than a predetermined temperature, the corresponding integration of the emission generation speeds with respect to time is ended.

In general, emissions are hardly generated when the temperature of the gas mixture is less than a reaction limit temperature. Accordingly, after a time point at which the temperature of the gas mixture becomes less than the corresponding reaction limit temperature, the total emission generation amount obtained through the above-described time integration processing becomes generally the same value, irrespective of whether the integration processing is continued. Accordingly, in the case where the emission-generation-amount estimation means is configured such that when the temperature of the gas mixture (or the temperature within the regions of steady flame) becomes less than a predetermined temperature (e.g., less than the reaction limit temperature), the integration of the emission generation speed with respect to time is ended, the calculation load necessary for calculation of the generation amounts of emissions can be reduced.

BRIEF DESCRIPTION OF THE DRAWINGS

FIG. 28 is an illustration showing the relation between rich and lean regions and gas mixture travel distance in a case where a steady flame is generated in a combustion chamber.

BEST MODE FOR CARRYING OUT THE INVENTION

With reference to the drawings, there will now be described embodiments of an emission-generation-amount estimation apparatus which includes a gas-mixture-state estimation apparatus for an internal combustion engine (diesel engine) according to the present invention.

First Embodiment

Figure 1:
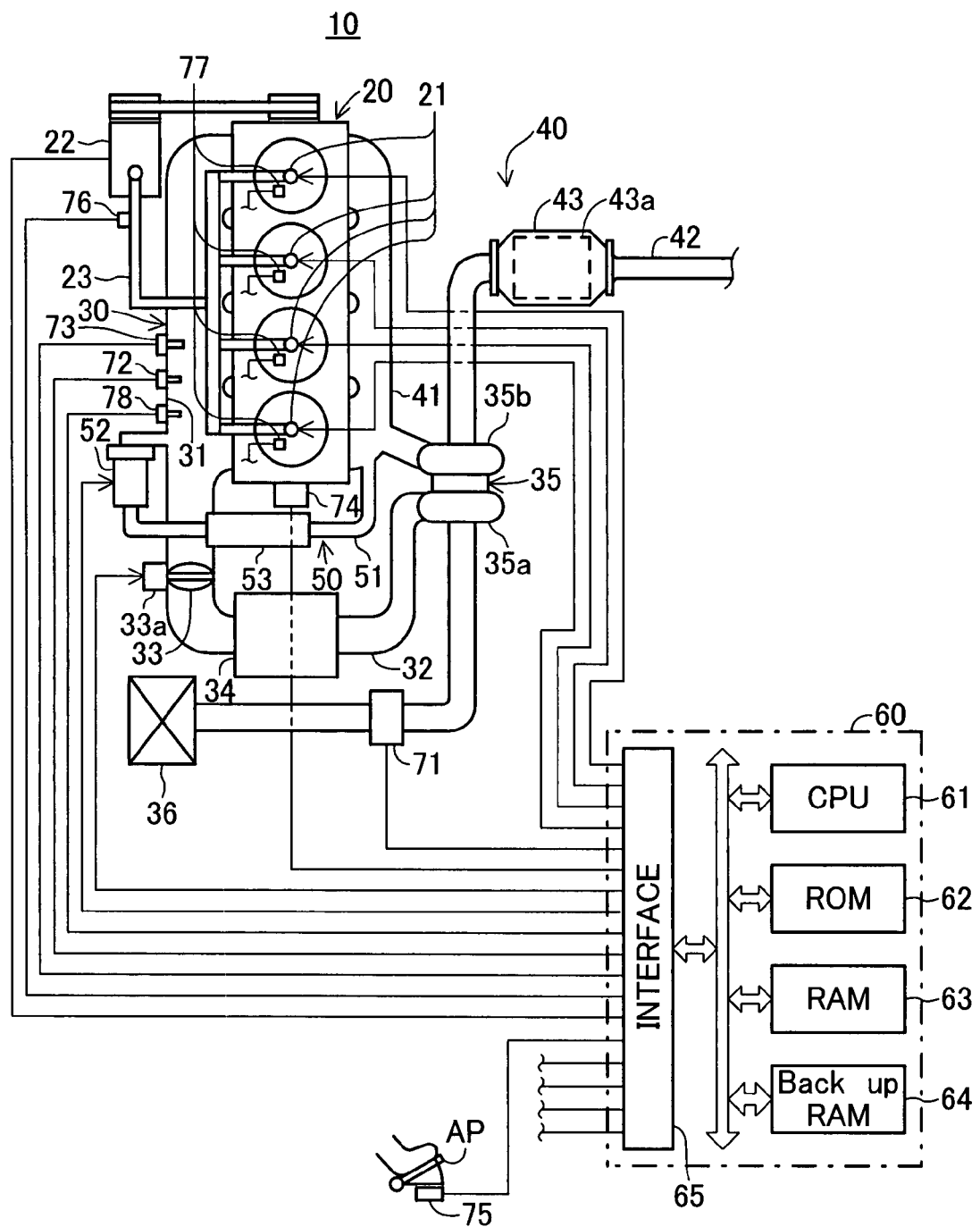
FIG. 1 is a schematic diagram showing the entire configuration of a system in which an emission-generation-amount estimation apparatus including a gas-mixture-state estimation apparatus for a combustion engine according to a first embodiment of the present invention is applied to a four-cylinder internal combustion engine (diesel engine).

FIG. 1 schematically shows the entire configuration of a system in which an emission-generation-amount estimation apparatus for an internal combustion engine according to a first embodiment of the present invention is applied to a four-cylinder internal combustion engine (diesel engine) 10. This system comprises an engine main body 20 including a fuel supply system; an intake system 30 for introducing gas to combustion chambers (cylinder interiors) of individual cylinders of the engine main body 20; an exhaust system 40 for discharging exhaust gas from the engine main body 20; an EGR apparatus 50 for performing exhaust circulation; and an electronic control apparatus 60.

Fuel injection valves (injection valves, injectors) 21 are disposed above the individual cylinders of the engine main body 20. The fuel injection valves 21 are connected via a fuel line 23 to a fuel injection pump 22 connected to an unillustrated fuel tank. The fuel injection pump 22 is electrically connected to the electronic control apparatus 60. In accordance with a drive signal from the electronic control apparatus 60 (an instruction signal corresponding to an instruction final fuel injection pressure Pcrfin to be described later), the fuel injection pump 22 pressurizes fuel in such a manner that the actual injection pressure (discharge pressure) of fuel becomes equal to the instruction final fuel injection pressure Pcrfin.

Thus, fuel pressurized to the instruction final fuel injection pressure Pcrfin is supplied from the fuel injection pump 22 to the fuel injection valves 21. Moreover, the fuel injection valves 21 are electrically connected to the electronic control apparatus 60. In accordance with a drive signal (an instruction signal corresponding to an instruction fuel injection quantity (mass) Qfin) from the electronic control apparatus 60, each of the fuel injection valves 21 opens for an injection period TAU so as to inject, directly to the combustion chamber of the corresponding cylinder, the fuel pressurized to the instruction final fuel injection pressure Pcrfin, in the instruction fuel injection quantity Qfin.

The intake system 30 includes an intake manifold 31, which is connected to the respective combustion chambers of the individual cylinders of the engine main body 20; an intake pipe 32, which is connected to an upstream-side branching portion of the intake manifold 31 and constitutes an intake passage in cooperation with the intake manifold 31; a throttle valve 33, which is rotatably held within the intake pipe 32; a throttle valve actuator 33a for rotating the throttle valve 33 in accordance with a drive signal from the electronic control apparatus 60; an intercooler 34, which is interposed in the intake pipe 32 to be located on the upstream side of the throttle valve 33; a compressor 35a of a turbocharger 35, which is interposed in the intake pipe 32 to be located on the upstream side of the intercooler 34; and an air cleaner 36, which is disposed at a distal end portion of the intake pipe 32.

The exhaust system 40 includes an exhaust manifold 41, which is connected to the individual cylinders of the engine main body 20; an exhaust pipe 42, which is connected to a downstream-side merging portion of the exhaust manifold 41; a turbine 35b of the turbocharger 35 interposed in the exhaust pipe 42; and a diesel particulate filter (hereinafter referred to as "DPNR") 43, which is interposed in the exhaust pipe 42. The exhaust manifold 41 and the exhaust pipe 42 constitute an exhaust passage.

The EGR apparatus 50 includes an exhaust circulation pipe 51, which forms a passage (EGR passage) for circulation of exhaust gas; an EGR control valve 52, which is interposed in the exhaust circulation pipe 51; and an EGR cooler 53. The exhaust circulation pipe 51 establishes communication between an exhaust passage (the exhaust manifold 41) located on the upstream side of the turbine 35b, and an intake passage (the intake manifold 31) located on the downstream side of the throttle valve 33. The EGR control valve 52 responds to a drive signal from the electronic control apparatus 60 so as to change the quantity of exhaust gas to be circulated (exhaust-gas circulation quantity, EGR-gas flow rate).

The electronic control apparatus 60 is a microcomputer which includes a CPU 61, ROM 62, RAM 63, backup RAM 64, an interface 65, etc., which are connected to one another by means of a bus. The ROM 62 stores a program to be executed by the CPU 61, tables (lookup tables, maps), constants, etc. The RAM 63 allows the CPU 61 to temporarily store data. The backup RAM 64 stores data in a state in which the power supply is on, and holds the stored data even after the power supply is shut off. The interface 65 contains A/D converters.

The interface 65 is connected to a hot-wire-type air flow meter 71 disposed in the intake pipe 32; an intake air temperature sensor 72, which is provided in the intake passage to be located downstream of the throttle valve 33 and downstream of a point where the exhaust circulation pipe 51 is connected to the intake passage; an intake pipe pressure sensor 73, which is provided in the intake passage to be located downstream of the throttle valve 33 and downstream of a point where the exhaust circulation pipe 51 is connected to the intake passage; a crank position sensor 74; an accelerator opening sensor 75; a fuel temperature sensor 76 provided in the fuel pipe 23 in the vicinity of the discharge port of the fuel injection pump 22; a cylinder interior pressure sensor 77 provided for each cylinder and serving as injection-timing obtaining means; and an intake air oxygen concentration sensor 78, which is provided in the intake passage to be located downstream of the throttle valve 33 and downstream of a point where the exhaust circulation pipe 51 is connected to the intake passage. The interface 65 receives respective signals from these sensors, and supplies the received signals to the CPU 61. Further, the interface 65 is connected to the fuel injection valves 21, the fuel injection pump 22, the throttle valve actuator 33a, and the EGR control valve 52; and outputs corresponding drive signals to these components in accordance with instructions from the CPU 61.

The hot-wire-type air flow meter 71 measures the mass flow rate of intake air passing through the intake passage (intake air quantity per unit time, new air quantity per unit time), and generates a signal indicating the mass flow rate Ga (air flow rate Ga). The intake air temperature sensor 72 measures the temperature of gas that is taken into each cylinder (i.e., each combustion chamber or cylinder interior) of the engine 10 (i.e., intake air temperature), and generates a signal representing the intake air temperature Tb. The intake pipe pressure sensor 73 measures the pressure of gas that is taken into each cylinder of the engine 10 (i.e., intake pipe pressure), and generates a signal representing the intake pipe pressure Pb.

The crank position sensor 74 detects the absolute crank angle of each cylinder, and generates a signal representing actual crank angle CAact and engine speed NE; i.e., rotational speed of the engine 10. The accelerator opening sensor 75 detects an amount by which an accelerator pedal AP is operated, and generates a signal representing the accelerator pedal operated amount Accp. The fuel temperature sensor 76 detects temperature of fuel flowing through the fuel line 23, and generates a signal representing fuel temperature Tcr. The cylinder interior pressure sensor 77 detects pressure of gas within the corresponding combustion chamber (accordingly, pressure of the above-described cylinder interior gas), and generates a signal representing cylinder interior gas pressure Pa. This cylinder interior pressure sensor 77 is used only for detection of ignition timing as will be described later. The intake air oxygen concentration sensor 78 detects the concentration of oxygen contained in intake air, and generates a signal representing intake air oxygen concentration RO2in.

(Outline of Method for Estimating Gas Mixture State)

Next, there will be described a method for estimating gas mixture state performed by the emission-generation-amount estimation apparatus (hereinafter referred to as the "present apparatus"), which includes the gas-mixture-state estimation apparatus having the above-described configuration.

Figure 2:
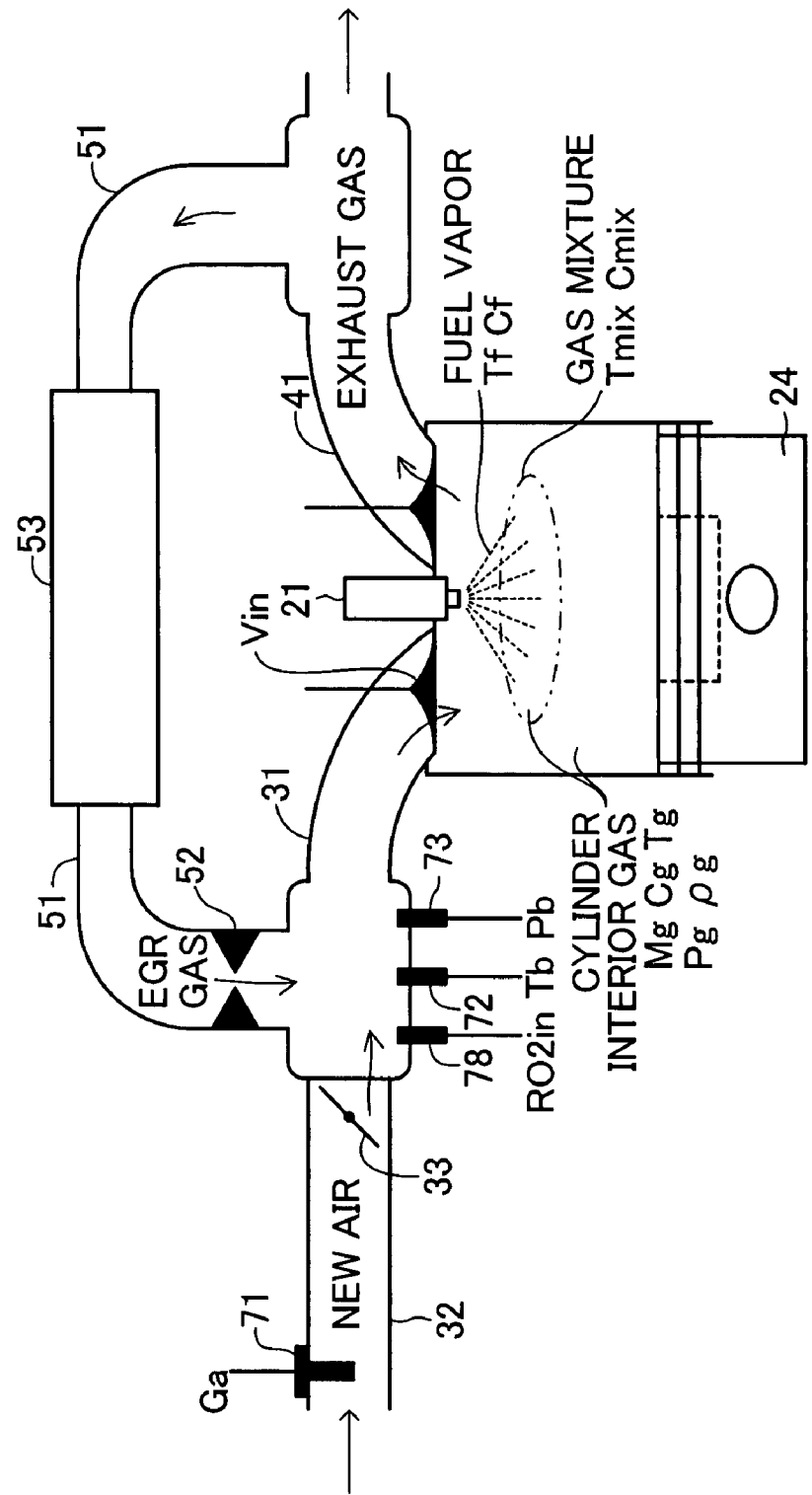
FIG. 2 is a diagram schematically showing a state in which gas is taken from an intake manifold to a certain cylinder (cylinder interior) and is then discharged to an exhaust manifold.

FIG. 2 is a diagram schematically showing a state in which gas is taken from the intake manifold 31 into a certain cylinder (cylinder interior; combustion chamber) and is then discharged to the exhaust manifold 41. As shown in FIG. 2, the gas taken into the cylinder (accordingly, cylinder interior gas) includes new air taken from the tip end of the intake pipe 32 via the throttle valve 33, and EGR gas taken from the exhaust circulation pipe 51 via the EGR control valve 52.

The ratio (i.e., EGR ratio) of the quantity (mass) of the taken EGR gas to the sum of the quantity (mass) of the taken new air and the quantity (mass) of the taken EGR gas changes depending on the opening of the throttle valve 33 and the opening of the EGR control valve 52, which are properly controlled by the electronic control apparatus 60 (CPU 61) in accordance with the operating condition.

During an intake stroke, such new air and EGR gas are taken into the combustion chamber via an opened intake valve Vin as the piston moves downward, and the thus-produced gas mixture serves as cylinder interior gas. The cylinder interior gas is confined within the combustion chamber when the intake valve Vin closes near a time point at which the piston reaches compression bottom dead center, and then compressed in a subsequent compression stroke as the piston moves upward.

When the piston reaches the vicinity of top dead center (specifically, when fuel injection start timing (crank angle) CAinj to be described later comes), the present apparatus opens the corresponding fuel injection valve 21 for an injection period TAU corresponding to the instruction fuel injection quantity Qfin, to thereby inject fuel directly into the combustion chamber. As a result, the (liquid) fuel injected from an injection opening of the fuel injection valve 21 immediately becomes fuel vapor, because of heat received from the cylinder interior gas having become hot due to compression. With elapse of time, the fuel vapor disperses conically within the combustion chamber, while mixing with the cylinder interior gas to produce a gas mixture.

As described above, actuarially, fuel of the instruction fuel injection quantity Qfin is injected continuously over the injection period TAU starting from the fuel injection start timing CAinj. However, for the sake of convenience, the description will be continued under the assumption that the fuel of the instruction fuel injection quantity Qfin is injected at one time (instantaneously) at the fuel injection start timing CAinj.

Figure 3A:
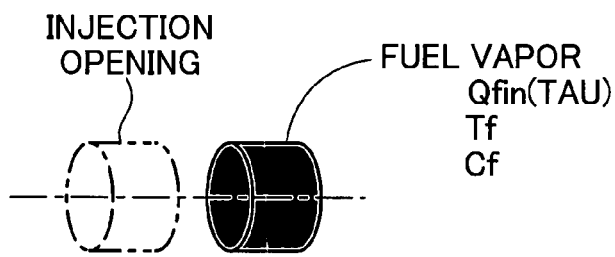
FIG. 3A is an illustration schematically showing the state of fuel at the time when the fuel is injected at one time.
Figure 3B:
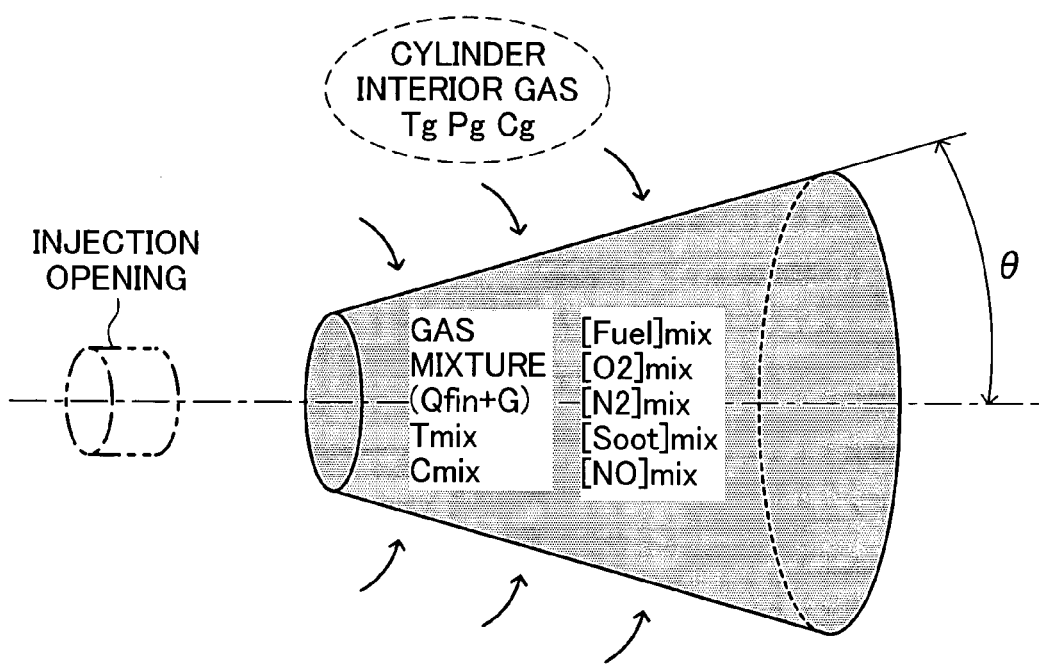
FIG. 3B is an illustration schematically showing the state of fuel which disperses conically while mixing with cylinder interior gas to thereby produce a gas mixture.

FIG. 3A schematically shows the state of fuel (fuel vapor) of the instruction fuel injection quantity (mass) Qfin (corresponding to the injection period TAU) at a time point when the fuel is injected at one time from the injection opening of the fuel injection valve 21 (i.e., post injection time t=0). FIG. 3B schematically shows the state of the fuel vapor of the mass Qfin shown in FIG. 3A at a certain time point after the injection (arbitrary post injection time t).

As shown in FIG. 3B, after being injected at the fuel injection start timing CAinj (i.e., post injection time t=0), the fuel vapor of the mass Qfin disperses conically with a spray angle θ, while mixing with cylinder interior gas. Here, it is assumed that, at an arbitrary post injection time t, the fuel vapor of the mass Qfin mixes with the cylinder interior gas having a mass G, which is a function of the post injection time t (hereinafter, the cylinder interior gas may be referred to as "gas-mixture forming cylinder interior gas") to form a gas mixture having a mass (Qfin+G).

The present apparatus estimates the state of gas mixture at an arbitrary post injection time t. As the state of gas mixture, there are estimated the temperature Tmix of gas mixture, the concentration [Fuel]mix of fuel contained in gas mixture, the concentration [O2]mix of oxygen contained in gas mixture, and the concentration [N2]mix of nitrogen contained in gas mixture, which are required for estimation of generation amounts of emissions, which will be described later. First, there will be described a method of acquiring an excess air ratio λ at an arbitrary post injection time t, which is necessary for estimation of the state of gas mixture.

<Obtainment of Excess Air Ratio λ>

An excess air ratio λ at post injection time t is defined by the following Equation (1). In Equation (1), stoich represents a mass of cylinder interior gas required for combustion of fuel of a unit mass (hereinafter referred to as "cylinder-interior-gas stoichiometric air-fuel ratio stoich"). Since the cylinder-interior-gas stoichiometric air-fuel ratio stoich is considered to change in accordance with the concentration of oxygen contained in intake air, the cylinder-interior-gas stoichiometric air-fuel ratio stoich can be obtained in accordance with a predetermined function in which the above-described intake air oxygen concentration RO2in is used as an argument.

$$\lambda = \left(\frac{1}{stoich}\right) \cdot \frac{G}{Qfin} \quad (1)$$

The excess air ratio λ defined as described above can be obtained as a function of the post injection time t on the basis of, for example, the following Equation (2) and Equation (3), which are empirical formulas introduced in "Study on Injected Fuel Travel Distance in Diesel Engine," Yutaro WAGURI, Masaru FUJII, Tatsuo AMIYA, and Reijiro TSUNEYA, the Transactions of the Japanese Society of Mechanical Engineers, p 820, 25-156 (1959) (hereinafter referred to as "Non-Patent Document 1").

$$\lambda = \int \frac{d\lambda}{dt} dt \quad (2)$$

$$\frac{d\lambda}{dt} = \frac{2^{0.25}}{c^{0.25} \cdot d^{0.5} \cdot \rho_f} \cdot \frac{1}{L} \cdot \tan^{0.5}\theta \cdot \rho g^{0.25} \cdot \Delta P^{0.25} \cdot \frac{1}{t^{0.5}} \quad (3)$$

In Equation (3), t represents the above-mentioned post injection time, and $d\lambda/dt$ represents fuel dilution rate, which is a function of the post injection time t. Further, c represents a contraction coefficient, d represents the diameter of the injection opening of the fuel injection valves 21, $\rho f$ represents the density of (liquid) fuel, and L represents a theoretical dilution gas quantity, all of which are constants.

In Equation (3), $\Delta P$ represents effective injection pressure, which is a value obtained through subtraction, from the above-mentioned final fuel injection pressure Pcrfin, of cylinder interior gas pressure Pg0 at the injection start timing (i.e., post injection time t=0). The cylinder interior gas pressure Pg0 can be obtained in accordance with the following Equation (4) under the assumption that the state of the cylinder interior gas changes adiabatically in the compression stroke (and expansion stroke) after the intake valve Vin is closed (that is, a time point at which the cylinder interior gas is confined (hereinafter referred to as "IVC")).

$$Pg0 = Pgivc \cdot \left\{ \frac{Vg(CAivc)}{Vg(CAinj)} \right\}^{\kappa} \quad (4)$$

In Equation (4), Pgivc represents cylinder interior gas pressure at IVC. Since IVC is in the vicinity of the compression bottom dead center as described above, at IVC, the cylinder interior gas pressure is considered to be approximately equal to the intake pipe pressure Pb. Accordingly, the intake pipe pressure Pb detected by means of the intake pipe pressure sensor 73 at IVC can be used as Pgivc. Vg(CAivc) represents cylinder interior volume corresponding to the crank angle CA at IVC. Vg(CAinj) represents cylinder interior volume corresponding to a crank angle CA at the post injection time t=0. Since the cylinder interior volume Vg can be obtained as a function Vg(CA) of the crank angle CA on the basis of the design specifications of the engine 10, the values of Vg(CAivc) and Vg(CAinj) can be obtained as well. κ represents the specific heat ratio of the cylinder interior gas (constant, in the present example).

In Equation (3), θ represents the spray angle shown in FIG. 3B. Since the spray angle θ is considered to change in accordance with the above-mentioned effective injection pressure $\Delta P$ and density $\rho g0$ of the cylinder interior gas at the injection start timing (i.e., post injection time t=0), the spray angle θ can be obtained on the basis of a table Mapθ, which defines the relation between the cylinder interior gas density $\rho g0$, the effective injection pressure $\Delta P$, and the spray angle θ. The cylinder interior gas density $\rho g0$ can be obtained through division of the total mass Mg of the cylinder interior gas by the above-mentioned cylinder interior volume Vg(CAinj) at a time point at which the post injection time t is zero. The total mass Mg of the cylinder interior gas can be obtained in accordance with the following Equation (5), which is based on the state equation of gas at IVC. In Equation (5), Tgivc represents cylinder interior gas temperature at IVC. Since IVC is in the vicinity of the compression bottom dead center, at IVC, the cylinder interior gas temperature is considered to be approximately equal to the intake air temperature Tb. Accordingly, the intake air temperature Tb detected by means of the intake air temperature sensor 72 at IVC is used as Tgivc. R represents the gas constant of the cylinder interior gas (constant in the present example).

$$Mg = Pgivc \cdot \frac{Vg(CAivc)}{R \cdot Tgivc} \quad (5)$$

In Equation (3), $\rho g$ represents density of the cylinder interior gas at the post injection time t and can be obtained as a function of the post injection time t through division of the total mass Mg of the cylinder interior gas by the above-mentioned cylinder interior volume Vg(CA) at the post injection time t.

As described above, once the effective injection pressure $\Delta P$ and the spray angle θ are obtained in the above-described manner, fuel dilution rate $d\lambda/dt$ can be obtained as a function of the post injection time t in accordance with Equation (3), by making use of the post injection time t and cylinder interior gas density $\rho g$, which is a function of the post injection time t. Then, the excess air ratio λ at the post injection time t can be obtained for each minute time Δt (e.g., 0.1 msec) from a time point at which the post injection time t is zero, by integrating, with respect to time, (accumulating) the fuel dilution rate $d\lambda/dt$ in accordance with the above-described Equation (2), the fuel dilution rate $d\lambda/dt$ being obtained for each minute time Δt from the time point at which the post injection time t is zero.

Since the fuel dilution rate $d\lambda/dt$ obtained from Equation (3) is always positive, the excess air ratio λ obtained from Equation (2) increases with the post injection time t. Thus, as can be understood from Equation (1), the mass G of the gas-mixture forming cylinder interior gas increases with the post injection time t. This corresponds to an increase in quantity of the cylinder interior gas (accordingly, the gas-mixture forming cylinder interior gas) which mixes with (which is taken by) fuel vapor as a result of the fuel vapor conically dispersing after injection.

<Obtainment of Gas Mixture Temperature Tmix>

Next, there will be described a method of obtaining the gas mixture temperature Tmix at an arbitrary post injection time t by making use of the excess air ratio λ obtained in the above-described manner. In general, the thermal energy (enthalpy) Hmix of a gas mixture can be represented by the following Equation (6) by making use of the gas mixture temperature Tmix.

$$Hmix = Mmix \cdot Cmix \cdot Tmix \quad (6)$$

In Equation (6), Mmix represents the total mass of the gas mixture (gas mixture mass), and Cmix represents the constant-pressure specific heat of the gas mixture. Accordingly, the gas mixture temperature Tmix can be obtained in accordance with the following Equation (7) for each minute time Δt from the time point at which the post injection time t is zero, by obtaining (updating) the enthalpy Hmix of the gas mixture, the gas mixture mass Mmix, and the constant-pressure specific heat Cmix of the gas mixture for each minute time Δt from the time point at which the post injection time t is zero. First, a method of obtaining the gas mixture mass Mmix will be described.

$$Tmix = \frac{Hmix}{Mmix \cdot Cmix} \qquad (7)$$

<<Gas Mixture Mass Mmix>>

As described above, at an arbitrary post injection time t, the fuel vapor of the mass Qfin mixes with the gas-mixture forming cylinder interior gas of the mass G to form a gas mixture having a mass (Qfin+G). Therefore, the gas mixture mass Mmix at the arbitrary post injection time t is (Qfin+G). Since a relation "G=stoich·λ·Qfin" can be derived from the above-described Equation (1), the gas mixture mass Mmix can be represented by the following Equation (8) by making use of the excess air ratio λ.

$$Mmix = (1 + stoich \cdot \lambda) \cdot Qfin \qquad (8)$$

Thus, the gas mixture mass Mmix can be obtained for each minute time Δt from the time point at which the post injection time t is zero by applying to Equation (8) the excess air ratio λ obtained for each minute time Δt from the time point at which the post injection time t is zero.

<<Constant-Pressure Specific Heat Cmix of Gas Mixture>>

There will be described a method of obtaining the constant-pressure specific heat Cmix of the gas mixture. In general, the constant-pressure specific heat Cmix of the gas mixture is considered to greatly depend on the concentration [O2]mix of oxygen contained in the gas mixture and the gas mixture temperature Tmix. The concentration [O2]mix of oxygen contained in the gas mixture can be obtained for each minute time Δt from the time point at which the post injection time t is zero, as will be described. Therefore, if the gas mixture temperature Tmix can be obtained for each minute time Δt from the time point at which the post injection time t is zero, the constant-pressure specific heat Cmix of the gas mixture can be obtained for each minute time Δt in accordance with the following Equation (9).

$$Cmix = funcCmix([O2]mix, Tmix) \qquad (9)$$

In Equation (9), funcCmix is a function for obtaining the constant-pressure specific heat Cmix of the gas mixture, while using the gas mixture oxygen concentration [O2]mix and the gas mixture temperature Tmix as arguments. Notably, the values for the arguments [O2]mix and Tmix which are used for obtaining the constant-pressure specific heat Cmix of the gas mixture by Equation (9) for each minute time Δt are corresponding values at a time point which precedes the present time point (i.e., post injection time t) by the minute time Δt.

<<Enthalpy Hmix of Gas Mixture>>

Next, there will be described a method of obtaining the enthalpy Hmix of the gas mixture. Here, an enthalpy increase ΔHmix of the gas mixture during the minute time Δt between a post injection time (t−Δt) and a post injection time t is considered for the case where the enthalpy Hmix(t−Δt) of the gas mixture at the post injection time (t−Δt) is known. This enthalpy increase ΔHmix of the gas mixture is caused by a thermal energy ΔHg of the cylinder interior gas newly taken into the gas mixture during the minute time Δt, and a reaction heat Hr generated as a result of chemical reactions occurring in the gas mixture during the minute time Δt.

First, the thermal energy ΔHg of the cylinder interior gas can be represented by the following Equation (10). In Equation (10), g represents the mass of the cylinder interior gas newly taken into the gas mixture during the minute time Δt. This mass g is a value obtained by subtracting the mass of the gas-mixture forming cylinder interior gas at the post injection time (t−Δt) from the mass of the gas-mixture forming cylinder interior gas at the post injection time t. Accordingly, the mass g can be obtained by the following Equation (11) by making use of the above-described relation "G=stoich·λ·Qfin." In Equation (11), λ(t) and λ(t−Δt) respectively represent the excess air ratios at the post injection times t and (t−Δt), which can be obtained from the above-described Equations (2) and (3).

$$\Delta Hg = g \cdot Cg \cdot Tg \qquad (10)$$

$$g = stoich \cdot (\lambda(t) - \lambda(t - \Delta t)) \cdot Qfin \qquad (11)$$

Further, in Equation (10), Tg represents the temperature of the cylinder interior gas at the post injection time t, and can be obtained in accordance with the following Equation (12) under the assumption that the state of the cylinder interior gas changes adiabatically after IVC. In the following Equation (12), Tgivc represents the temperature of the cylinder interior gas at IVC, and Vg(CAivc) represents the cylinder interior volume corresponding to the crank angle CA at IVC. Further, Vg(CA) represents the cylinder interior volume at the present time point (i.e., post injection time t).

$$Tg = Tgivc \cdot \left\{ \frac{Vg(CAivc)}{Vg(CA)} \right\}^{\kappa - 1} \qquad (12)$$

Further, in Equation (10), Cg represents the constant-pressure specific heat of the cylinder interior gas at the post injection time t, and can be obtained in accordance with the following Equation (13), which is similar to the above-described Equation (9) for obtaining the constant-pressure specific heat Cmix of the gas mixture. In the following Equation (13), funcCg is a function for obtaining the constant-pressure specific heat Cg of the cylinder interior gas, while using the intake air oxygen concentration [O2]in and the cylinder interior gas temperature Tg as arguments.

$$Cg = funcCg([O2]in, Tg) \qquad (13)$$

Notably, the intake air oxygen concentration RO2in detected by means of the intake air oxygen concentration sensor 78 is used as a value for the argument [O2]in, which is used for obtaining the constant-pressure specific heat Cg of the cylinder interior gas by Equation (13) for each minute time Δt. Further, the cylinder interior gas temperature at the present time point (i.e., post injection time t) is used as a value for the argument Tg. Since all the terms of the right side of the above-described Equation (10) can be obtained through the above-described calculation, the thermal energy ΔHg of the cylinder interior gas can be obtained in accordance with Equation (10).

Next, the reaction heat Hr generated as a result of chemical reactions occurring in the gas mixture during the minute time Δt can be represented by the following Equation (14). In the following Equation (14), Hf represents a predetermined constant, and qr represents an amount of fuel consumed by the chemical reactions occurring in the gas mixture during the minute time Δt.

$$Hr = Hf \cdot qr \qquad (14)$$

The chemical reactions associated with the fuel consumption amount qr include not only an ignition reaction (hot flame reaction) and a low-temperature oxidation reaction (cool flame reaction), but also various other chemical reactions. Since the fuel consumption amount qr is considered to greatly depend on the gas mixture oxygen concentration [O2]mix, the gas mixture fuel concentration [Fuel]mix, and the gas mixture temperature Tmix, the fuel consumption amount qr can be represented by the following Equation (15).

$$qr = \text{func}qr([O2]\text{mix}, [\text{Fuel}]\text{mix}, T\text{mix}) \quad (15)$$

In Equation (15), funcqr is a function for obtaining the fuel consumption amount qr, while using the gas mixture oxygen concentration [O2]mix, the gas mixture fuel concentration [Fuel]mix, and the gas mixture temperature Tmix as arguments. As in the case of the gas mixture oxygen concentration [O2]mix, the gas mixture fuel concentration [Fuel]mix can be obtained for each minute time Δt from the time point at which the post injection time t is zero, as will be described later. The values for arguments [O2]mix and [Fuel]mix, which are used for obtaining the fuel consumption amount qr by Equation (15) for each minute time Δt, are corresponding values at a time point which precedes the present time point (i.e., post injection time t) by the minute time Δt.

Further, a gas mixture temperature Tpre before occurrence of chemical reactions is used as a value for the argument Tmix (gas mixture temperature) of Equation (15). The gas mixture temperature Tpre before occurrence of chemical reactions refers to a gas mixture temperature at a time point after the cylinder interior gas of the mass g calculated by the above-described Equation (11) is newly taken in the gas mixture but before occurrence of chemical reactions in the period from the post injection time (t−Δt) to the post injection time t, and can be obtained by the following Equation (16).

$$Tpre = \frac{Hmix(t - \Delta t) + \Delta Hg}{(Mmix(t - \Delta t) + g) \cdot Cmix(t - \Delta t)} \quad (16)$$

In Equation (16), Mmix(t−Δt) and Cmix(t−Δt) respectively represent the mass of the gas mixture and the constant-pressure specific heat of the gas mixture at the post injection time (t−Δt), and can be obtained by the above-described Equations (8) and (9), respectively. Further, the enthalpy Hmix(t−Δt) of the gas mixture at the post injection time (t−Δt) is known. Thus, the gas mixture temperature Tpre before occurrence of chemical reactions can be obtained. Since all the argument values of the right side of the above-described Equation (15) can be obtained, the reaction heat Hr generated through chemical reactions can be obtained in accordance with Equations (14) and (15).

Through the above-described calculation, the enthalpy increase ΔHmix (=ΔHg+Hr) of the gas mixture during the minute time Δt between the post injection time (t−Δt) and the post injection time t can be obtained for the case where the enthalpy Hmix(t−Δt) of the gas mixture at the post injection time (t−Δt) is known. Therefore, the enthalpy Hmix(t) of the gas mixture (=Hmix(t−Δt)+ΔHmix) at the post injection time t can be obtained.

Moreover, at the time point when the post injection time t is zero, the gas mixture is in a state where the gas mixture has not yet taken in the cylinder interior gas; i.e., gas mixture contains fuel vapor only) (see FIG. 3A). Therefore, the enthalpy Hmix(0) of the gas mixture at that time can be obtained by the following Equation (17). In Equation (17), Cf represents a constant-pressure specific heat of fuel (vapor) (constant in the present example).

$$Hmix(0) = Qfin \cdot Cf \cdot Tf \quad (17)$$

Further, Tf represents the temperature of the fuel vapor itself, which can be obtained by the following Equation (18) in consideration of latent heat Qvapor per unit mass at the time when liquid fuel becomes fuel vapor immediately after injection thereof. In the following Equation (18), Tcr represents the temperature of the liquid fuel detected by means of the fuel temperature sensor 76 at the time point at which the post injection time t is zero. αcr represents a correction coefficient for taking into consideration a thermal loss produced when the fuel passes through the fuel pipe 23 from the vicinity of the discharge port of the fuel injection pump 22 to the fuel injection valve 21.

$$Tf = \alpha cr \cdot Tcr - \frac{Qvapor}{Cf} \quad (18)$$

Accordingly, the enthalpy Hmix(0) of the gas mixture at the time point at which the post injection time t is zero can also be obtained. Through the above-described calculation, the enthalpy Hmix of the gas mixture can be obtained for each minute time Δt from the time point at which the post injection time t is zero.

Since the enthalpy Hmix of the gas mixture, the gas mixture mass Mmix, and the constant-pressure specific heat Cmix of the gas mixture are obtained in the above-described manner for each minute time Δt from the time point at which the post injection time t is zero, the gas mixture temperature Tmix can be obtained in accordance with the above-described Equation (7) for each minute time Δt from the time point at which the post injection time t is zero.

<Obtainment of Gas Mixture Fuel Concentration [Fuel]Mix>

Next, there will be described a method of obtaining the concentration (mass concentration) [Fuel]mix of fuel contained in the gas mixture. The gas mixture fuel concentration [Fuel]mix at the post injection time t is the ratio of the "mass of fuel present in the gas mixture at the post injection time t" to the gas mixture mass Mmix at the post injection time t obtained by the above-described Equation (8).

The "mass of fuel present in the gas mixture at the post injection time t" is a value obtained by subtracting the quantity of fuel consumed by chemical reactions during a period from the injection to the present time point (post injection time t) from the quantity of fuel injected when the post injection time t is zero (instruction fuel injection quantity Qfin). Accordingly, the gas mixture fuel concentration [Fuel]mix at the post injection time t can be represented by the following Equation (19).

$$[\text{Fuel}]\text{mix} = \frac{Qfin - \Sigma qr}{Mmix} \quad (19)$$

In Equation (19), "Σqr" represents the sum of values of the fuel consumption amount qr, which is obtained and updated in accordance with the above-described Equation (15) for each minute time Δt in the period from the injection to the present time point (post injection time t). In the above-described manner, the gas mixture fuel concentration [Fuel]mix can be obtained in accordance with Equation (19) for each minute time Δt from the time point at which the post injection time t is zero, by obtaining the fuel consumption amount qr and the gas mixture mass Mmix for each minute time Δt from the time point at which the post injection time t is zero.

<Obtainment of Gas Mixture Oxygen Concentration [O2] Mix>

Next, there will be described a method of obtaining the concentration (mass concentration) [O2]mix of oxygen contained in the gas mixture. The gas mixture oxygen concentration [O2]mix at the post injection time t is the ratio of the "mass of oxygen present in the gas mixture at the post injection time t" to the gas mixture mass Mmix at the post injection time t.

The "mass of cylinder interior gas present in the gas mixture at the post injection time t" is a value obtained by subtracting the mass of cylinder interior gas consumed by chemical reactions during the period from the injection to the present time point (post injection time t) from the mass G of the gas-mixture forming cylinder interior gas at the post injection time t. The consumption amount gr of the cylinder interior gas consumed within the gas mixture within the minute time Δt through chemical reaction with the fuel of the fuel consumption amount qr (in the minute time Δt) can be represented by the following Equation (20).

$$gr = \text{stoich} \cdot qr \tag{20}$$

Accordingly, the "mass of cylinder interior gas present in the gas mixture at the post injection time t" can be represented by "G−Σgr." Here, "Σgr" represents the sum of values of the cylinder interior gas consumption amount gr, which is obtained and updated in accordance with the above-described Equation (20) for each minute time Δt in the period from the injection to the present time point (post injection time t).

The "mass of oxygen present in the gas mixture at the post injection time t" can be obtained by multiplying the "mass of cylinder interior gas present in the gas mixture at the post injection time t" by the concentration of oxygen within the cylinder interior gas (accordingly, the above-described intake air oxygen concentration [O2]in). Therefore, the gas mixture oxygen concentration [O2]mix at the post injection time t can be represented by the following Equation (21).

$$[O2]\text{mix} = \frac{(G - \Sigma gr) \cdot [O2]\text{in}}{Mmix} \tag{21}$$

In the above-described manner, the gas mixture oxygen concentration [O2]mix can be obtained in accordance with Equation (21) for each minute time Δt from the time point at which the post injection time t is zero, by obtaining the mass G of the gas-mixture forming cylinder interior gas, the cylinder interior gas consumption amount gr, and the gas mixture mass Mmix for each minute time Δt from the time point at which the post injection time t is zero.

<Obtainment of Gas Mixture Nitrogen Concentration [N2] Mix>

Next, there will be described a method of obtaining the concentration (mass concentration) [N2]mix of nitrogen contained in the gas mixture. The gas mixture nitrogen concentration [N2]mix at the post injection time t is the ratio of the "mass of nitrogen present in the gas mixture at the post injection time t" to the gas mixture mass Mmix at the post injection time t.

Nitrogen in the cylinder interior gas is an inert gas, and is not consumed within the gas mixture by chemical reactions occurring during the period from the injection to the present time point (post injection time t). Accordingly, the "mass of nitrogen present in the gas mixture at the post injection time t" can be obtained by multiplying the mass G of the gas-mixture forming cylinder interior gas at the post injection time t by the concentration of nitrogen within the cylinder interior gas (accordingly, the intake air nitrogen concentration [N2]in). Therefore, the gas mixture nitrogen concentration [N2]mix at the post injection time t can be represented by the following Equation (22).

$$[N2]\text{mix} = \frac{G \cdot [N2]\text{in}}{Mmix} \tag{22}$$

In the above-described manner, the gas mixture nitrogen concentration [N2]mix can be obtained in accordance with Equation (22) for each minute time Δt from the time point at which the post injection time t is zero, by obtaining the mass G of the gas-mixture forming cylinder interior gas and the gas mixture mass Mmix for each minute time Δt from the time point at which the post injection time t is zero. In the above, there have been described the methods of obtaining the gas mixture temperature Tmix, the gas mixture fuel concentration [Fuel]mix, the gas mixture oxygen concentration [O2]mix, and the gas mixture nitrogen concentration [N2]mix, which are required for estimation of emission generation amounts.

(Method of Estimating Emission Generation Amounts)

Next, there will be described a method for estimating emission generation amounts by the present apparatus. In the present example, a soot generation amount and an NO generation amount are estimated as the emission generation amounts. First, estimation of the soot generation amount will be described.

<Soot Generation Amount>

The a soot generation amount can be obtained by making use of change rate of the concentration [Soot]mix of soot contained in the gas mixture (hereinafter referred to as "soot generation speed d[Soot]mix/dt"), which can be obtained from the following Equation (23), which is an empirical formula disclosed in "Combustion Model of Direct-Injection-Type Diesel Engine and Performance Prediction," the Transactions of the Japanese Society of Mechanical Engineers (book B), vol. 48, No. 432 (hereinafter referred to "Non-Patent Document 2").

$$\frac{d[Soot]\text{mix}}{dt} = \frac{dmsf}{dt} - \frac{dmso}{dt} \tag{23}$$

In Equation (23), dmsf/dt represents an increasing speed of the gas mixture soot concentration [Soot]mix due to formation of soot within the gas mixture (hereinafter referred to as "soot formation speed"), and dmso/dt represents a decreasing speed of the gas mixture soot concentration [Soot]mix due to oxidation of soot formed within the gas mixture (hereinafter referred to as "soot oxidation speed"). These speeds are represented by the following Equations (24) and (25), respectively.

$$\frac{dmsf}{dt} = Af \cdot [Fuel]\text{mix} \cdot Pg^\alpha \cdot \exp\left(\frac{-Esf}{R \cdot Tmix}\right) \tag{24}$$

$$\frac{dmso}{dt} = Ao \cdot [Soot]\text{mix} \cdot [O2]\text{mix} \cdot Pg^\beta \cdot \exp\left(\frac{-Eso}{R \cdot Tmix}\right) \tag{25}$$

In Equations (24) and (25), Af and Ao are constants, and Esf and Eso are activation energies (constants in the present example). Further, Pg represents the pressure of cylinder interior gas, which can be obtained by the following Equation (26) under the assumption that the state of the cylinder interior gas changes adiabatically after IVC. In the following Equation (26), Pgivc represents the pressure of the cylinder interior gas at IVC, and Vg(CAivc) represents the cylinder interior volume corresponding to the crank angle CA at IVC as described above. Further, Vg(CA) represents the cylinder interior volume at the present time point (i.e., post injection time t).

$$Pg = Pgivc \cdot \left\{ \frac{Vg(CAivc)}{Vg(CA)} \right\}^{\kappa} \qquad (26)$$

The above-described Equation (24) shows that the higher the gas mixture fuel concentration [Fuel]mix, the gas mixture temperature Tmix, and the cylinder interior gas pressure Pg, the higher the soot formation speed (accordingly, the greater the easiness of formation of soot). Further, the above-described Equation (25) shows that the higher the gas mixture soot concentration [Soot]mix, the gas mixture oxygen concentration [O2]mix, the gas mixture temperature Tmix, and the cylinder interior gas pressure Pg, the higher the soot oxidation speed (accordingly, the greater the easiness of oxidation and extinction of soot).

The soot generation speed d[Soot]mix/dt can be obtained for each minute time Δt from the time point at which the post injection time t is zero, by applying to the above-described Equations (23) to (25), for each minute time Δt, the gas mixture temperature Tmix, the gas mixture fuel concentration [Fuel]mix, and the gas mixture oxygen concentration [O2] mix, which can be obtained for each minute time Δt from the time point at which the post injection time t is zero.

Accordingly, the gas mixture soot concentration [Soot]mix at the post injection time t can be updated for each minute time Δt from a time point at which the post injection time t is zero, by integrating, with respect to time, (accumulating) the soot generation speed d[Soot]mix/dt obtained for each minute time Δt from the time point at which the post injection time t is zero. If the gas mixture soot concentration [Soot]mix at the post injection time t can be obtained in the above-described manner, the soot generation amount at the post injection time t can be obtained by multiplying the gas mixture soot concentration [Soot]mix by the gas mixture mass Mmix.

<NO Generation Amount>

Next, estimation of the NO generation amount will be described. The NO generation amount can be obtained by making use of change rate of the concentration [NO]mix of NO contained in the gas mixture (hereinafter referred to as "NO generation speed d[NO]mix/dt"), which can be obtained, for example, from the following Equation (27) based on the extended Zel'dovich mechanism, which is introduced in "Combustion Engineering," Yukio MIZUTANI, Morikita Publishing Co., Ltd. (hereinafter referred to as "Non-Patent Document 3").

$$\frac{d[NO]\text{mix}}{dt} = \qquad (27)$$
$$2An \cdot Kfo(Tmix) \cdot [N2]\text{mix} \cdot [O2]^{0.5}\text{mix} \cdot \exp\left(\frac{-En}{Tmix}\right)$$

In Equation (27), An is a constant, and En represents activation energy (a constant in the present example). Further, Kfo(Tmix) represents an equilibrium constant determined on the basis of the gas mixture temperature Tmix. The above-described Equation (27) shows that the higher the gas mixture oxygen concentration [O2]mix, the gas mixture nitrogen concentration [N2]mix, and the gas mixture temperature Tmix, the higher the NO generation speed (accordingly, the greater the easiness of generation of NO).

The NO generation speed d[NO]mix/dt can be obtained for each minute time Δt from the time point at which the post injection time t is zero, by applying to the above-described Equation (27), for each minute time Δt, the gas mixture temperature Tmix, the gas mixture nitrogen concentration [N2] mix, and the gas mixture oxygen concentration [O2]mix, which can be obtained for each minute time Δt from the time point at which the post injection time t is zero.

Accordingly, the gas mixture NO concentration [NO]mix at the post injection time t can be updated for each minute time Δt from a time point at which the post injection time t is zero, by integrating, with respect to time, (accumulating) the NO generation speed d[NO]mix/dt obtained for each minute time Δt from the time point at which the post injection time t is zero. If the gas mixture NO concentration [NO]mix at the post injection time t can be obtained in the above-described manner, the NO generation amount at the post injection time t can be obtained by multiplying the gas mixture NO concentration [NO]mix by the gas mixture mass Mmix.

(Division of Injection Fuel, Division of Gas Mixture)

The state (temperature Tmix, etc.) of the gas mixture and the emission generation amounts obtained in the above-described manner are values obtained under the assumption that the fuel of the instruction fuel injection quantity Qfin is injected at a time (instantaneously) at the fuel injection start timing CAinj, as shown in FIGS. 3A and 3B. That is, it is assumed that after the fuel injection start timing CAinj, all the fuel of the mass Qfin conically disperses with the above-described spray angle θ (see FIG. 3B) to thereby form a "single gas mixture," the spray angle θ being determined on the basis of the effective injection pressure ΔP at the fuel injection start timing CAinj and the cylinder interior gas density ρg0 at the fuel injection start timing CAinj.

However, as described above, in actuality, the fuel of the instruction fuel injection quantity Qfin is continuously injected over the injection period TAU from the fuel injection start timing CAinj. Accordingly, when a gas mixture advancing within the combustion chamber is microscopically observed, the closer the end portion of the gas mixture, the greater the delay involved in injection of fuel in relation to the fuel injection start timing CAinj. In other words, the injection time point of fuel contained in a certain portion changes depending on the position of the certain portion within a region occupied by the gas mixture.

Meanwhile, the state (temperature Tg, density ρg, etc.) of cylinder interior gas, which corresponds to the time elapsed after fuel injection, changes depending on the time point at which the fuel is injected. In addition, the effective injection pressure ΔP at the time of fuel injection, and the cylinder interior gas density ρg0 (accordingly, spray angle θ) at the time of fuel injection also change depending on the time point at which the fuel is injected. In other words, the state of the gas mixture advancing within the combustion chamber changes depending on the injection time point of fuel contained in the gas mixture.

As can be understood from the above, the state (temperature, etc.) of the gas mixture (which corresponds to the time elapsed after fuel injection) changes depending on the position within the region occupied by the gas mixture. Accordingly, the amounts of emissions generated within the gas mixture also change depending on the position within the region occupied by the gas mixture. That is, the amounts of emissions generated within the gas mixture also become non-uniform, because of non-uniformity of the gas mixture advancing within the combustion chamber.

In order to accurately estimate the state of the gas mixture and the emission generation amounts in consideration of the non-uniformity of the gas mixture and the non-uniformity of the emission generation amounts, it is possible to employ a method in which the injection period TAU is divided into a plurality of sub-periods, and the fuel of the instruction fuel injection quantity Qfin is divided into a plurality of portions which are sequentially injected in the corresponding sub-periods. Then, gas mixtures formed from the fuel portions are estimated individually.

Figure 4:
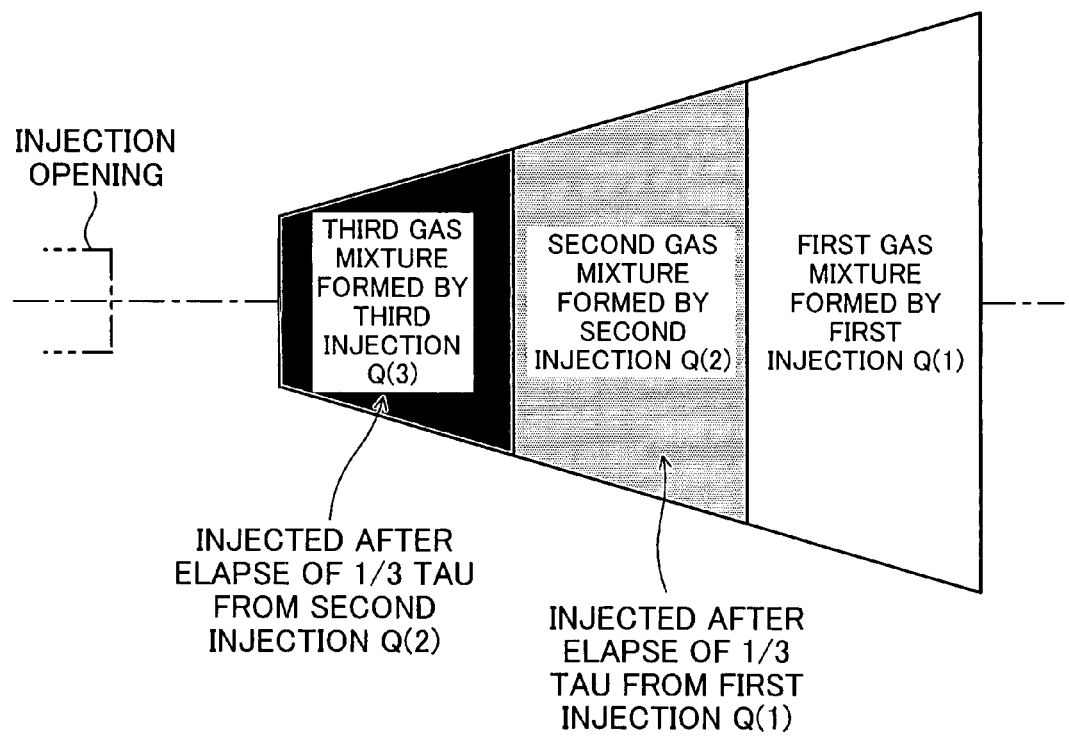
FIG. 4 is an illustration schematically showing the states of gas mixtures respectively formed from portions of fuel, which are successively injected in three equal periods; i.e., front, intermediate, and rear periods of an injection period.

In the present embodiment, as shown in FIG. 4, the injection period TAU is equally divided into three sub-periods; i.e., "front ⅓ TAU period," "intermediate ⅓ TAU period," and "rear ⅓ TAU period," and fuel portions having masses Q(1), Q(2), and Q(3), respectively, are sequentially and individually injected in the front ⅓ TAU period, the intermediate ⅓ TAU period, and the rear ⅓ TAU period.

More specifically, the fuel portion of mass Q(1) for the injection period "front ⅓ TAU period" associated with a first injection is injected at one time at the fuel injection start timing CAinj; the fuel portion of mass Q(2) for the injection period "intermediate ⅓ TAU period" associated with a second injection is injected at one time when ⅓ TAU has elapsed after the first injection; and the fuel portion of mass Q(3) for the injection period "rear ⅓ TAU period" associated with a third injection is injected at one time when ⅓ TAU has elapsed after the second injection. Notably, although a relation "Q(1)+Q(2)+Q(3)=Qfin" stands, Q(1), Q(2), and Q(3) do not become equal to one another, because, for example, the injection pressure Pcr is not maintained constant over the injection period TAU.

The present apparatus individually handles a gas mixture (first gas mixture) formed as a result of the first injection, a gas mixture (second gas mixture) formed as a result of the second injection, and a gas mixture (third gas mixture) formed as a result of the third injection; and, for each gas mixture, individually estimates the gas mixture state (temperature Tmix, etc.) and the emission generation amounts in the above-described procedure.

Thus, the gas mixture state and the emission generation amounts can be individually estimated in consideration of differences between the gas mixtures in terms of the state (temperature Tg, density ρg, etc.) of cylinder interior gas, which corresponds to the time elapsed after fuel injection, the effective injection pressure ΔP at the time of fuel injection, and the cylinder interior gas density ρg0 (accordingly, spray angle θ) at the time of fuel injection.

Thus, the present apparatus estimates the total emission generation amounts (specifically, total soot generation amount Soot and total NO generation amount NO) by summing the emission generation amounts estimated for each gas mixture. With this procedure, the total emission generation amounts can be accurately estimated in consideration of the above-mentioned non-uniformity of the emission generation amounts.

(Outline of Fuel Injection Control)

The present apparatus starts the above-described calculation associated with estimation of the gas mixture state and estimation of the emission generation amounts immediately after IVC at which the amount of cylinder interior gas is determined, and completes estimation of the total emission generation amounts (specifically, total soot generation amount Soot and total NO generation amount NO) before the fuel injection start timing CAinj comes.

The present apparatus obtains target emission generation amounts (specifically, target soot generation amount Sootter and target NO generation amount NOter) from operation conditions of the engine, and feedback-controls the fuel injection pressure, when one of the estimated total soot generation amount Soot and total NO generation amount NO is sufficiently larger than the corresponding target generation amount, such that that total generation amount decreases.

Specifically, when a value obtained by subtracting the target soot generation amount Sootter from the estimated total soot generation amount Soot is larger than a predetermined amount, the present apparatus increases the fuel injection start pressure from the base fuel injection pressure Pcrbase by a predetermined amount. Thus, the soot generation amount is controlled to decrease. Meanwhile, when a value obtained by subtracting the target NO generation amount NOter from the estimated total NO generation amount NO is larger than a predetermined amount, the present apparatus decreases the fuel injection start pressure from the base fuel injection pressure Pcrbase by a predetermined amount. Thus, the NO generation amount is controlled to decrease. The above is the outline of fuel injection control.

(Actual Operation)

Next, there will be described actual operation of the emission-generation-amount estimation apparatus for an internal combustion engine having the above-described configuration.

<Calculation of Gas Mixture Temperature, Etc. and Emission Amounts>

The CPU 61 repeatedly executes, at predetermined intervals, a routine shown by a series of flowcharts in FIG. 5 to 9 and adapted to calculate the gas mixture temperature, etc., and the emission amounts. Therefore, when a predetermined timing has been reached, the CPU 61 starts the processing from step 500, and then proceeds to step 505 so as to determine whether or not the intake valve Vin changes from an open state to a closed state (i.e., whether or not IVC comes). When the CPU 61 makes a "No" determination, it proceeds directly to step 595 and ends the current execution of the present routine.

Here, IVC is assumed to have come in a certain cylinder. In this case, the CPU 61 makes a "Yes" determination when it proceeds to step 505, and then proceeds to step 510. In step 510, the CPU 61 stores the present actual crank angle CAact obtained from the crank position sensor 74 as the crank angle CAivc at IVC, the present intake pipe pressure Pb obtained from the intake pipe pressure sensor 73 as the cylinder interior gas pressure Pgivc at IVC, the present intake air temperature Tb obtained from the intake air temperature sensor 72 as the cylinder interior gas temperature Tgivc at IVC, and the present intake air oxygen concentration RO2in obtained from the intake air oxygen concentration sensor 78 as the intake air oxygen concentration [02]in.

Subsequently, the CPU 61 proceeds to step 515 so as to obtain the total mass Mg of cylinder interior gas on the basis of the cylinder interior gas pressure Pgivc at IVC, the cylinder interior gas temperature Tgivc at IVC, and the above-described Equation (5).

Figure 10:
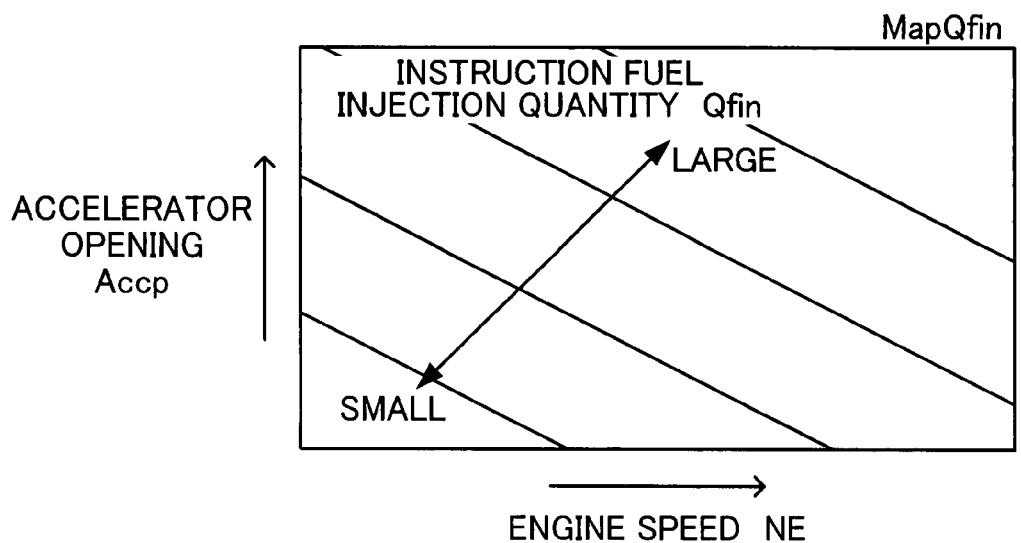
FIG. 10 is a table for determining an instruction fuel injection quantity, to which the CPU shown in FIG. 1 refers during execution of the routine shown in FIG. 5.

Next, the CPU 61 proceeds to step 520, and obtains the instruction fuel injection quantity Qfin (i.e., fuel injection period TAU) from the present accelerator opening Accp obtained from the accelerator opening sensor 75, the present engine speed NE obtained from the crank position sensor 74, and a table (map) MapQfin shown in FIG. 10. The table MapQfin, which is stored in the ROM 62, defines the relation between the accelerator opening Accp and the engine speed NE, and the instruction fuel injection quantity Qfin.

Figure 11:
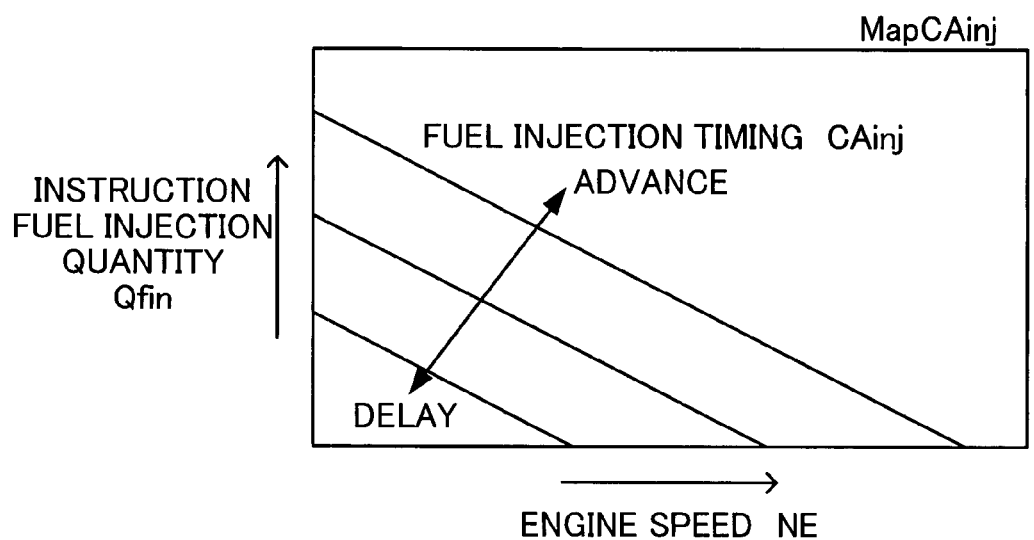
FIG. 11 is a table for determining a fuel injection timing, to which the CPU shown in FIG. 1 refers during execution of the routine shown in FIG. 5.

Next, the CPU 61 proceeds to step 525, and determines the fuel injection start timing CAinj from the instruction fuel injection quantity Qfin, the engine speed NE, and a table MapCAinj shown in FIG. 11. The table MapCAinj, which is stored in the ROM 62, defines the relation between the instruction fuel injection quantity Qfin and the engine speed NE, and the fuel injection start timing CAinj.

Figure 12:
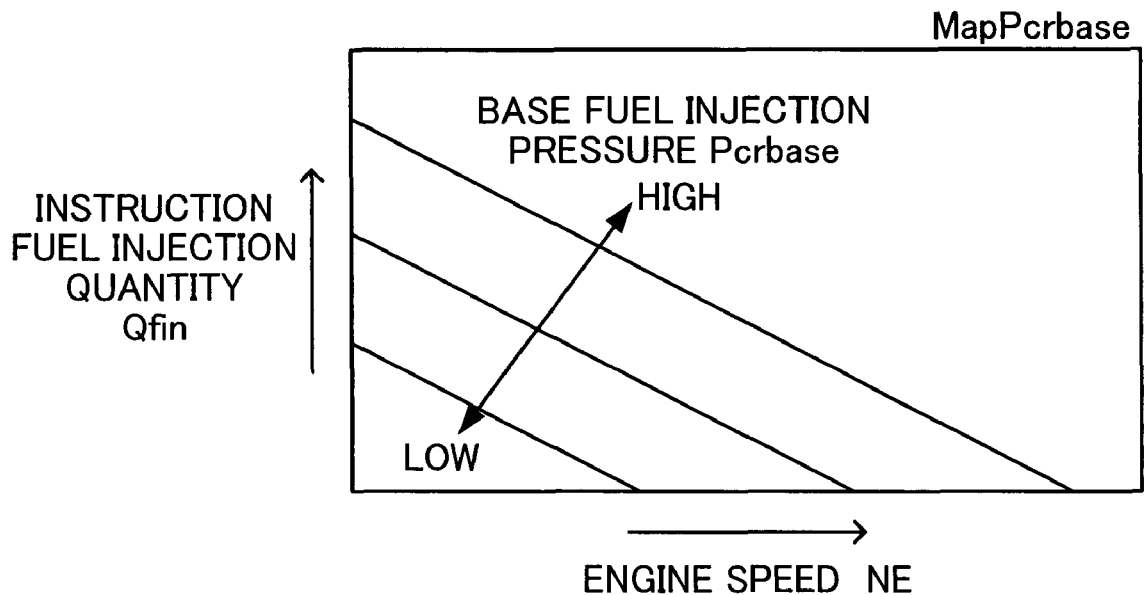
FIG. 12 is a table for determining a base fuel injection pressure, to which the CPU shown in FIG. 1 refers during execution of the routine shown in FIG. 5.

Subsequently, the CPU 61 proceeds to step 530 so as to determine a base fuel injection pressure Pcrbase from the instruction fuel injection quantity Qfin, the engine speed NE, and a table MapPcrbase shown in FIG. 12. The table MapPcrbase, which is stored in the ROM 62, defines the relation between the instruction fuel injection quantity Qfin and the engine speed NE, and the base fuel injection pressure Pcrbase.

Next, the CPU 61 proceeds to step 535, and obtains fuel injection pressures Pcr(1), Pcr(2), and Pcr(3) for the first, second, and third injections from a value "TAU/3" obtained by dividing the fuel injection period TAU by 3, the obtained base fuel injection pressure Pcrbase, and a function funcPcr. As described, it is assumed that the first injection (mass Q(1)) is performed at one time at the fuel injection start timing CAinj, the second injection (mass Q(2)) is performed at one time when ⅓ TAU elapses after the first injection, and the third injection (mass Q(3)) is performed at one time when ⅓ TAU elapses after the second injection.

The function funcPcr determines the fuel injection pressures Pcr(1), Pcr(2), and Pcr(3) in consideration of a change (drop) in injection pressure when fuel is continuously injected over the fuel injection period TAU from the fuel injection start timing CAinj in a state where the injection pressure is adjusted to the obtained base fuel injection pressure Pcrbase at the fuel injection start timing CAinj. Specifically, with the above-described determination, the fuel injection pressure Pcr(1) for the first injection is set to a value equal to the base fuel injection pressure Pcrbase, and each of the fuel injection pressures Pcr(2) and Pcr(3) for the second and third injections is set to a value lower than the base fuel injection pressure Pcrbase by a predetermined amount.

Subsequently, the CPU 61 proceeds to step 540, and obtains respective fuel quantities (masses) Q(1), Q(2), and Q(3) for the first, second, and third injections from the obtained fuel injection period TAU, the value "TAU/3," the obtained base fuel injection pressure Pcrbase, and a function funcQ. This step 540 corresponds to the injection fuel dividing means.

The function funcQ determines the fuel quantities Q(1), Q(2), and Q(3) in consideration of a change (drop) in injection pressure when fuel is continuously injected over the fuel injection period TAU from the fuel injection start timing CAinj in a state where the injection pressure is adjusted to the obtained base fuel injection pressure Pcrbase at the fuel injection start timing CAinj. Specifically, with the above-described determination, the fuel quantities (masses) Q(1), Q(2), and Q(3) are set such that the relation "Qfin=Q(1)+Q(2)+Q(3)" stands. However, the fuel quantities Q(1), Q(2), and Q(3) do not become equal to one another.

Next, the CPU 61 proceeds to step 545, and obtains crank angles CAinj(1), CAinj(2), and CAinj(3) at respective injection times for the first, second, and third injections from the value "TAU/3," the present engine speed NE, the fuel injection start timing CAinj, and a function funcCAinj.

The function funcCAinj obtains the crank angles CAinj(1), CAinj(2), and CAinj(3) under the assumption that the engine speed NE is maintained at the present speed. Specifically, with the above-described processing, the crank angle CAinj(1) at the time of the first injection is set to a value corresponding to the fuel injection start timing CAinj; the crank angle CAinj(2) at the time of the second injection is set to a value corresponding to a timing which lags the fuel injection start timing CAinj (accordingly, the timing of the first injection) by the period "TAU/3"; the crank angle CAinj(3) at the time of the third injection is set to a value corresponding to a timing which lags the timing of the second injection by the period "TAU/3."

Next, the CPU 61 proceeds to step 550, and obtains a fuel vapor temperature Tf on the basis of the present fuel temperature Tcr obtained from the fuel temperature sensor 76, and the above-described Equation (18). Subsequently, the CPU 61 proceeds to step 555, and obtains a cylinder-interior-gas stoichiometric air-fuel ratio stoich on the basis of the intake air oxygen concentration [O2]in and a function funcstoich for obtaining the cylinder-interior-gas stoichiometric air-fuel ratio stoich by using [O2]in as an argument.

Next, the CPU 61 proceeds to step 560, and obtains a concentration of nitrogen contained in the cylinder interior gas (i.e., intake air nitrogen concentration [N2]in) on the basis of the intake air oxygen concentration [O2]in and a function func[N2] for obtaining the concentration of nitrogen in the cylinder interior gas by using [O2]in as an argument.

Subsequently, the CPU 61 proceeds to step 565, and obtains a minute crank angle ΔCA, which is a crank angle corresponding to the minute time Δt (e.g., 0.1 msec), on the basis of the present engine speed NE, the minute time Δt, and a function funcΔCA for obtaining the minute crank angle ΔCA by using NE and Δt as arguments. This minute crank angle ΔCA is a crank angle corresponding to the minute time Δt when the engine speed NE is maintained at the value at the present time (that is, immediately after IVC).

The CPU 61 then proceeds to step 570, and sets the total soot generation amount Soot to an initial value Soot0, and the total NO generation amount NO to an initial value NO0. In step 575 subsequent thereto, the CPU 61 clears the value of a variable i to "0." The initial value Soot0 corresponds to an amount of soot contained in the cylinder interior gas before fuel injection (accordingly, previously contained in EGR gas); and the initial value NO0 corresponds to an amount of NO contained in the cylinder interior gas before fuel injection (accordingly, previously contained in EGR gas).

The value of the variable i is used to selectively represent one of the first through third injections. That is, "i=1" represents the first injection (accordingly, the first gas mixture), "i=2" represents the second injection (accordingly, the second gas mixture), and "i=3" represents the third injection (accordingly, the third gas mixture).

Next, the CPU 61 then proceeds to step 605 of FIG. 6, and increments the value of the variable i ("0" at the present time point) by "1." As a result, at the present time point, the value of the variable i becomes "1." Accordingly, after this point in time, calculations associated with the first injection are performed as long as "i=1." Specifically, first, various initial values associated with the first injection are determined as follows.

First, the CPU 61 proceeds to step 610, and obtains the cylinder interior gas density ρg0 (at the time of the first injection) by dividing the total mass Mg of the cylinder interior gas obtained in the aforementioned step 515 by the cylinder interior volume Vg(CAinj(1)) at the time of the first injection obtained from the crank angle CAinj(i) at the time of the i-th (first) injection obtained in the aforementioned step 545.

Subsequently, the CPU 61 proceeds to step 615, and obtains the cylinder interior gas pressure Pg0 (at the time of the first injection) on the basis of the cylinder interior gas pressure Pgivc at IVC obtained in the aforementioned step 510, the above-described cylinder interior volume Vg(CAivc) at IVC, the cylinder interior volume Vg(CAinj(i)) at the time of the i-th (first) injection, and an equation corresponding to the above-described Equation (4).

Next, the CPU 61 proceeds to step 620, and obtains the effective injection pressure $\Delta P$ (at the time of the first injection) by subtracting the above-described cylinder interior gas pressure Pg0 from the i-th (first) injection pressure Pcr(i) obtained in the aforementioned step 535. In step 625 subsequent thereto, the CPU 61 obtains a spray angle $\theta$ (associated with the first injection) on the basis of the obtained effective injection pressure $\Delta P$, the cylinder interior gas density $\rho g0$, and a table Map$\theta$. With this, the spray angle $\theta$ is determined on the basis of the effective injection pressure $\Delta P$ and the cylinder interior gas density $\rho g0$ at the time of the i-th (first) injection (that is, the crank angle CAinj(1)).

Next, the CPU 61 proceeds to step 630 so as to set an excess-air-ratio previous value $\lambda$b to an initial value "0", and proceeds to step 635 so as to set the value of the gas-mixture forming cylinder interior gas mass G (associated with the first gas mixture) to an initial value "0." In step 640 subsequent thereto, the CPU 61 sets both a fuel-consumption-amount cumulative value sumpr and a cylinder-interior-gas-consumption-amount cumulative value sumgr (associated with the first gas mixture) to an initial value "0."

Subsequently, the CPU 61 proceeds to step 645, and sets the gas mixture enthalpy Hmix (associated with the first gas mixture) to an initial value (that is, the product of the i-th (first) injection quantity Q(i) obtained in the aforementioned step 540, the constant-pressure specific heat Cf of fuel, and the fuel vapor temperature Tf obtained in the aforementioned step 550) in accordance with an equation corresponding to the above-described Equation (17).

Next, the CPU 61 proceeds to step 650 so as to set the gas mixture constant-pressure specific heat Cmix (associated with the first gas mixture) to the above-described constant-pressure specific heat Cf of fuel (initial value), and proceeds to step 655 so as to set the gas mixture mass Mmix (associated with the first gas mixture) to the i-th (first) injection quantity Q(i) (initial value).

Next, the CPU 61 proceeds to step 660 so as to set each of the gas mixture NO concentration [NO]mix, soot concentration [Soot]mix, and oxygen concentration [O2]mix (associated with the first gas mixture) to an initial value "0" and set the gas mixture fuel concentration [Fuel]mix (associated with the first gas mixture) to an initial value "1."

Subsequently, the CPU 61 proceeds to step 665 so as to set the post injection time t (associated with the first gas mixture) to an initial value "0" and set the crank angle CA (associated with the first injection) to the crank angle CAinj(i) at the time of the i-th (first) injection (initial value). With these settings, the post injection time t associated with the i-th (first) gas mixture is counted from the time of the i-th (first) injection.

Next, the CPU 61 proceeds to step 670, and initializes both the values of flags ENDsoot and Endno to "0." When the value of the flag ENDsoot is "1," this flag indicates that the value of the soot concentration [Soot]mix is being updated. When the value of the flag ENDsoot is "0," this flag indicates that updating of the soot concentration [Soot]mix has been completed. When the value of the flag ENDno is "1," this flag indicates that the value of the NO concentration [NO]mix is being updated. When the value of the flag ENDno is "0," this flag indicates that updating of the NO concentration [NO]mix has been completed. In this manner, the various initial values associated with the i-th (first) injection are determined.

Figure 7:
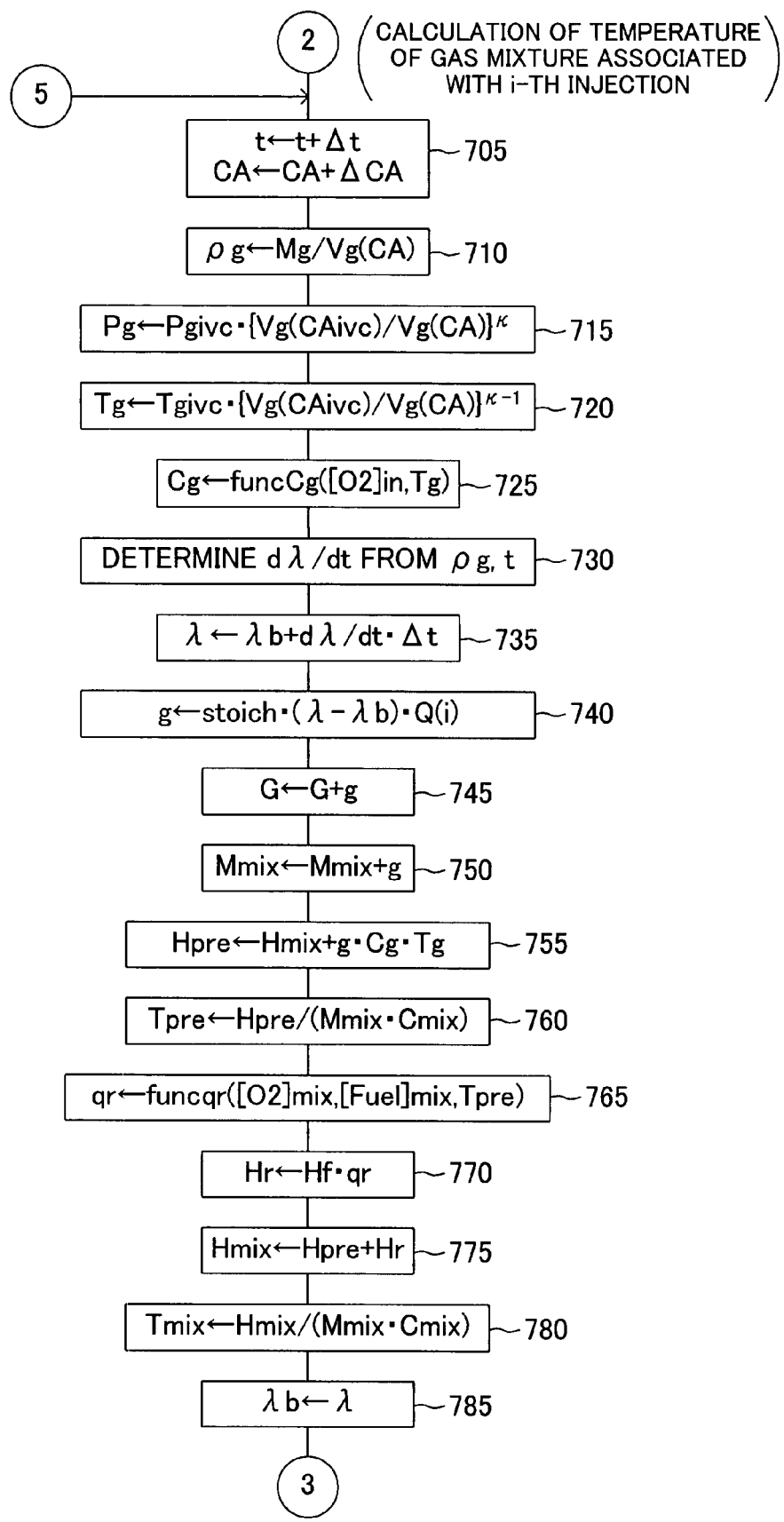
FIG. 7 is a flowchart showing a third portion of the routine which the CPU shown in FIG. 1 executes so as to calculate gas mixture temperature, etc., and emission amounts.

Next, the CPU 61 proceeds to the routine of FIG. 7, and starts processing for calculating the gas mixture temperature associated with the i-th (first) injection. Specifically, the CPU 61 first proceeds to step 705, and updates or increases the value ("0" at the present time point) of the post injection time t (associated with the first injection) by the minute time $\Delta t$ and updates or increases the value ("CAinj(1)" at the present time point) of the crank angle CA (associated with the first injection) by the minute crank angle $\Delta$CA. In this manner, the value of the crank angle CA is maintained at a value corresponding to the post injection time t. With this processing, after this point in time, the post injection time t (associated with the first injection) becomes equal to the minute time $\Delta t$, and the crank angle CA (associated with the first injection) becomes equal to CAinj(1)+$\Delta$CA.

Subsequently, the CPU 61 proceeds to step 710, and obtains the cylinder interior gas density $\rho g$ (associated with the first injection) at the post injection time t (accordingly, the crank angle CA) by dividing the total mass Mg of the cylinder interior gas obtained in the aforementioned step 515 by the cylinder interior volume Vg(CA) corresponding to the crank angle CA updated in the aforementioned step 705.

Next, the CPU 61 proceeds to step 715, and obtains the cylinder interior gas pressure Pg (associated with the first injection) at the post injection time t (accordingly, the crank angle CA) on the basis of the cylinder interior gas pressure Pgivc at IVC obtained in the above-described step 510, the above-described cylinder interior volume Vg(CAivc) at IVC, the above-described cylinder interior volume Vg(CA) corresponding to the crank angle CA, and the above-described Equation (26).

Next, the CPU 61 proceeds to step 720, and obtains the cylinder interior gas temperature Tg (associated with the first injection) at the post injection time t (accordingly, the crank angle CA) on the basis of the cylinder interior gas temperature Tgivc at IVC obtained in the above-described step 510, the above-described cylinder interior volume Vg(CAivc) at IVC, the above-described cylinder interior volume Vg(CA) corresponding to the crank angle CA, and the above-described Equation (12).

Next, the CPU 61 proceeds to step 725, and obtains the constant-pressure specific heat Cg of the cylinder interior gas (associated with the first injection) at the post injection time t (accordingly, the crank angle CA) on the basis of the above-described intake air oxygen concentration [O2]in obtained in the above-described step 510, the cylinder interior gas temperature Tg obtained in step 720, a function funcCg for obtaining the constant-pressure specific heat Cg of the cylinder interior gas by using [O2]in and Tg as arguments, and the above-described Equation (13).

Subsequently, the CPU 61 proceeds to step 730, and obtains a fuel dilution rate d$\lambda$/dt (associated with the i-th (first) injection) on the basis of the cylinder interior gas density $\rho g$ obtained in the aforementioned step 710, the spray angle $\theta$ obtained in the aforementioned step 625, the effective injection pressure $\Delta P$ obtained in the aforementioned step 620, the post injection time t (associated with the i-th (first) injection) updated in the aforementioned step 705, and the above-described Equation (3).

Then, the CPU 61 proceeds to step 735, and updates, in accordance with the above-described Equation (2), the excess air ratio $\lambda$ associated with the i-th (first) injection to a value obtained by adding a value "d$\lambda$/dt·$\Delta t$" (obtained by multiplying the obtained fuel dilution rate d$\lambda$/dt by the minute time $\Delta t$) to the excess-air-ratio previous value $\lambda$b at that time (at the present time point, "0" because of the processing of step 630). With this, the excess air ratio λ (associated with the first injection) at the post injection time t (accordingly, the crank angle CA) is obtained.

Next, the CPU 61 proceeds to step 740, and obtains the mass g of cylinder interior gas newly taken into the gas mixture during the minute time Δt (between post injection times (t−Δt) and t) (associated with the first injection) on the basis of the cylinder-interior-gas stoichiometric air-fuel ratio stoich obtained in the aforementioned step 555, the excess air ratio λ obtained in step 735, the excess air ratio previous value λb (at the present time point, "0" because of the processing of step 630; and at the next and subsequent times, the value set in step 785 to be described later), the i-th (first) injection quantity Q(i) set in step 540, and an equation corresponding to the above-described Equation (11).

Subsequently, the CPU 61 proceeds to step 745, and updates the gas-mixture forming cylinder interior gas mass G to a value obtained by adding the above-described mass g of the newly taken cylinder interior gas to the gas-mixture forming cylinder interior gas mass G at that time point (at the present time point, "0" because of the processing of step 635). With this, the gas-mixture forming cylinder interior gas mass G (associated with the first injection) at the post injection time t (accordingly, the crank angle CA) is obtained.

Next, the CPU 61 proceeds to step 750, and updates the gas mixture mass Mmix by adding the above-described mass g of the newly taken cylinder interior gas to the gas mixture mass Mmix at that time (at the present time point, the first injection quantity Q(1) because of the processing of step 655). With this, the gas mixture mass Mmix (associated with the first injection) at the post injection time t (accordingly, the crank angle CA) is obtained.

Subsequently, the CPU 61 proceeds to step 755, and sets the enthalpy Hpre of the gas mixture before occurrence of chemical reactions to a value obtained by adding the "thermal energy ΔHg=g·Cg·Tg of the above-described newly taken cylinder interior gas," which is obtained in accordance with the above-described Equation (10), to the enthalpy Hmix of the gas mixture at that time (at the present time point, the value "Q(1)·Cf·Tf" because of the processing of step 645).

Next, the CPU 61 proceeds to step 760, and obtains, in accordance with an equation corresponding to the above-described Equation (16), the temperature Tpre of the gas mixture before occurrence of chemical reactions by dividing the obtained enthalpy Hpre of the gas mixture before occurrence of chemical reactions by a value obtained by multiplying the gas mixture mass Mmix obtained in the above-described step 750 by the constant-pressure specific heat Cmix of the gas mixture at that time (at the present time point, the constant-pressure specific heat Cf of fuel because of the processing of step 650; and at the next and subsequent times, the value set in step 830 to be described later).

Next, the CPU 61 proceeds to step 765, and obtains the amount qr of fuel consumption stemming from chemical reactions occurring in the gas mixture during the minute time Δt (between post injection times (t−Δt) and t) on the basis of the gas mixture oxygen concentration [O2]mix at that time (at the present time point, "0" because of the processing of step 660; and at the next and subsequent times, the value set in step 820 to be described later), the gas mixture fuel concentration [Fuel]mix at that time (at the present time point, "0" because of the processing of step 660; and at the next and subsequent times, the value set in step 815 to be described later), the obtained temperature Tpre of the gas mixture before occurrence of chemical reactions, and the above-described Equation (15).

Subsequently, the CPU 61 proceeds to step 770, and obtains the reaction heat Hr generated through chemical reactions occurring in the gas mixture during the minute time Δt (between post injection times (t−Δt) and t) on the basis of the obtained fuel consumption amount qr and the above-described Equation (14). Further, in step 775 subsequent thereto, the CPU 61 updates the enthalpy Hmix of the gas mixture by setting it to a value obtained by adding the obtained reaction heat Hr to the enthalpy Hpre of the gas mixture before occurrence of chemical reactions. With this, the enthalpy Hmix of the gas mixture (associated with the first injection) at the post injection time t (accordingly, the crank angle CA) is obtained.

Then, the CPU 61 proceeds to step 780, and obtains the gas mixture temperature Tmix on the basis of the enthalpy Hmix of the gas mixture obtained in the above-described step 775, the gas mixture mass Mmix obtained in the above-described step 750, the constant-pressure specific heat Cmix of the gas mixture at that time (at the present time point, the constant-pressure specific heat Cf of fuel because of the processing of step 650; and at the next and subsequent times, the value set in step 830 to be described later), and the above-described Equation (7). With this, the gas mixture temperature Tmix (associated with the first injection) at a time point at which the post injection time t is equal to Δt (accordingly, the crank angle CA=CAinj(1)+ΔCA) is obtained. This step 780 corresponds to the gas-mixture-state estimation means.

Next, the CPU 61 proceeds to step 785, and, for preparation for calculation at the next time, sets the excess air ratio previous value λb to the value of the excess air ratio λ obtained in the above-described step 735. After time point in time, this value is used in the above-described step 735. In this manner, the gas mixture temperature Tmix (associated with the i-th (first) injection) at the post injection time t is calculated.

Figure 8:
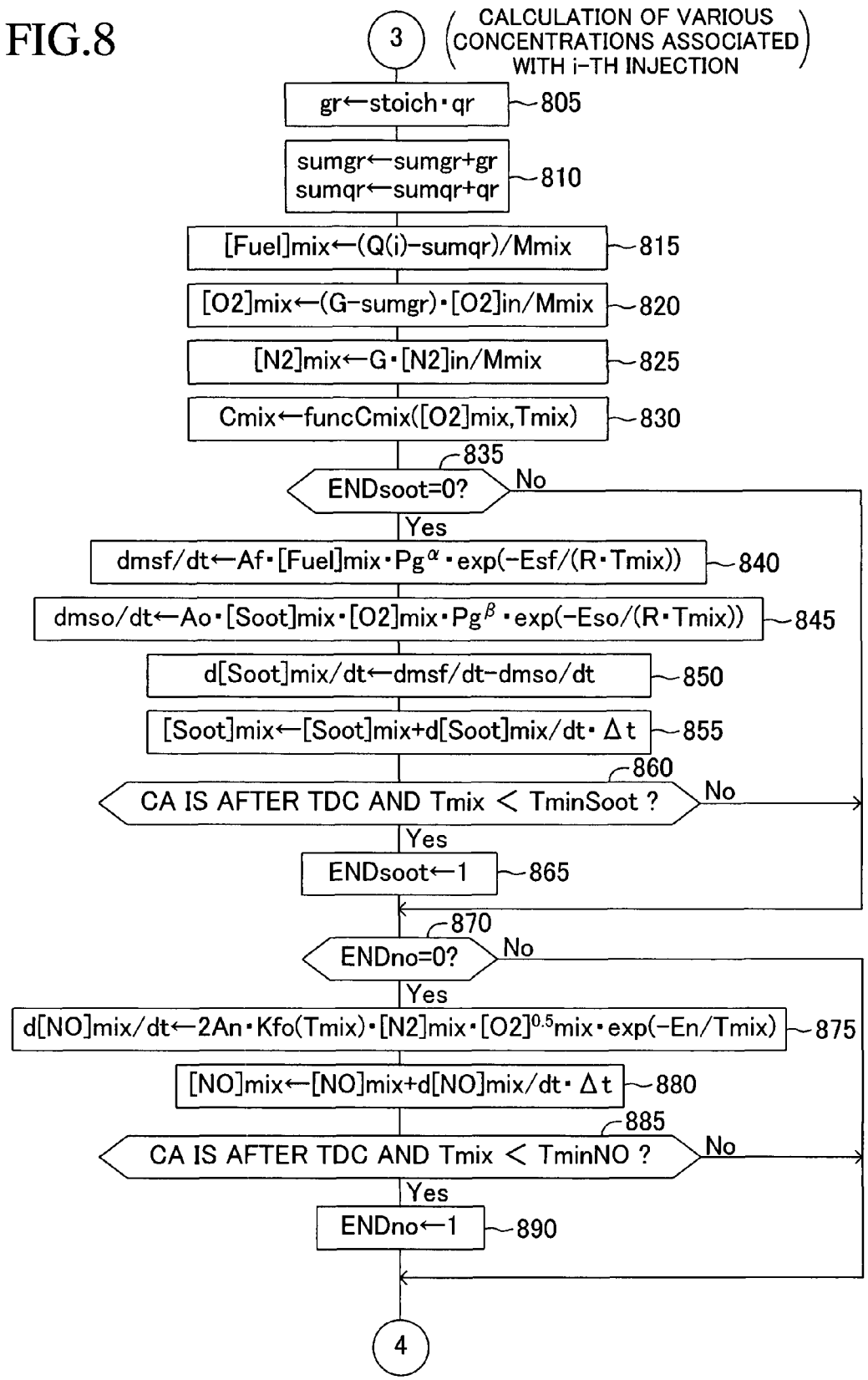
FIG. 8 is a flowchart showing a fourth portion of the routine which the CPU shown in FIG. 1 executes so as to calculate gas mixture temperature, etc., and emission amounts.

Next, the CPU 61 proceeds to the routine of FIG. 8, and starts the processing for calculating the various concentrations associated with the i-th (first) injection. Specifically, the CPU 61 first proceeds to step 805 so as to obtain the amount gr of cylinder interior gas consumed through chemical reactions occurring in the gas mixture during the minute time Δt (between post injection times (t−Δt) and t) on the basis of the amount qr of fuel consumed through chemical reactions occurring in the gas mixture during the minute time Δt (between post injection times (t−Δt) and t) obtained in the above-described step 765, the cylinder-interior-gas stoichiometric air-fuel ratio stoich obtained in the aforementioned step 555, and the above-described Equation (20).

Subsequently, the CPU 61 proceeds to step 810 so as to update the fuel-consumption-amount cumulative value sumqr (associated with the first injection) to a value obtained by adding the fuel consumption amount qr obtained in step 675 to the fuel-consumption-amount cumulative value sumqr at that time (at the present time point, "0" because of the processing of step 640), and update the cylinder-interior-gas-consumption-amount cumulative value sumgr (associated with the first injection) to a value obtained by adding the cylinder interior gas consumption amount gr obtained in step 805 to the cylinder-interior-gas-consumption-amount cumulative value sumgr at that time (at the present time point, "0" because of the processing of step 640). With this, the fuel-consumption-amount cumulative value sumqr and the cylinder-interior-gas-consumption-amount cumulative value sumgr (associated with the first injection) at the post injection time t (accordingly, the crank angle CA) are obtained.

Next, the CPU 61 proceeds to step 815, and obtains the gas mixture fuel concentration [Fuel]mix (associated with the first injection) at the post injection time t (accordingly, the crank angle CA) on the basis of the i-th (first) injection quantity Q(i) obtained in step 540, the obtained fuel-consumption-amount cumulative value sumqr, the gas mixture mass Mmix obtained in step 750, and an equation corresponding to the above-described Equation (19).

Next, the CPU 61 proceeds to step 820, and obtains the gas mixture oxygen concentration [O2]mix (associated with the first injection) at the post injection time t (accordingly, the crank angle CA) on the basis of the gas-mixture forming cylinder interior gas mass G obtained in step 745, the obtained cylinder-interior-gas-consumption-amount cumulative value sumgr, the intake air oxygen concentration [O2]in set in step 510, the gas mixture mass Mmix obtained in step 750, and the above-described Equation (21).

Subsequently, the CPU 61 proceeds to step 825, and obtains the gas mixture nitrogen concentration [N2]mix (associated with the first injection) at the post injection time t (accordingly, the crank angle CA) on the basis of the gas-mixture forming cylinder interior gas mass G obtained in step 745, the intake air nitrogen concentration [N2]in set in step 560, the gas mixture mass Mmix obtained in step 750, and the above-described Equation (22). These steps 815 to 825 also correspond to the gas-mixture-state estimation means.

Next, the CPU 61 proceeds to step 830, and obtains the constant-pressure specific heat Cmix of the gas mixture (associated with the first injection) at the post injection time t (accordingly, the crank angle CA) on the basis of the gas mixture oxygen concentration [O2]mix obtained in the above-described step 820, the gas mixture temperature Tmix obtained in step 780, and the above-described Equation (9). After this point in time, this value is used in steps 760 and 780.

The CPU 61 then proceeds to 835 so as to determine whether or not the value of the flag ENDsoot is "0." When the CPU 61 makes a "No" determination, it proceeds directly to step 870 without performing updating of the gas mixture soot concentration [Soot]mix to be described later (processing of integrating soot generation speed d[soot]mix/dt with respect to time (step 855)).

At the present time point, the value of the flag ENDsoot is set to "0" because of the processing of the aforementioned step 670. Accordingly, the CPU 61 makes a "Yes" determination in step 835, and proceeds to step 840 so as to obtain the formation speed dmsf/dt of soot on the basis of the gas mixture fuel concentration [Fuel]mix obtained in step 815, the cylinder interior gas pressure Pg obtained in step 715, the gas mixture temperature Tmix obtained in step 780, and the above-described Equation (24).

Subsequently, the CPU 61 proceeds to step 845 so as to obtain the oxidation speed dmso/dt of soot on the basis of the gas mixture soot concentration [Soot]mix at that time (at the present time point, "0" because of the processing of step 660; and the next and subsequent times, the value set in step 855 to be described later), and the gas mixture oxygen concentration [O2]mix obtained in step 820, the cylinder interior gas pressure Pg obtained in step 715, the gas mixture temperature Tmix obtained in step 780, and the above-described Equation (25).

Next, the CPU 61 proceeds to step 850 so as to obtain the soot generation speed d[soot]mix/dt on the basis of the obtained soot formation speed dmsf/dt, the obtained soot oxidation speed dmso/dt, and the above-described Equation (23), and then proceeds to step 855 so as to set or update the gas mixture soot concentration [Soot]mix to a value obtained by adding a value "d[Soot]mix/dt·$\Delta$t" (obtained by multiplying the obtained soot generation speed d[soot]mix/dt by the minute time $\Delta$t) to the gas mixture soot concentration [Soot] mix at that time (at the present time point, "0" because of the processing of step 660). With this, the gas mixture soot concentration [Soot]mix (associated with the first injection) at the time point at which the post injection time t is equal to $\Delta$t (accordingly, the crank angle CA=CAinj(1)+$\Delta$CA) is obtained. This step 855 corresponds to the emission-generation-amount estimation means.

Subsequently, the CPU 61 proceeds to step 860 so as to determine whither or not the crank angle CA is after compression top dead center (hereinafter referred to as "TDC") and the gas mixture temperature Tmix (associated with the first injection) at the post injection time t (accordingly, the crank angle CA), which is obtained in step 780, is lower than a soot reaction limit temperature TminSoot. Notably, the soot reaction limit temperature TminSoot refers to a temperature below which soot is hardly generated.

When the CPU 61 makes a "Yes" determination, it proceeds to step 865 and changes the value of the flag ENDsoot from "0" to "1." As a result, after this point in time, the CPU 61 makes a "No" determination when it proceeds to step 835, whereby the updating of the gas mixture soot concentration [Soot]mix (step 855) is not executed as described above. With this, unnecessary calculation associated with the updating of the gas mixture soot concentration [Soot]mix can be omitted, and the calculation load of the CPU 61 can be reduced.

Since the present time point is immediately after IVC, the present time is before TDC. Accordingly, the CPU 61 makes a "No" determination in step 860, and proceeds directly to step 870. That is, the value of the flag ENDsoot is maintained at "0."

When the CPU 61 proceeds to step 870, it determines whether or not the value of the flag ENDno is "0." When the CPU 61 makes a "No" determination, it proceeds directly to step 905 of FIG. 9 without performing updating of the gas mixture NO concentration [NO]mix to be described later (the processing of integrating NO generation speed d[NO]mix/dt with respect to time (step 880)).

At the present time point, the value of the flag ENDno is set to "0" because of the processing of the aforementioned step 670. Accordingly, the CPU 61 makes a "Yes" determination in step 870, and proceeds to step 875 so as to obtain the NO generation speed d[NO]mix/dt on the basis of the gas mixture nitrogen concentration [N2]mix obtained in step 825, the gas mixture oxygen concentration [O2]mix obtained in step 820, the gas mixture temperature Tmix obtained in step 780, and the above-described Equation (27).

Subsequently, the CPU 61 proceeds to step 880, and sets or updates the gas mixture NO concentration [NO]mix to a value obtained by adding a value "d[NO]mix/dt·$\Delta$t" (obtained by multiplying the obtained NO generation speed d[NO]mix/dt by the minute time $\Delta$t) to the gas mixture NO concentration [NO]mix at that time (at the present time point, "0" because of the processing of step 660). With this, the gas mixture NO concentration [NO]mix (associated with the first injection) at the time point at which the post injection time t is equal to $\Delta$t (accordingly, the crank angle CA=CAinj(1)+$\Delta$CA) is obtained. This step 880 also corresponds to the emission-generation-amount estimation means.

Subsequently, the CPU 61 proceeds to step 885 so as to determine whither or not the crank angle CA is after TDC and the gas mixture temperature Tmix (associated with the first injection) at the post injection time t (accordingly, the crank angle CA), which is obtained in step 780, is lower than an NO reaction limit temperature TminNO. Notably, the NO reaction limit temperature TminNO refers to a temperature below which NO is hardly generated.

When the CPU 61 makes a "Yes" determination, it proceeds to step 890 and changes the value of the flag ENDno from "0" to "1." As a result, after this point in time, the CPU 61 makes a "No" determination when it proceeds to step 870, whereby the updating of the gas mixture NO concentration [NO]mix (step 880) is not executed as described above. With this, unnecessary calculation associated with the updating of the gas mixture NO concentration [NO]mix can be omitted, and the calculation load of the CPU 61 can be reduced.

As in the above-described case, the present time point is immediately after IVC, and therefore the present time is before TDC. Accordingly, the CPU 61 makes a "No" determination in step 885, and proceeds directly to the routine of FIG. 9. That is, the value of the flag ENDno is maintained at "0." Through the above-described processing, there are calculated the excess air ratio λ of the gas mixture (first gas mixture), the state (temperature Tmix, etc.) of the first gas mixture, and the emission concentrations ([Soot]mix and [NO]mix) associated with the first gas mixture at the time point at which the post injection time t for i=1 (accordingly, associated with the first injection) is equal to Δt (the crank angle CA=CAinj(1)+ΔCA).

Figure 9:
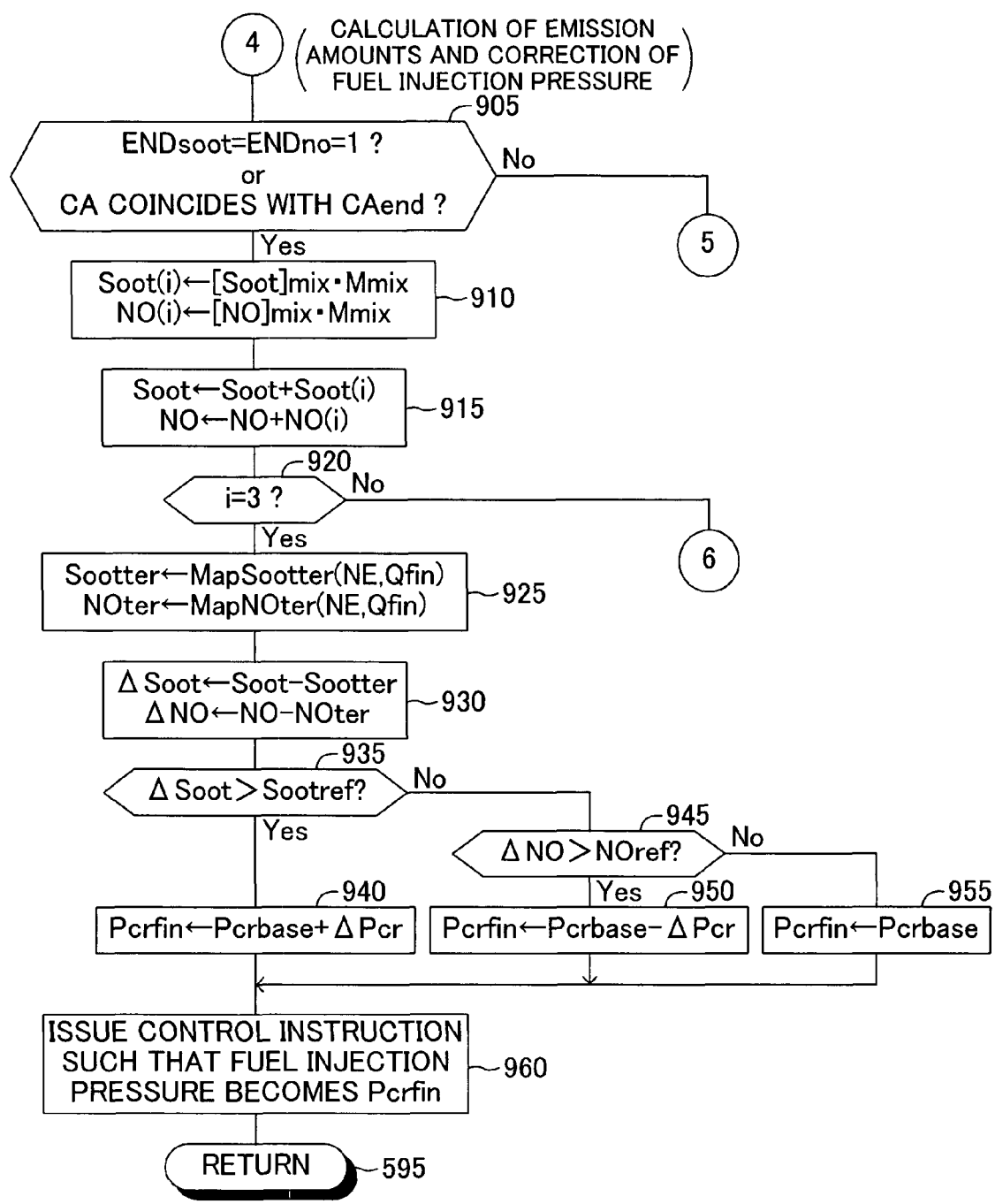
FIG. 9 is a flowchart showing a fifth portion of the routine which the CPU shown in FIG. 1 executes so as to calculate gas mixture temperature, etc., and emission amounts.

When the CPU 61 proceeds to step 905 of FIG. 9, it determines whether or not both the values of the flags ENDsoot and ENDno are "1" or the crank angle CA coincides with a predetermined end determination crank angle CAend, which is after TDC. At the present time point, as described above, both the values of the flags ENDsoot and ENDno are "0," and the crank angle CA is an angle obtained by adding the minute crank angle ΔCA to the crank angle CAinj(1) at the time of the first injection (accordingly, before TDC) and has not yet reached the end determination crank angle CAend.

Accordingly, at the present time point, the CPU 61 makes a "No" determination in step 905, and returns to step 705 of FIG. 7. In this case, the CPU 61 again executes the processing of step 710 of FIG. 7 to step 905 of FIG. 9 after updating the post injection time t (associated with the first injection) (at the present time point, "1·Δt") by increasing it by the minute time Δt, and updating the crank angle CA (associated with the first injection) (at the present time point, "CAinj(1)+·ΔCA") by increasing it by the minute crank angle ΔCA.

Through the above-described processing, there are calculated the excess air ratio λ of the gas mixture (first gas mixture) (see step 735), the state (temperature Tmix, etc.) of the first gas mixture (see step 780), and (so long as the values of the flags ENDsoot and ENDno are zero) the emission concentrations ([Soot]mix and [NO]mix) associated with the first gas mixture (see steps 855 and 880) at the time point at which the post injection time t for i=1 (accordingly, associated with the first injection) is equal to 2·Δt (the crank angle CA=CAinj (1)+2·ΔCA).

Every time a "No" determination is made in step 905 of FIG. 9, the processing of step 705 of FIG. 7 to step 905 of FIG. 9 is repeatedly executed. As a result, so long as a "No" determination is made in step 905 of FIG. 9, while the variable i is maintained at "1," the excess air ratio λ of first gas mixture, the state (temperature Tmix, etc.) of the first gas mixture, and (so long as the values of the flags ENDsoot and ENDno are zero) the emission concentrations ([Soot]mix and [NO]mix) associated with the first gas mixture are obtained for each minute time Δt from the time of the first injection (for each minute crank angle ΔCA from CAinj(1)).

When the above-described conditions of step 860 are satisfied as a result of the gas mixture temperature Tmix decreasing due to an increase in the cylinder interior volume during the expansion stroke after TDC or other causes, the value of the flag ENDsoot is changed from "0" to "1." After this point in time, the updating of the soot concentration [Soot]mix (step 855) is not executed as described above. Further, when the above-described conditions of step 885 are satisfied as a result of an increase in the cylinder interior volume during the expansion stroke after TDC or other causes, the value of the flag ENDno is changed from "0" to "1." After this point in time, the updating of the NO concentration [NO]mix (step 880) is not executed as described above.

When both the values of the flags ENDsoot and ENDno have become "1" or when the crank angle CA has reached the end determination crank angle CAend (even if both the values of the flags ENDsoot and ENDno have not yet become "1"), the CPU 61 makes a "Yes" determination when it proceeds to step 905 of FIG. 9, and proceeds to step 910 and steps subsequent thereto so as to perform processing for ending the calculation for the case where i=1 (accordingly, associated with the first injection).

That is, in step 910, the CPU 61 obtains the amount Soot(i) of soot generated in the i-th (first) gas mixture by multiplying the present gas mixture soot concentration [Soot]mix updated through the processing of the aforementioned step 855 by the present gas mixture mass Mmix updated in the aforementioned step 750, and obtains the amount NO(i) of NO generated in the i-th (first) gas mixture by multiplying the present gas mixture NO concentration [NO]mix updated through the processing of the aforementioned step 880 by the present gas mixture mass Mmix.

The CPU 61 then proceeds to step 915 so as to update the total soot generation amount Soot to a value (Soot0+Soot(1)) obtained by adding the obtained amount Soot(i) of soot generated in the i-th (first) gas mixture to the total soot generation amount Soot at that time (at the present time point, the initial value Soot0 because of the processing of step 570), and update the total NO generation amount NO to a value (NO0+ NO(1)) obtained by adding the obtained amount NO(i) of NO generated in the i-th (first) gas mixture to the total NO generation amount NO at that time (at the present time point, the initial value NO0 because of the processing of step 570). Through the above-described processing, the calculation for the first injection (accordingly, the first gas mixture) is completed.

Figure 6:
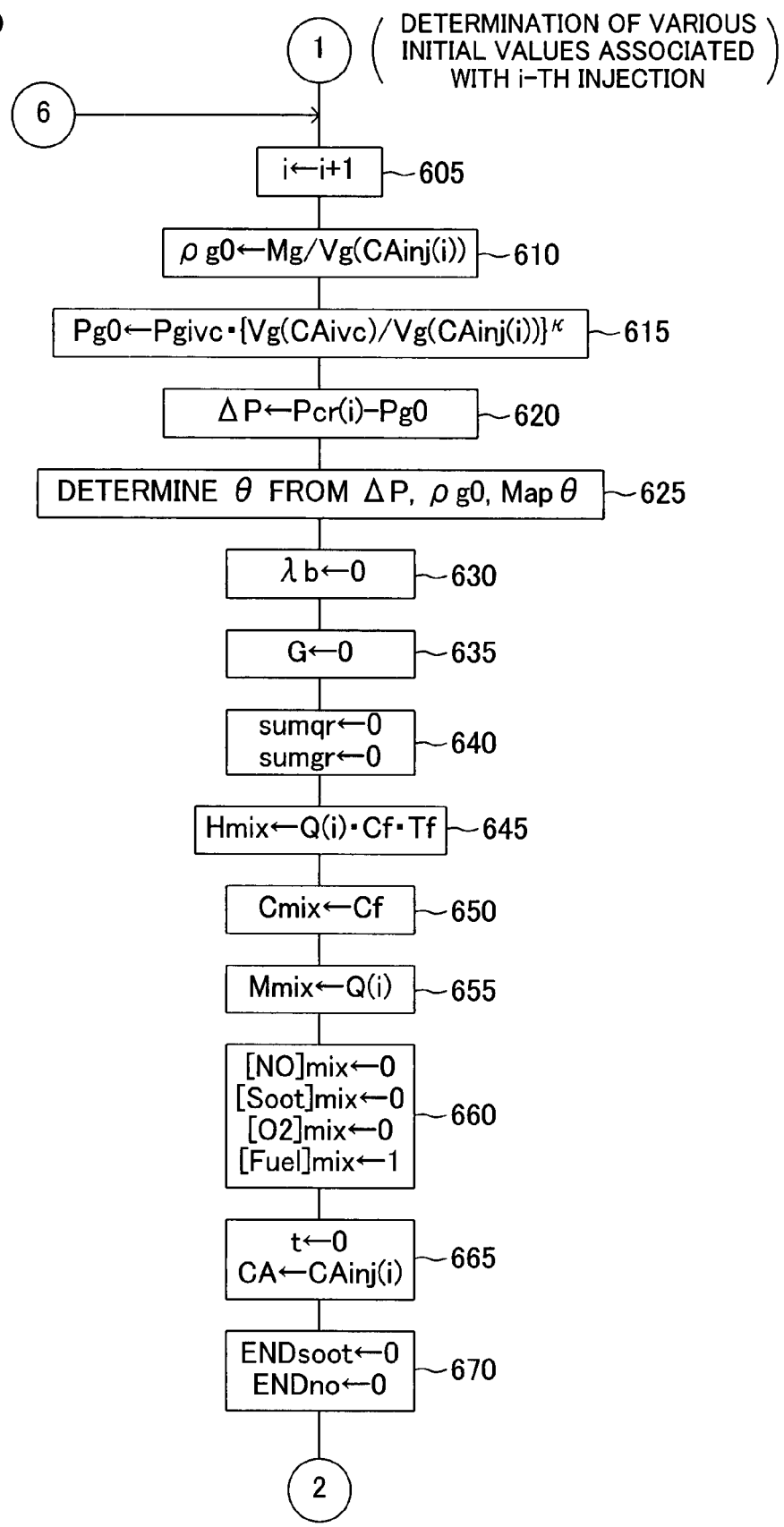
FIG. 6 is a flowchart showing a second portion of the routine which the CPU shown in FIG. 1 executes so as to calculate gas mixture temperature, etc., and emission amounts.

The CPU 61 then proceeds to step 920, and determines whether or not the value of the variable i is "3." Since the value of the variable i is 1 at the present time point, the CPU 61 makes a "No" determination in step 920, and returns to step 605 of FIG. 6 so as to increment the value of the variable i by "1." After this point in time, since the variable i is set to "2," calculation for the second injection (accordingly, the second gas mixture) is performed.

That is, first, the various initial values associated with the second injection are set in the above-described steps 610 to 670 of FIG. 6. Specifically, in step 610, the cylinder interior gas density ρg0 (at the time of the second injection) is obtained by making use of the cylinder interior volume Vg(CAinj(2)) at the time of the second injection obtained from the crank angle CAinj(2) at the time of the second injection obtained in the aforementioned step 545.

Subsequently, in step 615, the cylinder interior gas pressure Pg0 (at the time of the second injection) is obtained by making use of the cylinder interior volume Vg(CAinj(2)) at the time of the second injection. As a result, in step 620, the effective injection pressure ΔP (at the time of the second injection) is obtained by subtracting the above-described cylinder interior gas pressure Pg0 from the second injection pressure Pcr(2). In step 625 subsequent thereto, the spray angle θ (associated with the second injection) is obtained on the basis of the obtained effective injection pressure ΔP, the cylinder interior gas density ρg0, and the table Mapθ. With this, the spray angle θ is determined on the basis of the effective injection pressure ΔP and the cylinder interior gas density ρg0 at the time of the second injection (that is, the crank angle CAinj(2)).

Further, in step 645, the gas mixture enthalpy Hmix (associated with the second gas mixture) is set to an initial value (that is, the product of the second injection quantity Q(2) obtained in the aforementioned step 540, the constant-pressure specific heat Cf of fuel, and the fuel vapor temperature Tf obtained in the aforementioned step 550), and in step 655, the gas mixture mass Mmix (associated with the second gas mixture) is set to the second injection quantity Q(2) (initial value).

Then, in step 665, the post injection time t (associated with the second gas mixture) is set to an initial value "0," and the crank angle CA (associated with the second injection) is set to the crank angle CAinj(2) at the time of the second injection (initial value). With these settings, the post injection time t associated with the second gas mixture is counted from the time of the second injection.

Once the various initial values associated with the second injection are set in the steps 610 to 670 of FIG. 6, the above-described processing of step 705 of FIG. 7 to step 905 of FIG. 9 is then executed. As a result, so long as a "No" determination is made in step 905 of FIG. 9, while the variable i is maintained at 2, the excess air ratio λ of the second gas mixture, the state (temperature Tmix, etc.) of the second gas mixture, and (so long as the values of the flags ENDsoot and ENDno are zero) the emission concentrations ([Soot]mix and [NO]mix) associated with the second gas mixture are obtained for each minute time Δt from the time of the second injection (for each minute crank angle ΔCA from CAinj(2)).

When the above-described conditions of step 905 are satisfied, in step 910, the amount Soot(2) of soot generated in the second gas mixture and the amount NO(2) of NO generated in the second gas mixture are obtained. In step 915, the total soot generation amount Soot is updated to a value (Soot0+Soot(1)+Soot(2)) obtained by adding the obtained amount Soot(2) of soot generated in the second gas mixture to the total soot generation amount (Soot0+Soot(1)) at the present time point, and the total NO generation amount NO is updated to a value (NO0+NO(1)+NO(2)) obtained by adding the obtained amount NO(2) of NO generated in the second gas mixture to the total NO generation amount (NO+NO(1)) at the present time point. Through the above-described processing, the calculation for the second injection (accordingly, the second gas mixture) is completed.

In step 920, the determination as whether or not the value of the variable i is "3" is performed. Since the value of the variable i is 2 at the present time point, a "No" determination in made, and the processing returns to step 605 of FIG. 6, whereby the value of the variable i is incremented by "1." After this point in time, since the variable i is set to "3," calculation for the third injection (accordingly, the third gas mixture) is performed.

That is, first, the various initial values associated with the third injection are set in the above-described steps 610 to 670 of FIG. 6. Specifically, in steps 610 to 625, the spray angle θ (associated with the third injection) is determined on the basis of the effective injection pressure ΔP and the cylinder interior gas density ρg0 at the time of the third injection (that is, the crank angle CAinj(3)).

Further, in step 645, the gas mixture enthalpy Hmix (associated with the third gas mixture) is set to an initial value (that is, the product of the third injection quantity Q(3) obtained in the aforementioned step 540, the constant-pressure specific heat Cf of fuel, and the fuel vapor temperature Tf obtained in the aforementioned step 550), and in step 655, the gas mixture mass Mmix (associated with the third gas mixture) is set to the third injection quantity Q(3) (initial value).

Then, in step 665, the post injection time t (associated with the third gas mixture) is set to an initial value "0," and the crank angle CA (associated with the third injection) is set to the crank angle CAinj(3) at the time of the third injection (initial value). With these settings, the post injection time t associated with the third gas mixture is counted from the time of the third injection.

Once the various initial values associated with the third injection are set in the steps 610 to 670 of FIG. 6, the above-described processing of step 705 of FIG. 7 to step 905 of FIG. 9 is then executed. As a result, so long as a "No" determination is made in step 905 of FIG. 9, while the variable i is maintained at 3, the excess air ratio λ of the third gas mixture, the state (temperature Tmix, etc.) of the third gas mixture, and (so long as the values of the flags ENDsoot and ENDno are zero) the emission concentrations ([Soot]mix and [NO]mix) associated with the third gas mixture are obtained for each minute time Δt from the time of the third injection (for each minute crank angle ΔCA from CAinj(3)).

When the above-described conditions of step 905 are satisfied, in step 910, the amount Soot(3) of soot generated in the third gas mixture and the amount NO(3) of NO generated in the third gas mixture are obtained. In step 915, the total soot generation amount Soot is updated to a value (Soot0+Soot(1)+Soot(2)+Soot(3)) obtained by adding the obtained amount Soot(3) of soot generated in the third gas mixture to the total soot generation amount (Soot0+Soot(1)+Soot(2)) at the present time point, and the total NO generation amount NO is updated to a value (NO0+NO(1)+NO(2)+NO(3)) obtained by adding the obtained amount NO(3) of NO generated in the third gas mixture to the total NO generation amount (NO+NO(1)+NO(2)) at the present time point.

Through the above-described processing, the calculation for the third injection (accordingly, the third gas mixture) is completed. Further, through the above-described processing, the total soot generation amount Soot is obtained as the sum of the amounts of soot generated in the respective gas mixtures, and the total NO generation amount NO is obtained as the sum of the amounts of NO generated in the respective gas mixtures. That is, estimation of the emission generation amounts is completed. The CPU 61 completes the above-described estimation of the gas mixture state and the emission generation amounts immediately after IVC (that is, a time point before the fuel injection start timing CAinj).

Then, in step 920, the determination as to whether the value of the variable i is "3" is made. Since the value of the variable i is 3 at the present time point, a "Yes" determination is made. In this case, the CPU 61 proceeds to step 925, and obtains a target soot generation amount Sootter and a target NO generation amount NOter on the basis of the engine speed NE at the present time point (i.e., a time point immediately after IVC), the instruction fuel injection quantity Qfin determined in the above-described step 520, and tables MapSootter and MapNOter.

Next, the CPU 61 proceeds to 930 so as to set a soot generation amount deviation Δsoot to a value obtained by subtracting the obtained target soot generation amount Sootter from the total soot generation amount Soot obtained in step 915 and set an NO generation amount deviation ΔNO to a value obtained by subtracting the obtained target NO generation amount NOter from the total NO generation amount NO obtained in step 915.

Subsequently, the CPU 61 proceeds to 935 so as to determine whether or not the obtained soot generation amount deviation Δsoot is greater than a reference value Sootref.

When the CPU 61 makes a "Yes" determination, it proceeds to step 940 so as to set a final fuel injection pressure Pcrfin to a value obtained by adding a predetermined value ΔPcr to the base fuel injection pressure Pcrbase determined in the above-described step 530. With this, the fuel injection pressure is corrected such that the soot generation amount decreases.

Meanwhile, when the CPU 61 makes a "No" determination in step 935, it proceeds to step 945 so as to determine whether or not the obtained NO generation amount deviation ΔNO is greater than a reference value NOref. When the CPU 61 makes a "Yes" determination, it proceeds to step 950 so as to set the final fuel injection pressure Pcrfin to a value obtained by subtracting the predetermined value ΔPcr from the base fuel injection pressure Pcrbase determined in the above-described step 530. With this, the fuel injection pressure is corrected such that the NO generation amount decreases.

Meanwhile, when the CPU 61 makes a "No" determination in step 945 (i.e., when ΔSoot≦Sootref and ΔNO≦NOref), it proceeds to step 955 so as to set the final fuel injection pressure Pcrfin to a value equal to the base fuel injection pressure Pcrbase determined in the above-described step 530. That is, in this case, the fuel injection pressure is not corrected.

When the CPU 61 proceeds to step 960, it issues a control instruction to the fuel injection pump 22 (a drive circuit therefor) such that the fuel injection pressure becomes equal to the set final fuel injection pressure Pcrfin. The CPU 61 then proceeds to step 595, and ends the current execution of the series of routines of FIGS. 5 to 9. After this point in time, the CPU 61 makes a "No" determination every time it proceeds to step 505 until the next IVC comes.

As a result, through execution of the present routine, every time IVC comes, the conditions (injection amount, injection pressure, and injection timing) of fuel injection are determined; the gas mixture state and the total emission generation amounts are immediately estimated; and the injection pressure is corrected on the basis of the results of the estimation of the total emission generation amounts.

Figure 13:
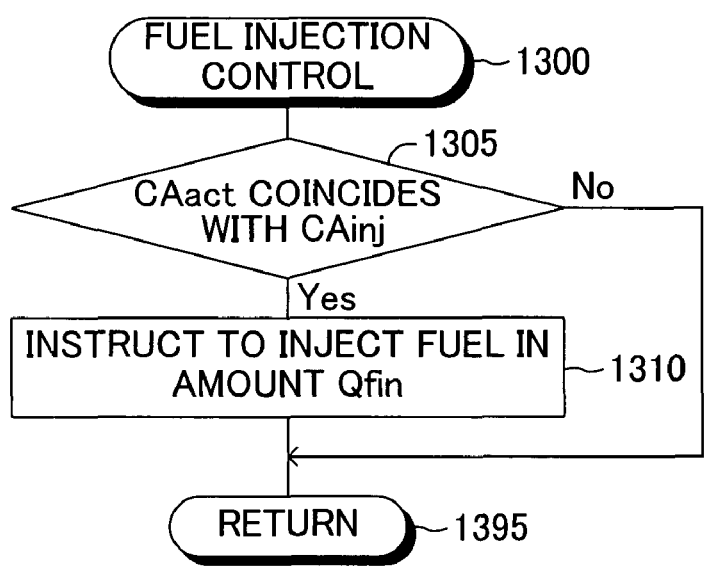
FIG. 13 is a flowchart showing a routine which the CPU shown in FIG. 1 executes so as to perform fuel injection control.

Further, the CPU 61 repeatedly executes, at predetermined intervals and for each cylinder, a routine shown by a flowchart in FIG. 13 and adapted to perform fuel injection control. Therefore, when a predetermined timing has been reached, the CPU 61 starts the processing from step 1300, and then proceeds to step 1305 so as to determine whether or not the actual crank angle CAact has coincided with the fuel injection start timing CAinj determined in the aforementioned step 525. When the CPU 61 makes a "No" determination, it proceeds directly to step 1395 and ends the current execution of the present routine.

Here, it is assumed that the actual crank angle CAact has coincided with the fuel injection start timing CAinj. In this case, the CPU 61 proceeds to step 1310, and instructs the corresponding fuel injection valve 21 to inject fuel of the instruction fuel injection quantity Qfin determined in step 520 (specifically, to open over the fuel injection period TAU). Subsequently, the CPU 61 proceeds to step 1395 and ends the current execution of the present routine. With this processing, the fuel of the instruction fuel injection quantity Qfin is injected under the final fuel injection pressure Pcrfin set in one of the aforementioned steps 940, 950, and 955.

As described above, according to the first embodiment of the gas-mixture-state estimation apparatus and the emission-generation-amount estimation apparatus of the present invention, the injection period TAU is equally divided into three periods; i.e., the "front ⅓ TAU period," the "intermediate ⅓ TAU period," and the "rear ⅓ TAU period"; and it is assumed that the first injection (mass Q(1)) corresponding to the "front ⅓ TAU period" is performed at one time at the fuel injection start timing CAinj, the second injection (mass Q(2)) corresponding to the "intermediate ⅓ TAU period" is performed at one time after a period of ⅓ TAU elapses after the first injection, and the third injection (mass Q(3)) corresponding to the "rear ⅓ TAU period" is performed at one time after a period of ⅓ TAU elapses after the second injection. Thus, "three gas mixtures"; i.e., a first gas mixture based on the first injection, a second gas mixture based on the second injection, and a third gas mixture based on the third injection, are individually handled; and for each gas mixture, the excess air ratio λ (a value representing the degree of mixing of cylinder interior gas with the gas mixture) of the gas mixture, the state (temperature Tmix, etc.) of the gas mixture, and the amount of emission (soot and NO) generated in the gas mixture, which correspond to the post injection time t, are individually estimated.

Thus, the gas mixture state and the emission generation amounts can be individually estimated in consideration of difference between the gas mixtures in terms of the excess air ratio λ corresponding to the post injection time t, the state (temperature Tg, density ρg, etc.) of cylinder interior gas corresponding to the post injection time t, and the effective injection pressure ΔP and the cylinder interior gas density ρg0 (accordingly, the spray angle θ) at the time of injection. Then, the total emission generation amounts (specifically, the total soot generation amount Soot and the total NO generation amount NO) are estimated by summing the emission amount estimated for each gas mixture. Thus, the total emission generation amounts can be accurately estimated in consideration of the above-described non-uniformity of the gas mixture and non-uniformity of the emission generation amounts.

The present invention is not limited to the above-described first embodiment, and various modifications can be employed within the scope of the present invention. For example, in the first embodiment, the injection fuel (accordingly, the gas mixture) is divided into three portions irrespective of the instruction fuel injection quantity Qfin (accordingly, the fuel injection period TAU). However, the number of portions to which the injection fuel (accordingly, the gas mixture) is divided may be changed in accordance with the instruction fuel injection quantity Qfin. In this case, preferably, the number of the portions is increased with the instruction fuel injection quantity Qfin.

Further, in the first embodiment, the injection period TAU is equally divided into a plurality of periods. However, the injection period TAU may be divided into a plurality of periods such that the fuel injection quantities corresponding to the periods become equal to one another. In this case, the plurality of periods become non-uniform.

Moreover, in the first embodiment, not only ignition reaction (hot flame reaction) and low-temperature oxidation reaction (cool flame reaction) but also various other chemical reactions are contained in chemical reactions relating to the fuel consumption amount qr calculated by the above-described Equation (15) (step 765 of FIG. 7). However, in consideration of the fact that the fuel consumption amount associated with the other chemical reactions is considerably small as compared with the ignition reaction and the low-temperature oxidation reaction, only the ignition reaction and the low-temperature oxidation reaction may be handled as the chemical reactions relating to the fuel consumption amount qr.

In this case, the function funcqr for obtaining the fuel consumption amount qr is configured to output the amount of fuel consumed through the low-temperature oxidation reaction when the pre-chemical-reaction gas mixture temperature Tpre is within a temperature range in which the low-temperature oxidation reaction occurs, output the amount of fuel consumed through the ignition reaction when the pre-chemical-reaction gas mixture temperature Tpre is within a temperature range in which the ignition reaction occurs, and output "0" when the pre-chemical-reaction gas mixture temperature Tpre does not fall within these temperature ranges.

The above-described first embodiment is configured such that the processing of integrating the emission generation speed with respect to time is ended so as to reduce the calculation load of the CPU 61 when the crank angle CA is after TDC and the gas mixture temperature Tmix becomes lower than the reaction limit temperature of the emission. However, in addition thereto, the processing of integrating the emission generation speed with respect to time may be prevented from being performed before the crank angle CA reaches TDC and the gas mixture temperature Tmix exceeds the reaction limit temperature of the emission. Thus, unnecessary calculation associated with the calculation of the emission generation amounts can be omitted, whereby the calculation load of the CPU 61 can be reduced further.

Second Embodiment

Next, there will be described an emission-generation-amount estimation apparatus which includes a gas-mixture-state estimation apparatus for an internal combustion engine according to a second embodiment of the present invention. This second embodiment differs from the first embodiment in the point that a case where a gas mixture ignites in the middle of the fuel injection period TAU is supposed, and the injection fuel is divided into a portion injected before ignition of the gas mixture and a portion injected after ignition of the gas mixture. Accordingly, this point of difference will be mainly described below.

(Division of Injection Fuel and Division of Gas Mixture in Second Embodiment)

When the fuel injection period TAU is relatively long, a gas mixture advancing within a combustion chamber ignites in the middle of the fuel injection period TAU (i.e., in a period in which fuel injection continues) in many cases. In such a case, since a gas mixture formed on the basis of fuel injected before ignition (hereinafter referred to as the "gas mixture based on pre-ignition injection") has a relatively long time from injection to ignition, it has already dispersed sufficiently at the time of ignition. Accordingly, pre-mixture-like combustion, which is similar to pre-mixture compression ignition combustion, becomes predominant in many cases.

Meanwhile, since a gas mixture formed on the basis of fuel injected after ignition (hereinafter referred to as the "gas mixture based on post-ignition injection") ignites immediately after the injection, it ignites while dispersing in a state in which the gas mixture has not yet dispersed sufficiently. Accordingly, diffusion-like combustion, which is similar to diffusion combustion, becomes predominant in many The pre-mixture-like combustion differs from the diffusion-like combustion in reaction speed (combustion speed) of fuel. That is, in the pre-mixture-like combustion, since ignition occurs in a state where fuel and oxygen have been mixed sufficiently, a sufficient amount of oxygen which easily reacts with fuel can exist. As a result, the reaction speed (combustion speed) of fuel becomes relatively large.

Meanwhile, in the diffusion-like combustion, since ignition occurs in a state where fuel and oxygen have not yet been mixed sufficiently, oxygen which easily reacts with fuel becomes scarce. As a result, the reaction speed (combustion speed) of fuel becomes relatively small.

Moreover, the difference in the reaction speed (combustion speed) of fuel results in a difference in the fuel consumption amount qr (accordingly, the reaction heat Hr) associated with chemical reactions occurring in the gas mixture during the minute time $\Delta t$, which is presented by the above-described Equation (15). That is, the gas mixture based on pre-ignition injection and the gas mixture based on post-ignition injection differs in the fuel consumption amount qr although they are the same in terms of the gas mixture oxygen concentration [O2]mix, the gas mixture fuel concentration [Fuel]mix, and the gas mixture temperature Tmix, which are arguments of the function funcqr of the above-described Equation (15).

In order to accurately estimate the gas mixture state and the emission generation amounts in consideration of a difference in the fuel consumption amount qr (accordingly, the reaction heat Hr) between the gas mixture based on pre-ignition injection and the gas mixture based on post-ignition injection, the following measures may be employed. The function funcqr corresponding to the above-described Equation (15) is replaced with two corresponding functions; i.e., a function funcqrpre for the gas mixture based on pre-ignition injection and a function funcqrpost for the gas mixture based on post-ignition injection; and the injection fuel is divided into a portion injected before ignition of the gas mixture and a portion injected after ignition of the gas mixture. Then, the state of the gas mixture based on pre-ignition injection is estimated on the bases of the fuel consumption amount qr obtained by making use of the function funcqrpre for the gas mixture based on pre-ignition injection; and the state of the gas mixture based on post-ignition injection is estimated on the bases of the fuel consumption amount qr obtained by making use of the function funcqrpost for the gas mixture based on post-ignition injection.

Figure 14:
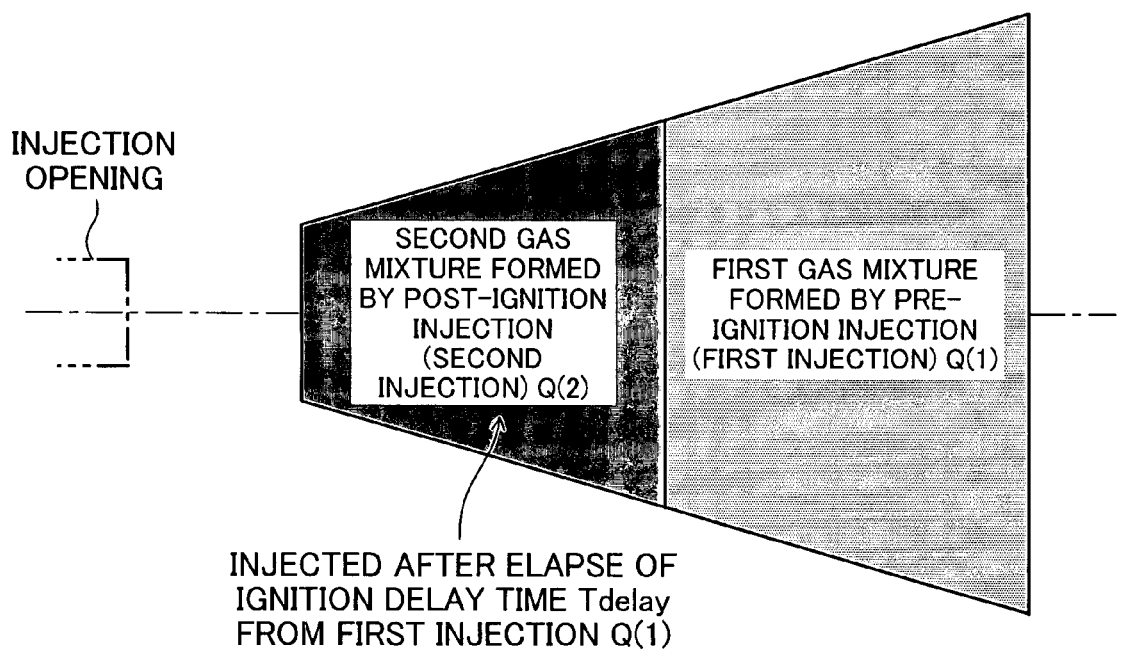
FIG. 14 is an illustration schematically showing the states of gas mixtures respectively formed by portions of fuel, which are successively injected in two periods; i.e., pre-ignition and post-ignition periods, of an injection period.

Therefore, in the second embodiment, an ignition delay time (time between start of injection and ignition) Tdelay is estimated. Further, as shown in FIG. 14, the injection period TAU is divided into two periods; i.e., a "front Tdelay period" and a "rear (TAU-Tdelay) period," and fuel of Q(1) and fuel of Q(2) are assumed to be successively and individually injected in the front Tdelay period and the rear (TAU-Tdelay) period, respectively. Estimation of the ignition delay time Tdelay will be described later.

More specifically, it is assumed that fuel of mass Q(1) for the injection period "front Tdelay period" associated with the pre-ignition injection (first injection) is injected at one time at the fuel injection start timing CAinj; and fuel of mass Q(2) for the injection period "rear (TAU-Tdelay) period" associated with the post-ignition injection (second injection) is injected at one time when Tdelay has elapsed after the pre-ignition injection. Notably, a relation "Q(1)+Q(2)=Qfin" stands.

In the second embodiment, when the state of the gas mixture based on pre-ignition injection (first gas mixture) is obtained, the fuel consumption amount qr obtained by making use of the function funcqrpre for the gas mixture based on pre-ignition injection is used; and when the state of the gas mixture based on post-ignition injection (second gas mixture) is obtained, the fuel consumption amount qr obtained by making use of the function funcqrpost for the gas mixture based on post-ignition injection is used.

Further, in the second embodiment, the gas mixture based on pre-ignition injection and the gas mixture based on post-ignition injection are individually handled, and for each gas mixture, the state (temperature Tmix, etc.) of the gas mixture and the emission generation amounts are individually estimated in a manner similar to that in the above-described first embodiment. In the second embodiment, the emission generation amounts estimated for the two gas mixtures are summed up so as to estimate the total emission generation amounts (specifically, total soot generation amount Soot and total NO generation amount NO).

With this procedure, the gas mixture state and the emission generation amounts are individually estimated in consideration of the difference in the fuel consumption amount qr (accordingly, reaction heat Hr) between the gas mixtures, in addition to the difference between the gas mixtures in terms of the state (temperature Tg, density ρg, etc.) of cylinder interior gas, which corresponds to the time elapsed after injection, and the effective injection pressure ΔP and the cylinder interior gas density ρg0 (accordingly, the spray angle θ) at the time of injection. Thus, the total emission generation amounts can be accurately estimated in consideration of the difference in the fuel consumption amount qr (accordingly, reaction heat Hr) in addition to the above-described non-uniformity of the gas mixture and non-uniformity of the emission generation amounts.

(Actual Operation of Second Embodiment)

Next, there will be described actual operation of the emission-generation-amount estimation apparatus including the gas-mixture-state estimation apparatus according to the second embodiment. Of the routines shown in FIGS. 5 to 9 and FIG. 13 and executed by the CPU 61 of the first embodiment, the CPU 61 of this apparatus executes the routines of FIGS. 6, 8, and 13 as they are, and the routines of FIGS. 5, 7, and 9 with partial changes as described below. Hereinafter, the changed portions of the routines of FIGS. 5, 7, and 9 will be mainly described.

Figure 5:
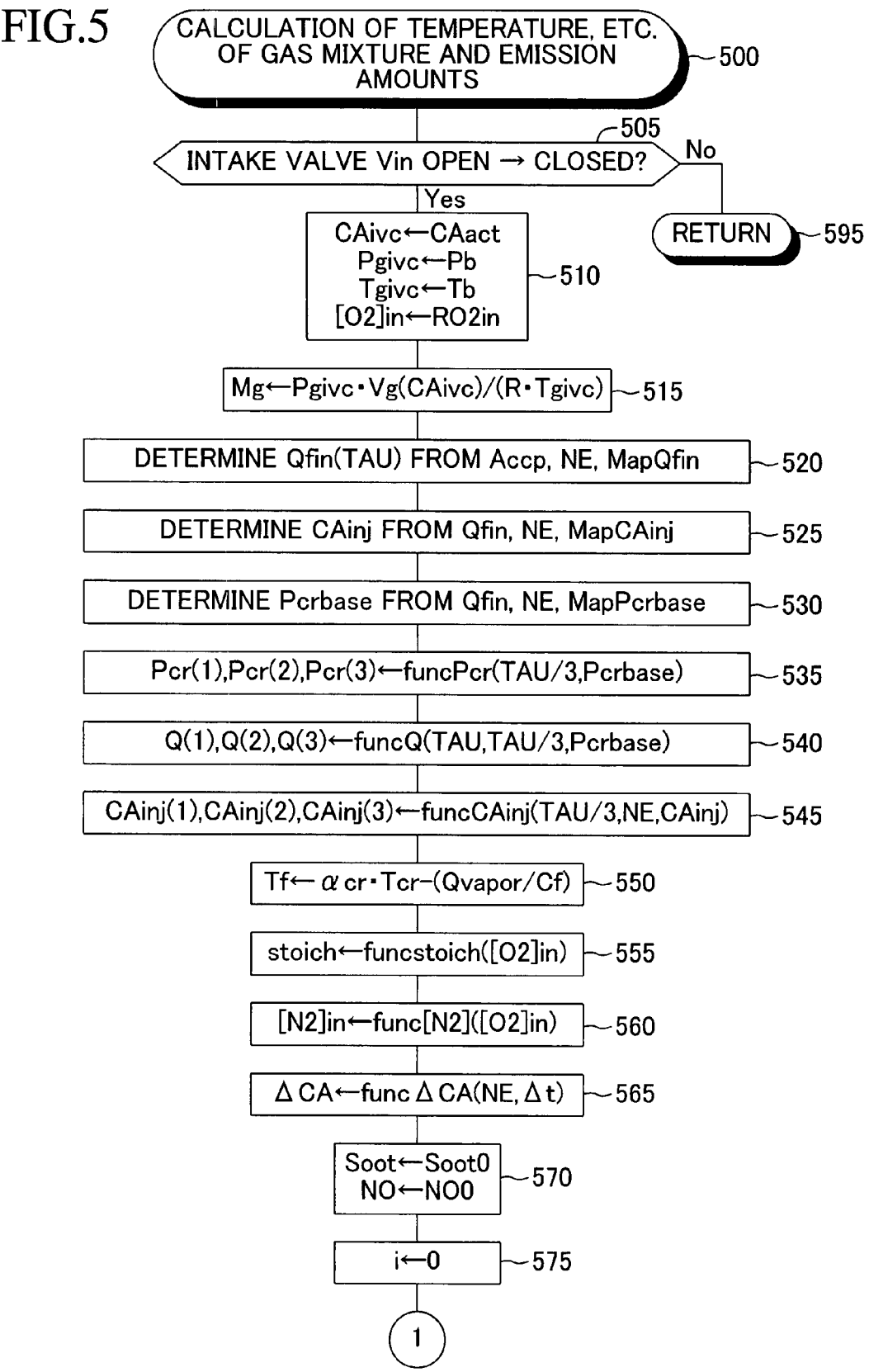
FIG. 5 is a flowchart showing a first portion of a routine which the CPU shown in FIG. 1 executes so as to calculate gas mixture temperature, etc., and emission amounts.
Figure 15:
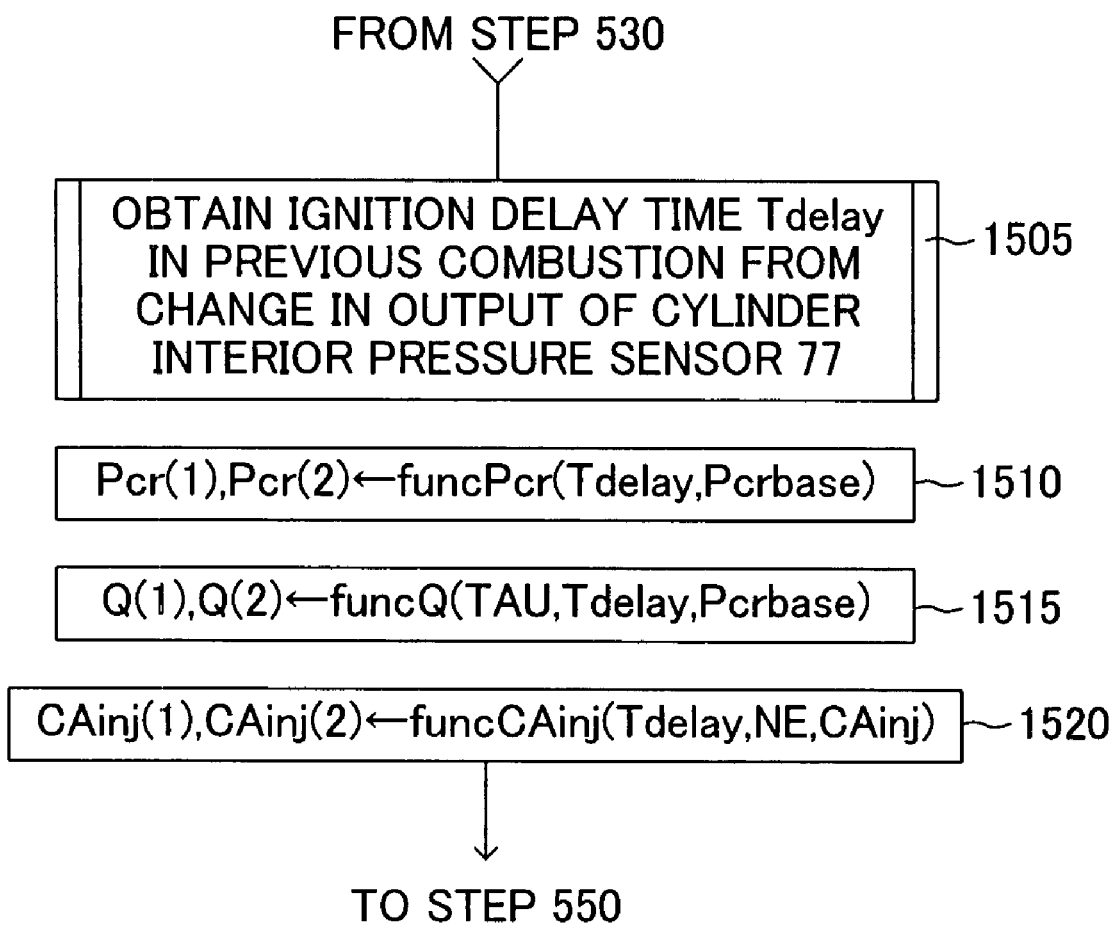
FIG. 15 is a flowchart showing steps which a CPU of a second embodiment performs when it executes the routine shown in FIG. 5, the steps being a portion different from the routine shown in FIG. 5.

The CPU 61 of the second embodiment executes steps 1505 to 1520 shown in FIG. 15 in place of steps 535 to 545 of the routine shown in FIG. 5. That is, when the CPU 61 proceeds from step 530 to step 1505, from a change in the output of the cylinder interior pressure sensor 77 of a cylinder in which combustion occurred in the pass nearest to the present time point, the CPU 61 obtains an ignition delay time associated with that combustion, and stores it as an ignition delay time Tdelay associated with combustion at this time.

Here, the ignition delay time (time from start of injection to ignition) can be obtained on the basis of the fact that the cylinder interior pressure sharply increases at a time point at which ignition occurs; i.e., by specifying the time of ignition from a change in the output of the cylinder interior pressure sensor 77. The reason why the thus-obtained ignition delay is stored as the ignition delay time Tdelay associated with combustion at this time is that the ignition delay time Tdelay associated with combustion at this time is predicted to be close to the ignition delay time associated with combustion occurred in the pass nearest to the present time point.

Next, the CPU 61 proceeds to step 1510, and obtains respective fuel injection pressures Pcr(1) and Pcr(2) for the first injection (pre-ignition injection) and the second injection (post-ignition injection) from the obtained ignition delay time Tdelay, the base fuel injection pressure Pcrbase obtained in step 530 of FIG. 5, and the above-described function funcPcr. As described above, it is assumed that the pre-ignition injection (mass Q(1)) is performed at one time at the fuel injection start timing CAinj, and the post-ignition injection (mass Q(2)) is performed at one time when the ignition delay time Tdelay has elapsed after the pre-ignition injection. Therefore, as in the case of the first embodiment, the fuel injection pressures Pcr(1) for the pre-ignition injection is set to a value equal to the base fuel injection pressure Pcrbase, and the fuel injection pressures Pcr(2) for the post-ignition injection is set to a value which is lower than the base fuel injection pressure Pcrbase by a predetermined amount.

Subsequently, the CPU 61 proceeds to step 1515, and obtains fuel quantities (masses) Q(1) and Q(2) for the pre-ignition injection and the post-ignition injection from the fuel injection period TAU obtained in step 520 of FIG. 5, the ignition delay time Tdelay, the above-described base fuel injection pressure Pcrbase, and the above-described function funcQ. With this processing, the fuel quantities (masses) Q(1) and Q(2) are set such that the relation "Qfin=Q(1)+Q(2)" stands, as described above. This step 1515 corresponds to the injection fuel dividing means.

Next, the CPU 61 proceeds to step 1520, and obtains crank angles CAinj(1) and CAinj(2) at respective injection timings of the pre-ignition injection and the post-ignition injection from the above-described ignition delay time Tdelay, the present engine speed NE, the fuel injection start timing CAinj determined in step 525 of FIG. 5, and the above-described function funcCAinj. With this processing, the crank angle CAinj(1) at the time of the pre-ignition injection is set to a value corresponding to the fuel injection start timing CAinj, and the crank angle CAinj(2) at the time of the post-ignition injection is set to a value corresponding to a time point lagging the fuel injection start timing CAinj (accordingly, the time of the pre-ignition injection) by the ignition delay time Tdelay. The CUP 61 then proceeds to step 550 of FIG. 5.

As can be understood from the above, the processing of steps 1505 and 1520 means that the variable i=1 corresponds to the pre-ignition injection (accordingly, the gas mixture based on pre-ignition injection), and the variable i=2 corresponds to the post-ignition injection (accordingly, the gas mixture based on post-ignition injection).

Figure 16:
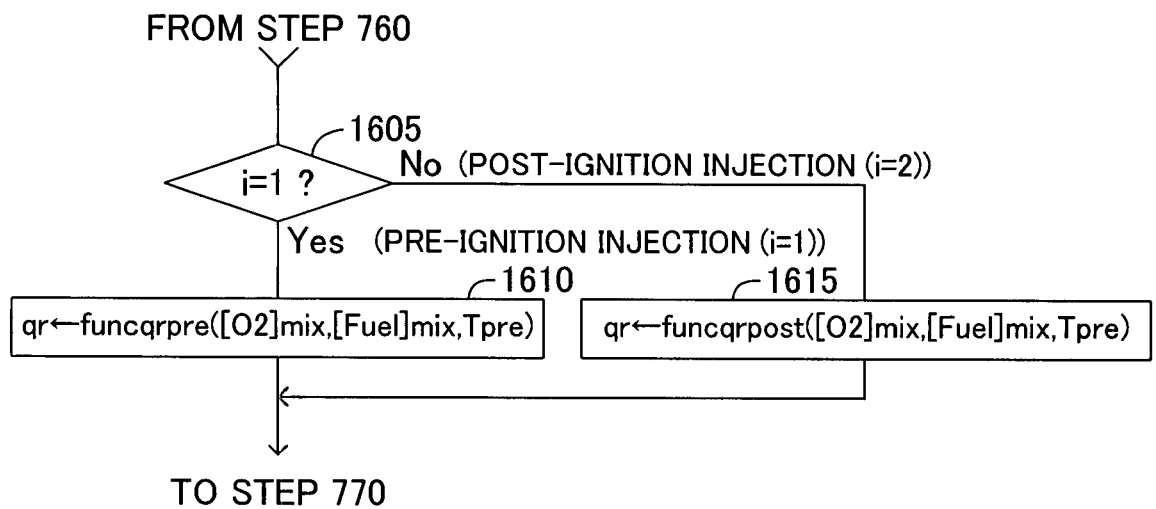
FIG. 16 is a flowchart showing steps which the CPU of the second embodiment performs when it executes the routine shown in FIG. 7, the steps being a portion different from the routine shown in FIG. 7.

Further, the CPU 61 of the second embodiment executes steps 1605 to 1615 shown in FIG. 16 in place of step 765 of the routine shown in FIG. 7. That is, when the CPU 61 proceeds from step 760 to step 1605, it determines whether or not the value of the variable i is "1."

Here, it is assumed that the variable i=1 (that is, calculation associated with the pre-ignition injection is being performed). In this case, the CPU 61 makes a "Yes" determination in step 1605, and proceeds to step 1610 so as to obtain the amount qr of fuel consumed through chemical reactions occurring in the gas mixture during the minute time Δt (between post injection times (t−Δt) and t) on the basis of the gas mixture oxygen concentration [O2]mix at that time, the gas mixture fuel concentration [Fuel]mix at that time, the temperature Tpre of the gas mixture before occurrence of chemical reactions obtained in step 760 of FIG. 7, and a function Funcqrpre for the gas mixture based on pre-ignition injection corresponding to the above-described Equation (15).

Meanwhile, it is assumed that the variable i=2 (that is, calculation associated with the post-ignition injection is being performed). In this case, the CPU 61 makes a "No" determination in step 1605, and proceeds to step 1615 so as to obtain the amount qr of fuel consumed through chemical reactions occurring in the gas mixture during the minute time Δt (between post injection times (t−Δt) and t) on the basis of the gas mixture oxygen concentration [O2]mix at that time, the gas mixture fuel concentration [Fuel]mix at that time, the temperature Tpre of the gas mixture before occurrence of chemical reactions obtained in step 760 of FIG. 7, and a function Funcqrpost for the gas mixture based on post-ignition injection corresponding to the above-described Equation (15). The CPU 61 then proceeds to step 770 of FIG. 7.

Figure 17:
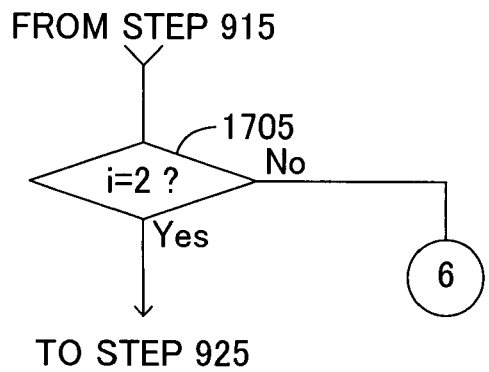
FIG. 17 is a flowchart showing steps which the CPU of the second embodiment performs when it executes the routine shown in FIG. 9, the steps being a portion different from the routine shown in FIG. 9.

Further, the CPU 61 of the second embodiment executes step 1705 shown in FIG. 17 in place of step 920 of the routine shown in FIG. 9. That is, when the CPU 61 proceeds from step 915 to step 1705, it determines whether or not the value of the variable i is "2." When the value of the variable i is not "2"

(i.e., i=1), the CPU 61 returns to step 605 of FIG. 6. When the value of the variable i is "2," the CPU 61 proceeds to step 925 and subsequent steps.

Whit this processing, at a time point when a "Yes" determination is made in step 1705, estimation of the emission generation amounts is completed, and the total soot generation amount Soot is obtained as a value obtained by adding the amount Soot(1) of soot generated in the gas mixture based on pre-ignition injection and the amount Soot(2) of soot generated in the gas mixture based on post-ignition injection to the initial value Soot0. Similarly, the total NO generation amount NO is obtained as a value obtained by adding the amount NO(1) of NO generated in the gas mixture based on pre-ignition injection and the amount NO(2) of NO generated in the gas mixture based on post-ignition injection to the initial value NO0.

As described above, according to the second embodiment of the gas-mixture-state estimation apparatus and the emission-generation-amount estimation apparatus of the present invention, the injection period TAU is divided into two sub-periods; i.e., the "front Tdelay period" and the "rear (TAU-Tdelay) period," and it is assumed that the pre-ignition injection (mass Q(1)) corresponding to the "front Tdelay period" is executed at one time at the fuel injection start timing CAinj, and the post-ignition injection (mass Q(2)) corresponding to the "rear (TAU-Tdelay) period" is executed at one time when the ignition delay time Tdelay has elapsed after the pre-ignition injection.

The "two gas mixtures"; i.e., the first gas mixture based on the pre-ignition injection and the second gas mixture based on the post-ignition injection, are handled individually, and for each gas mixture, the excess air ratio $\lambda$ of the gas mixture, the state (temperature Tmix, etc.) of the gas mixture, and the amounts of emissions (soot and NO) generated in the gas mixture, which correspond to the post injection time t, are individually estimated. Then, the total generation amounts of emissions are estimated by summing up the emission generation amounts estimated for each gas mixture.

In addition, when the state of the gas mixture (first gas mixture) based on the pre-ignition injection is obtained, the fuel consumption amount qr obtained by making use of the function funcqrpre for the gas mixture based on the pre-ignition injection is used, and when the state of the gas mixture (second gas mixture) based on the post-ignition injection is obtained, the fuel consumption amount qr obtained by making use of the function funcqrpost for the gas mixture based on the post-ignition injection is used.

By virtue of the above-described configuration, the total generation amounts of emissions can be estimated accurately in consideration of not only the above-described non-uniformity of the gas mixture and non-uniformity of the emission generation amounts, but also the above-described "difference in the fuel consumption amount qr between the gas mixture based on the pre-ignition injection and the gas mixture based on the post-ignition injection."

The present invention is not limited to the above-described second embodiment, and various modifications can be employed within the scope of the present invention. For example, the second embodiment is configured to divide the injection fuel into "two portions"; i.e., a portion injected before ignition of a gas mixture and a portion injected after the ignition of the gas mixture. However, the second embodiment may be configured to further divide the portion injected before ignition of the gas mixture into a plurality of (e.g., M) portions, and the portion injected after the ignition of the gas mixture into a plurality of (e.g., N) portions, to thereby divide the injection fuel into (M+N) portions in total.

In this case, when the states of M gas mixtures based on the M portions are obtained, the fuel consumption amount qr obtained by making use of the function funcqrpre for the gas mixture based on the pre-ignition injection is used, and when the states of N gas mixtures based on the N portions are obtained, the fuel consumption amount qr obtained by making use of the function funcqrpost for the gas mixture based on the post-ignition injection is used.

By virtue of the above-configuration, while the above-described "difference in the fuel consumption amount qr between the gas mixture based on the pre-ignition injection and the gas mixture based on the post-ignition injection" is taken into consideration, the above-described non-uniformity of the gas mixture and non-uniformity of the emission generation amounts are more clearly taken into consideration, whereby the total generation amounts of emissions can be estimated more accurately.

Third Embodiment

Next, there will be described an emission-generation-amount estimation apparatus which includes a gas-mixture-state estimation apparatus for an internal combustion engine according to a third embodiment of the present invention. This third embodiment differs from the first and second embodiments in the point that the fuel injection period TAU is divided into a large number of (n) periods each corresponding to the minute time $\Delta t$ (e.g., 0.1 msec), and the injection fuel is divided into portions (n portions) which are injected in the corresponding periods, and in the point that the excess air ratio of a gas mixture formed on the basis of the second or later injected fuel portion is determined on the basis of the excess air ratio of a gas mixture formed on the basis of the first injected fuel portion, without using the above-described Equations (2) and (3). These points of difference will be mainly described below. Notably, a gas mixture formed on the basis of the i-th (i: natural number not greater than n) injected fuel portion will be referred to as the "i-th gas mixture."

In the first and second embodiments, the excess air ratio $\lambda$ is calculated by making use of the above-described Equations (2) and (3) for each of (two or three) gas mixtures and for each minute time $\Delta t$ (e.g., 0.1 msec) (see steps 730 and 735 of FIG. 7). This is because the amount g of cylinder interior gas newly taken into the gas mixture must be obtained for each of the gas mixtures and for each minute time $\Delta t$ (see steps 740 of FIG. 7).

Here, the right side of Equation (3) includes power calculations regarding variables $\rho g$ and t, which change momentarily. The power calculations involve a huge calculation load. Accordingly, the calculation of the excess air ratio $\lambda$ performed by making use of the above-described Equations (2) and (3) involves a huge calculation load, and therefore, it is desired to reduce the number of times of such calculation to a possible extent.

However, if as in the case of the first and second embodiments the excess air ratio $\lambda$ is calculated by making use of the above-described Equations (2) and (3) for each gas mixture and for each minute time $\Delta t$ in the third embodiment in which the injection fuel is divided into a large number of (n) portions, the number of times of such calculation becomes very large, and the calculation load becomes huge.

In view of the above, in the third embodiment, the excess air ratio of a gas mixture formed on the basis of a second or later injected fuel portion for each minute time $\Delta t$ from the time point at which the post injection time t is zero is assumed to be equal to that of the first gas mixture for each minute time $\Delta t$ from the time point at which the post injection time t is zero. Under such assumption, the amount g of cylinder interior gas newly taken into the gas mixture in each minute time $\Delta t$ can be calculated for each gas mixture formed on the basis of the second or later injected fuel portion, without use of the above-described Equations (2) and (3). As a result, it becomes unnecessary to calculate the excess air ratio λ of each gas mixture formed on the basis of the second or later injected fuel portion by making use of the above-described Equations (2) and (3). This point will now be described with reference to FIG. 18.

Figure 18:
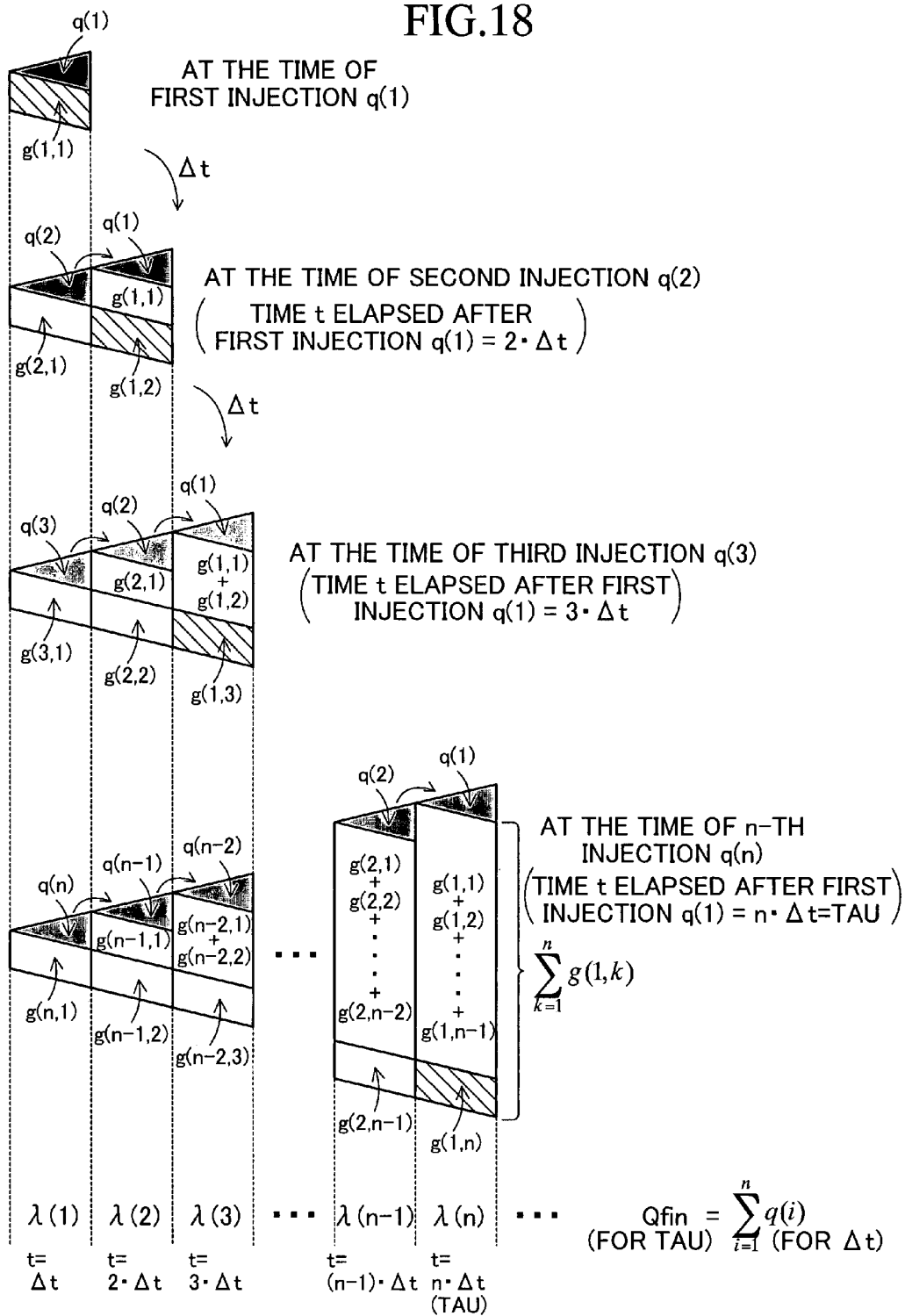
FIG. 18 is an illustration schematically showing changes in the states of n gas mixtures with time (from start to end of injection), the n gas mixtures being formed by n portions of fuel, which are successively injected in n portions of an injection period.

FIG. 18 schematically shows changes, with elapse of time, of n gas mixtures formed on the basis of n portions (q(1), q(2), ..., q(n−1), q(n)) of the injection fuel (changes in a period from start of injection and end of injection).

As shown in FIG. 18, in the third embodiment, it is assumed that fuel of mass q(1) for the injection period "first minute time Δt" associated with the first injection is injected at one time at the fuel injection start timing CAinj; fuel of mass q(2) for the injection period "second minute time Δt" associated with the second injection is injected at one time when Δt has elapsed after the fuel injection start timing CAinj; ...; and fuel of mass q(n) for the injection period "n-th minute time Δt" associated with the n-th injection is injected at one time when (n−1)·Δt has elapsed after the fuel injection start timing CAinj. Notably, a relation shown in the following Equation (28) stands between the instruction fuel injection amount Qfin and q(i) (i: natural number not greater than n); however, the values of q(i) (i: natural number not greater than n) do not become equal to one another due to variation in the injection pressure over the fuel injection period TAU and other causes.

$$Qfin = \sum_{i=1}^{n} q(i) \qquad (28)$$

Moreover, as shown in FIG. 18, the amount of cylinder interior gas newly taken into the i-th gas mixture during a period between a time point at which the post injection time t (associated with the i-th gas mixture)=(k−1)·Δt and a time point at which the post injection time t=k·Δt is represented by "g(i, k)" (i: natural number not greater than n, k: natural number; these apply in the following description).

First, only the first injection (accordingly, the first gas mixture) will be considered. The excess air ratio λ(k) of the first gas mixture (first-portion mixing index value) at the time point at which the post injection time t associated with the first gas mixture is equal to k·Δt can be obtained successively by making use of the above-described Equations (2) and (3) as in the first and second embodiments.

Accordingly, the amount g(1, k) of cylinder interior gas newly taken in the first gas mixture (corresponding to a hatched portion in FIG. 18) can be obtained in accordance with the following Equation (29) corresponding to the above-described Equation (11). Notably, it is assumed that λ(0)=0. That is, only the amount g(1, k) of cylinder interior gas newly taken in the first gas mixture is obtained by making use of the above-described Equations (2) and (3) as in the first and second embodiments.

$$g(1,k) = stoich \cdot (\lambda(k) - \lambda(k-1)) \cdot q(1) \qquad (29)$$

Here, as can be understood from FIG. 18 and Equation (29), the total amount sumg(k) of cylinder interior gas taken in the first gas mixture up to the time point at which the post injection time t associated with the first gas mixture becomes equal to k·Δt is represented by the following Equation (30).

$$sumg(k) = \sum_{j=1}^{k} g(1, j) \qquad (30)$$

For example, the total amount sumg(2) of cylinder interior gas taken in the first gas mixture up to the time point at which the post injection time t associated with the first gas mixture becomes equal to 2·Δt is g(1, 1)+g(1, 2), and the total amount sumg(3) of cylinder interior gas taken in the first gas mixture up to the time point at which the post injection time t associated with the first gas mixture becomes equal to 3·Δt is g(1, 1)+g(1, 2)+g(1, 3). Accordingly, the excess air ratio λ(k) at the time point at which the post injection time t associated with the first gas mixture is equal to k·Δt can be represented by the following Equation (31).

$$\lambda(k) = \left(\frac{1}{stoich}\right) \cdot \frac{sumg(k)}{q(1)} = \left(\frac{1}{stoich}\right) \cdot \frac{\sum_{j=1}^{k} g(1, j)}{q(1)} \qquad (31)$$

Since the following Equation (32) can be derived from Equation (31), the value "λ(k)−λ(k−1)" can be obtained by making use of "g(1, k)" and "q(1)," which are known values.

$$\lambda(k) - \lambda(k-1) = \left(\frac{1}{stoich}\right) \cdot \frac{g(1, k)}{g(1)} \qquad (32)$$

Here, under the above-described assumption, the excess air ratio of the i-th gas mixture (i: natural number not less than 2 and not greater than n) at the time point at which the post injection time t associated with the i-th gas mixture is k·Δt is equal to the "excess air ratio λ(k) of the first gas mixture at the time point at which the post injection time t associated with the first gas mixture is k·Δt." Accordingly, when the above-described assumption is used, the amount g(i, k) of cylinder interior gas newly taken into the i-th gas mixture (i≧2) during a period between the time point at which the post injection time t (associated with the i-th gas mixture)=(k−1)·Δt and the time point at which the post injection time t=k·Δt can be represented by the following Equation (33), which is similar to the above-described Equation (29) representing the above-described "amount g(1, k) of cylinder interior gas newly taken into the first gas mixture."

$$g(i,k) = stoich \cdot (\lambda(k) - \lambda(k-1)) \cdot q(i) \qquad (33)$$

The following Equation (34) can be obtained by substituting Equation (32) into Equation (33). According to the following Equation (34), the amount g(i, k) of cylinder interior gas newly taken into the i-th gas mixture (i≧2) can be readily obtained by making use of "g(1, k)," "q(i)," and "q(1)," which are known values, without using the above-described Equations (2) and (3), which involve a large calculation load. That is, for obtainment of the amount g(i, k) of cylinder interior gas newly taken into the i-th gas mixture (i≧2), it becomes unnecessary to calculate the air excess ratio λ of the i-th gas mixture (i≧2) by making use of the above-described Equations (2) and (3).

$$g(i, k) = g(1, k) \cdot \frac{q(i)}{q(1)} \qquad (34)$$

As described above, in the third embodiment, since the excess air ratio of the i-th gas mixture (i≧2) in every minute time Δt after the time point at which the post injection time t=0 is assumed to be equal to the excess air ratio λ(k) of the first gas mixture in every minute time Δt after the time point at which the post injection time t=0, only the first gas mixture requires the calculation of the excess air ratio λ performed by making use of the above-described Equations (2) and (3). Accordingly, the number of times of the calculation of the excess air ratio λ, which calculation uses the above-described Equations (2) and (3) and involves a large calculation load, can be reduced, whereby the calculation load of the CPU 61 can be reduced.

Notably, in the third embodiment, the gas mixture state and the emission generation amounts are individually estimated in consideration of the differences among the gas mixtures in terms of the state (temperature Tg, pressure Pg, etc.) of cylinder interior gas, which corresponds to the post injection time t, as in the first and second embodiments. However, the differences among the gas mixtures in terms of the effective injection pressure ΔP and the cylinder interior gas density ρg0 (accordingly, the spray angle θ) at the time of injection; i.e., the difference between the gas mixtures in terms of the excess air ratio λ, which corresponds to the post injection time t, is not taken into consideration. Accordingly, as compared with the first and second embodiments, the above-described non-uniformity of the gas mixture and non-uniformity of the emission generation amounts are taken into consideration to a less degree.

(Actual Operation of Third Embodiment)

Next, there will be described actual operation of the emission-generation-amount estimation apparatus including the gas-mixture-state estimation apparatus according to the third embodiment. Of the series of routines shown in FIGS. 5 to 9 and the routine of FIG. 13, which are executed by the CPU 61 of the first embodiment, the CPU 61 of this apparatus executes the routine of FIG. 13 as it is, and executes a series of routines shown by flowcharts in FIGS. 19 to 23, which correspond to the routines shown in FIGS. 5 to 9, in place of the series of routines shown in FIGS. 5 to 9. In addition, the CPU 61 of this apparatus further executes a series of routines shown by flowcharts in FIGS. 24 to 27.

Notably, steps of the routines shown in FIGS. 19 to 27 which are the same as those of the routines shown in FIGS. 5 to 9 are denoted by reference numerals identical to those of the corresponding steps of the routines shown in FIGS. 5 to 9. Their repeated descriptions are not omitted. The routines shown in FIGS. 19 to 27, which are peculiar to the third embodiment, will now be described.

The CPU 61 of the third embodiment repeatedly executes, at predetermined intervals, the series of routines shown in FIG. 19 to 23, which correspond to the series of routines shown in FIG. 5 to 9. Therefore, when a predetermined timing has been reached, the CPU 61 starts the processing from step 1900 of FIG. 19, and then proceeds to step 505. When the CPU 61 makes a "Yes" determination in step 505 (that is, IVC has come), the CPU 61 successively performs the processings of steps 510 to 530, and then proceeds to step 1905 so as to obtain a division number n by dividing the fuel injection period TAU obtained in step 520 by the minute time Δt (e.g., 0.1 msec).

Subsequently, the CPU 61 proceeds to step 1910, and obtains respective fuel quantities (masses) q(1), q(2), . . . , q(n) for the first to the n-th injections from the obtained fuel injection period TAU, the minute time Δt, the obtained base fuel injection pressure Pcrbase, and the above-described function funcQ, in a manner similar to that in step 540 of FIG. 5. As described above, the respective fuel quantities q(1), q(2), . . . , q(n) are set such that a relation "Qfin=q(1)+q(2)+ . . . +q(n)" stands; however, the respective fuel quantities differ from one another. This step 1910 corresponds to the injection fuel dividing means.

Subsequently, the CPU 61 proceeds to step 1915, and obtains crank angles CAinj(1), CAinj(2), . . . , CAinj(n) at respective injection times for the first to n-th injections from the minute time Δt, the present engine speed NE, the fuel injection start timing CAinj determined in step 525, and the above-described function funcCAinj, in a manner similar to that in step 545 of FIG. 5.

With the above-described processing, the crank angle CAinj(1) at the time of the first injection is set to a value corresponding to the fuel injection start timing CAinj; the crank angle CAinj(2) at the time of the second injection is set to a value corresponding to a timing which lags the fuel injection start timing CAinj by Δt; . . . ; and the crank angle CAinj(n) at the time of the n-th injection is set to a value corresponding to a timing which lags the fuel injection start timing CAinj by (n−1)·Δt.

Figure 20:
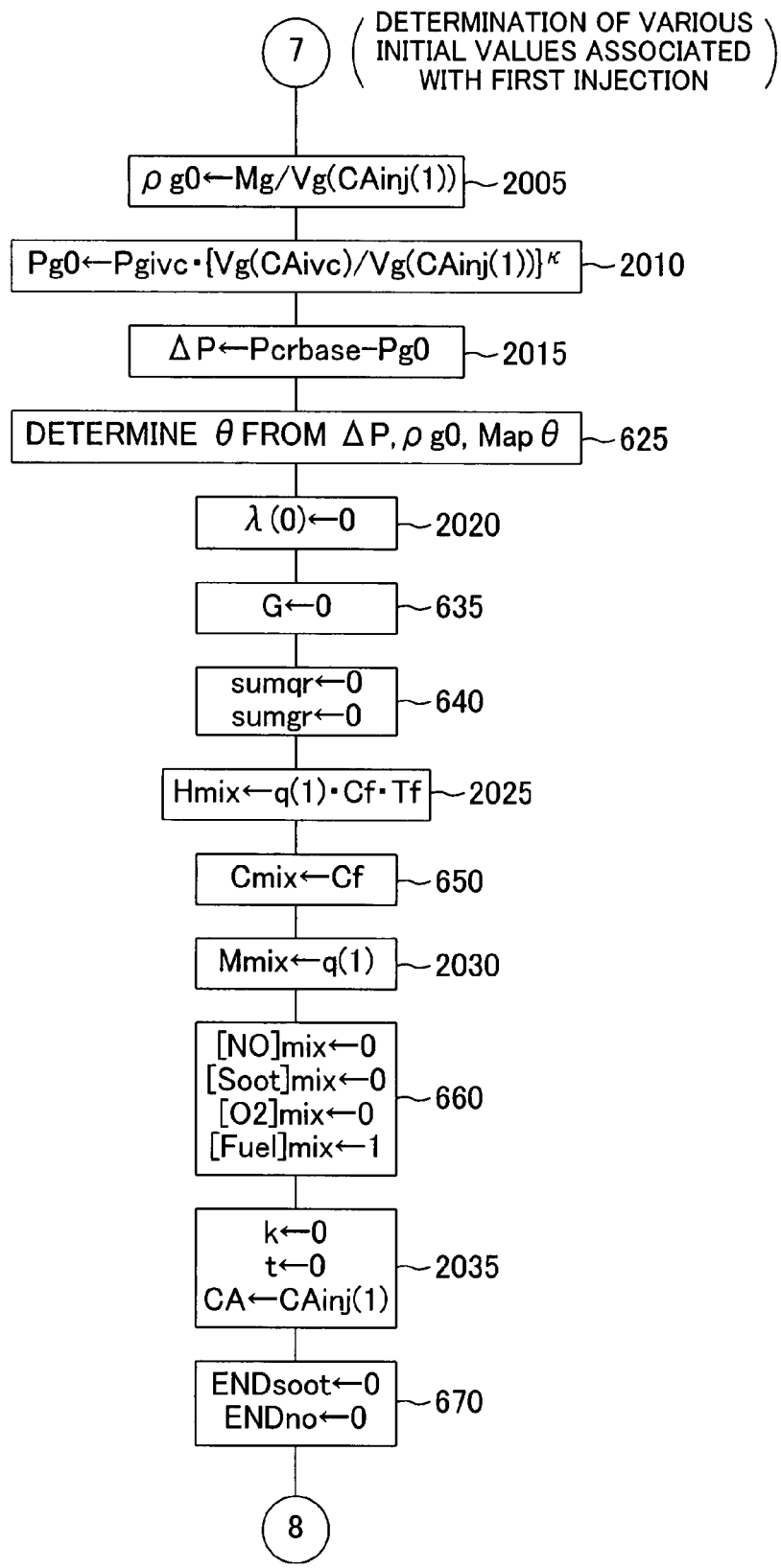
FIG. 20 is a flowchart showing a second portion of the routine which the CPU of the third embodiment executes so as to calculate gas mixture temperature, etc., and emission amounts.

Next, the CPU 61 successively executes the processings of steps 550 to 570, and then proceeds to the routine of FIG. 20 so as to perform processing for determining various initial values associated with the first injection only. Specifically, the CPU 61 proceeds to step 2005, and obtains the cylinder interior gas density ρg0 at the time of the first injection by dividing the total mass Mg of the cylinder interior gas obtained in step 515 by the cylinder interior volume Vg(CAinj(1)) at the time of the first injection obtained from the crank angle CAinj(1) at the time of the first injection obtained in the aforementioned step 1915, in a manner similar to that in step 610 of FIG. 6.

Subsequently, the CPU 61 proceeds to step 2010, and obtains the cylinder interior gas pressure Pg0 at the time of the first injection on the basis of the cylinder interior gas pressure Pgivc at IVC obtained in step 510, the above-described cylinder interior volume Vg(CAivc) at IVC, the cylinder interior volume Vg(CAinj(1)) at the time of the first injection, and an equation corresponding to the above-described Equation (4), in a manner similar to that in step 615 of FIG. 6.

Next, the CPU 61 proceeds to step 2015, and obtains the effective injection pressure ΔP at the time of the first injection by subtracting the above-described cylinder interior gas pressure Pg0 at the time of the first injection from the base fuel injection pressure Pcrbase obtained in step 530. In step 625 subsequent thereto, the CPU 61 obtains a spray angle θ associated with the first injection on the basis of the obtained effective injection pressure ΔP, the cylinder interior gas density ρg0, and the above-described table Mapθ. With this, the spray angle θ is determined on the basis of the effective injection pressure ΔP and the cylinder interior gas density ρg0 at the time of the first injection (that is, the crank angle CAinj(1)).

Subsequently, the CPU 61 proceeds to step 2020, and, as described above, sets the excess air ratio λ(0) of the first gas mixture at the time when the post injection time t associated with the first mixture=0 (this value is used in step 2110 of FIG. 21 to be described later) to "0" for the convenience of calculation.

Next, the CPU 61 successively executes the processings of steps 635 and 640, and then proceeds to step 2025. In step 2025, the CPU 61 sets the gas mixture enthalpy Hmix associated with the first gas mixture to an initial value (that is, the product of the first injection quantity q(1) obtained in the aforementioned step 1910, the constant-pressure specific heat Cf of fuel, and the fuel vapor temperature Tf obtained in step 550) in accordance with an equation corresponding to the above-described Equation (17), in a manner similar to that in step 645 of FIG. 6.

Then, the CPU 61 executes the processing of step 650, and then proceeds to step 2030 so as to set the gas mixture mass Mmix associated with the first gas mixture to the first injection quantity q(1) (initial value). Subsequently, the CPU 61 executes the processing of step 660, and then proceeds to step 2035 so as to set the post injection time t associated with the first gas mixture to an initial value "0" in a manner similar to that in step 665 of FIG. 6. Further, the CPU 61 sets the crank angle CA associated with the first injection to the crank angle CAinj(1) at the time of the first injection (initial value). With these settings, the post injection time t associated with the first gas mixture is counted from the time of the first injection. In addition, in this step 2035, the CPU 61 sets the value of a variable k to "0." The value of this variable k represents that the post injection time t is "k·Δt."

Figure 21:
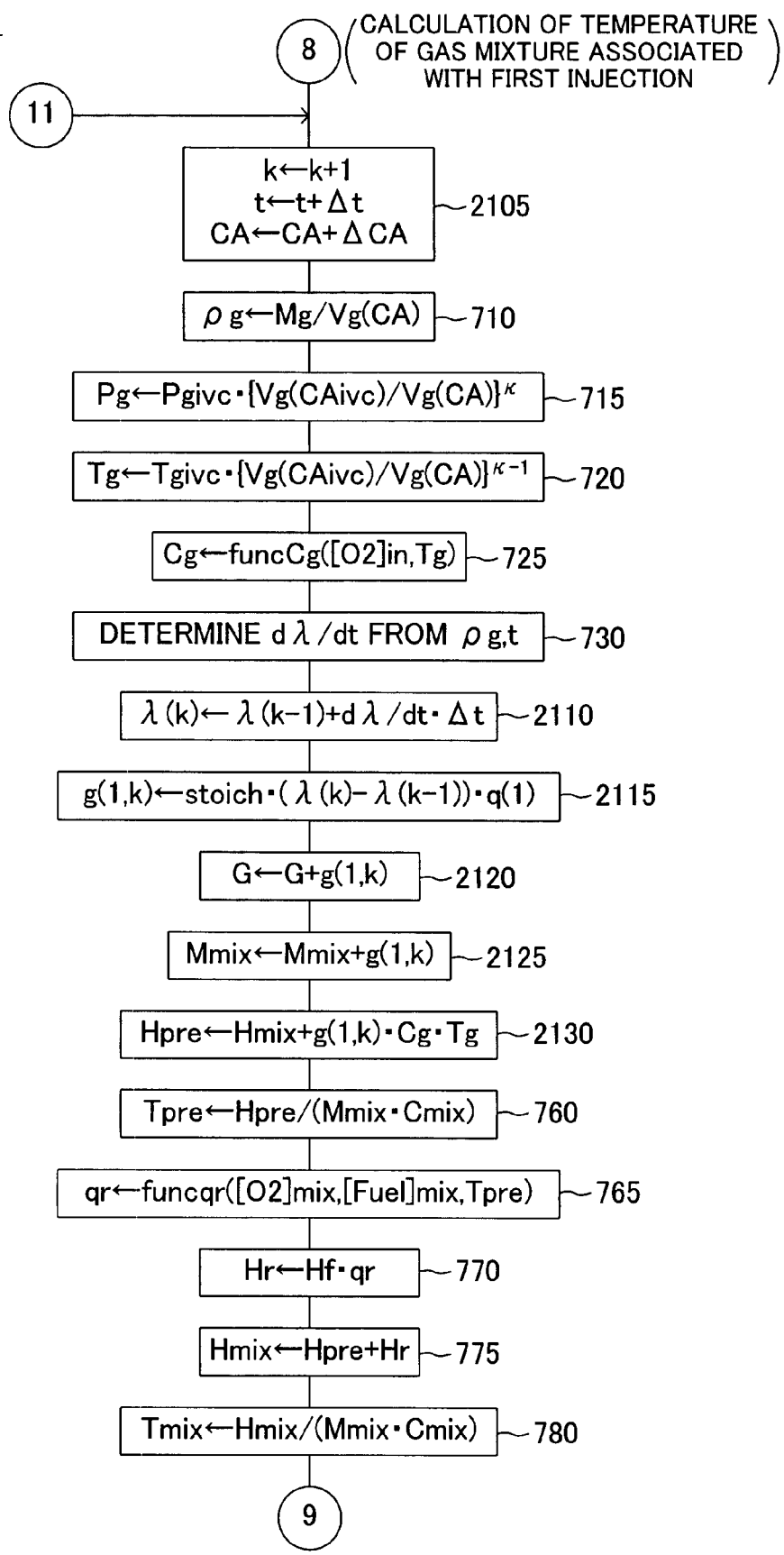
FIG. 21 is a flowchart showing a third portion of the routine which the CPU of the third embodiment executes so as to calculate gas mixture temperature, etc., and emission amounts.

Next, the CPU 61 executes the processing of step 670, proceeds to the routine of FIG. 21, and starts processing for calculating the gas mixture temperature associated with the first injection. Specifically, the CPU 61 first proceeds to step 2105, and advances the post injection time t associated with the first injection by Δt, and advances the crank angle CA associated with the first injection by ΔCA obtained in step 565 of FIG. 19, in a manner similar to that in step 705 of FIG. 7.

In addition, in this step 2105, the CPU 61 increments the value of the variable k by "1." With this processing, the value of the crank angle CA associated with the first injection and the value of the variable k are maintained at values corresponding to the post injection time t associated with the first gas mixture.

Next, the CPU 61 successively executes the processings of steps 710 to 730, and then proceeds to step 2110. In step 2110, as in step 735 of FIG. 7, the CPU 61 obtains the excess air ratio λ(k) of the first gas mixture (first-portion mixing index value) at the time point at which the post injection time t associated with the first gas mixture=k·Δt in accordance with the above-described Equations (2) and (3), by adding a value "dλ/dt·Δt" (obtained by multiplying the fuel dilution rate dλ/dt obtained in step 730 by the minute time Δt) to the excess air ratio λ(k−1) of the first gas mixture at the time point at which the post injection time t associated with the first gas mixture=(k−1)·Δt (when k=1, λ(k−1)=λ(0)=0). This step 2110 corresponds to the mixing index value obtaining means.

Figure 19:
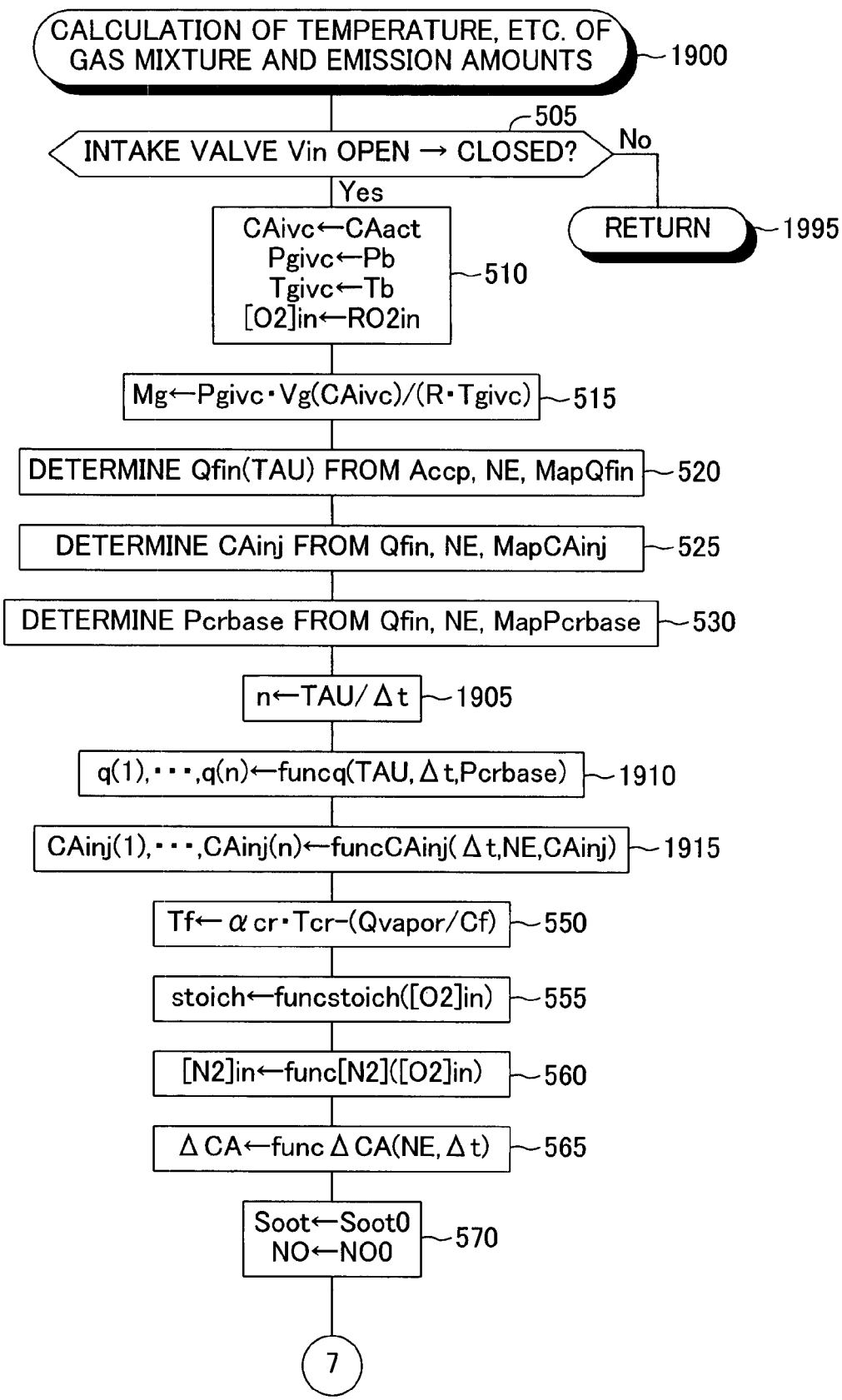
FIG. 19 is a flowchart showing a first portion of a routine which a CPU of a third embodiment executes so as to calculate gas mixture temperature, etc., and emission amounts.

Subsequently, the CPU 61 proceeds to 2115, and obtains the amount g(1, k) of cylinder interior gas newly taken into the first gas mixture during a period between a time point at which the post injection time t associated with the first gas mixture=(k−1)·Δt and a time point at which the post injection time t=k·Δt, in accordance with λ(k) and λ(k−1) already obtained in step 2110, q(1) obtained in step 1910 of FIG. 19, and the above-described Equation (29).

Next, the CPU 61 proceeds to 2120, and updates the gas-mixture forming cylinder interior gas mass G to a value obtained by adding the obtained mass g(1, k) of cylinder interior gas newly taken into the first gas mixture to the gas-mixture forming cylinder interior gas mass G at that time point (the initial value is set to "0" by step 635 of FIG. 20), in a manner similar to that in step 745 of FIG. 7. With this, the gas-mixture forming cylinder interior gas mass G associated with the first gas mixture at the time when the post injection time t=k·Δt is obtained.

The CPU 61 then proceeds to 2125, and updates the gas mixture mass Mmix by adding the above-described mass g(1, k) of cylinder interior gas newly taken into the first gas mixture to the gas mixture mass Mmix at that time (the initial value is set to "q(1)" by step 2030 of FIG. 20), in a manner similar to that in step 750 of FIG. 7. With this, the gas mixture mass Mmix associated with the first gas mixture at the time when the post injection time t=k·Δt is obtained.

Subsequently, the CPU 61 proceeds to step 2130, and sets the enthalpy Hpre of the gas mixture before occurrence of chemical reactions to a value obtained by adding the "thermal energy ΔHg=g(1, k)·Cg·Tg of cylinder interior gas newly taken into the first gas mixture" to the enthalpy Hmix of the gas mixture at that time (the initial value is set to the value "q(1)·Cf·Tf" by the processing of step 2025 of FIG. 20), in a manner similar to that in step 755 of FIG. 7.

Next, the CPU 61 successively executes the processings of step 760 to 780. As a result, in step 780, the temperature Tmix of the first gas mixture at a time point at which the post injection time t is k·Δt (accordingly, the crank angle CA=CAinj(1)+k·ΔCA) is obtained.

Figure 22:
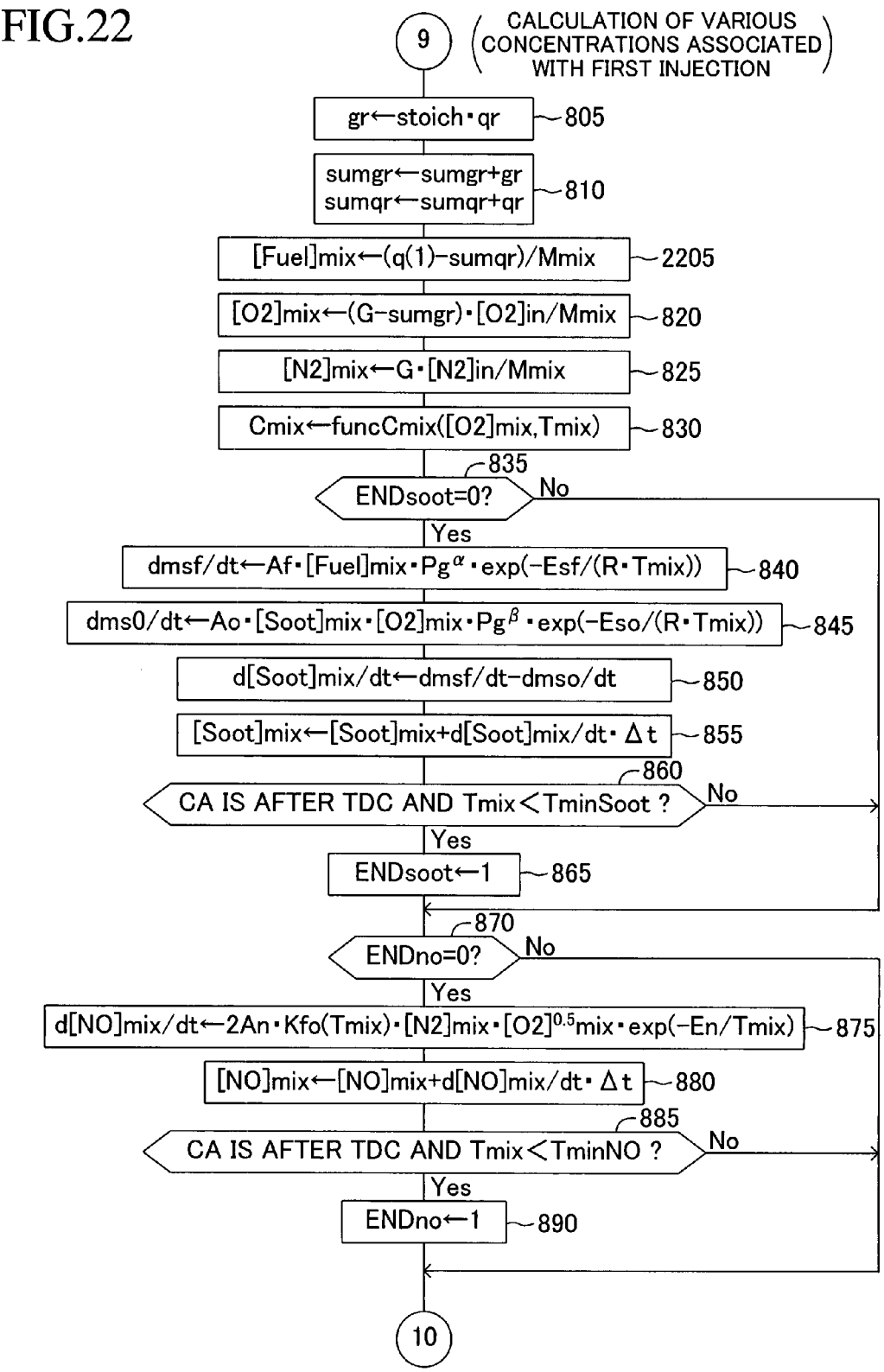
FIG. 22 is a flowchart showing a fourth portion of the routine which the CPU of the third embodiment executes so as to calculate gas mixture temperature, etc., and emission amounts.

The CPU 61 then proceeds to the routine of FIG. 22, and starts the processing for calculating the various concentrations associated with the first injection. The routine of FIG. 22 differs from the routine of FIG. 8 only in the point that step 815 of the routine of FIG. 8 is replaced with step 2205. In step 2205, the CPU 61 obtains the fuel concentration [Fuel]mix within the first gas mixture at the time point when the post injection time t=k·Δt on the basis of the first injection quantity q(1) obtained in step 1910 of FIG. 19, the fuel-consumption-amount cumulative value sumqr obtained in step 810, the gas mixture mass Mmix obtained in step 2125 of FIG. 21, and an equation corresponding to the above-described Equation (19).

Figure 23:
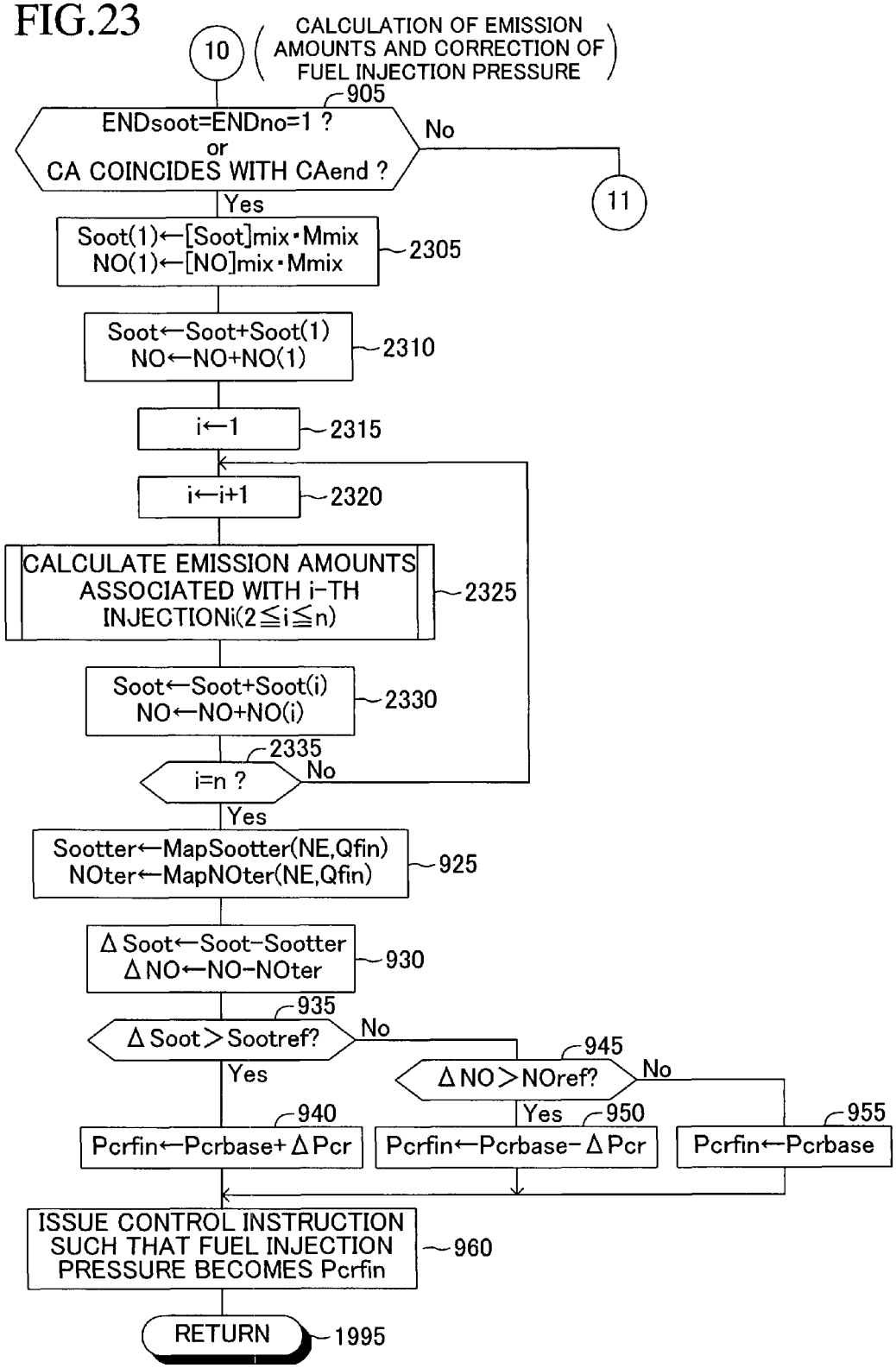
FIG. 23 is a flowchart showing a fifth portion of the routine which the CPU of the third embodiment executes so as to calculate gas mixture temperature, etc., and emission amounts.

The CPU 61 then proceeds the routine of FIG. 23, and repeatedly executes the processings of step 2105 of FIG. 21 to step 905 of FIG. 23 every time the CPU 61 makes a "No" determination in step 905. As a result, every time a "No" determination is made in step 905, the value of the variable k is incremented by "1," the post injection time t associated with the first gas mixture is advanced by Δt, and the crank angle CA associated with the first injection is advanced by ΔCA in step 2105 of FIG. 21.

That is, so long as a "No" determination is made in step 905, the excess air ratio λ(k) of the first gas mixture, the mass g(1, k) of cylinder interior gas newly taken into the first gas mixture, the state (temperature Tmix, etc.) of the first gas mixture, and (so long as the values of the flags ENDsoot and ENDno are zero) the emission concentrations ([Soot]mix and [NO]mix) associated with the first gas mixture are obtained for each minute time Δt form the time of the first injection (that is, for each minute crank angle ΔCA from CAinj(1)).

When the above-described conditions of step 905 are satisfied, the CPU 61 makes a "Yes" determination in step 905 of FIG. 23, and proceeds to step 2305 and subsequent steps so as to perform processing for ending the calculation associated with the first gas mixture.

That is, in step 2305, the CPU 61 obtains the amount Soot(1) of soot generated in the first gas mixture and the amount NO(1) of NO generated in the first gas mixture in a manner similar to that in step 910 of FIG. 9. The CPU 61 then proceeds to step 2310 so as to update the total soot generation amount Soot to a value (Soot0+Soot(1)) obtained by adding the obtained amount Soot(1) of soot generated in the first gas mixture to the total soot generation amount Soot at that time (at the present time point, the initial value Soot0 because of the processing of step 570 of FIG. 19), and update the total NO generation amount NO to a value (NO0+NO(1)) obtained by adding the obtained amount NO(1) of NO generated in the first gas mixture to the total NO generation amount NO at that time (at the present time point, the initial value NO0 because of the processing of step 570 of FIG. 19), in a manner similar to that in step 915 of FIG. 9. Through the above-described processing, the calculation for the first injection (accordingly, the first gas mixture) is completed.

Next, the CPU 61 proceeds to step 2315, and sets the variable i to "1." The variable i is a value for identifying the position (order) of each injection (accordingly, the position of each gas mixture) as in the first and second embodiments.

Subsequently, the CPU 61 proceeds to step 2320, and increments the value of the variable i by "1." The CPU 61 then proceeds, via step 2325, to the series of routines shown in FIGS. 24 to 27, to be described later, for "calculation of emission amounts associated with i-th injection ($2 \leq i \leq n$)." Thus, the CPU 61 obtains the soot generation amount Soot(i) and the NO generation amount NO(i), which are emission generation amounts associated with the i-th gas mixture ($2 \leq i \leq n$). Here, the value n is the division number; i.e., the number of portions to which the injection fuel is divided, obtained in step 1905 of FIG. 19.

Next, the CPU 61 proceeds to step 2330, and updates the total soot generation amount Soot to a value obtained by adding the obtained soot generation amount Soot(i) associated with the i-th gas mixture to the total soot generation amount at that time point (when i=2, Soot0+Soot(1)), and updates the total NO generation amount NO to a value obtained by adding the obtained NO generation amount NO(i) associated with the i-th gas mixture to the total NO generation amount at that time point (when i=2, NO0+NO(1)). As a result, the total soot generation amount Soot becomes equal to Soot0+Soot(1)+ . . . +Soot(i), and the total NO generation amount NO becomes equal to NO0+NO(1)+ . . . +NO(i).

The CPU 61 then proceeds to step 2335 so as to determine whether or not the value of the variable i coincides with the above-described division number n. When the CPU 61 makes a "No" determination, it returns to step 2320. That is, the processing of steps 2320 to 2330 is repeatedly performed until the value of the variable i reaches the above-described division number n as a result of repeated execution of step 2320. As a result, the value of the variable i is incremented by "1" each time, and the total soot generation amount Soot and the total NO generation amount NO are updated in step 2330.

When the value of the variable i has reached the division number n, the CPU 61 makes a "Yes" determination in step 2335, and then proceeds to 925. At this time point, estimation of the emission generation amounts is ended, whereby the total soot generation amount Soot is determined as "Soot0+Soot(1)+ . . . +Soot(n)," and the total NO generation amount NO is determined as "NO0+NO(1)+ . . . +NO(n)." The CPU 61 completes the above-described estimation of the gas mixture state and the emission generation amounts immediately after IVC (that is, at a time point before the fuel injection start timing CAinj).

Next, there will be described the series of routines shown in FIGS. 24 to 27 for "calculation of emission amounts associated with i-th injection ($2 \leq i \leq n$)." The series of routines are adapted to obtain the soot generation amount Soot(i) and the NO generation amount NO(i) of the i-th gas mixture ($2 \leq i \leq n$), and the routines of FIGS. 24 to 27 correspond to the routines of FIGS. 6 to 9.

Figure 24:
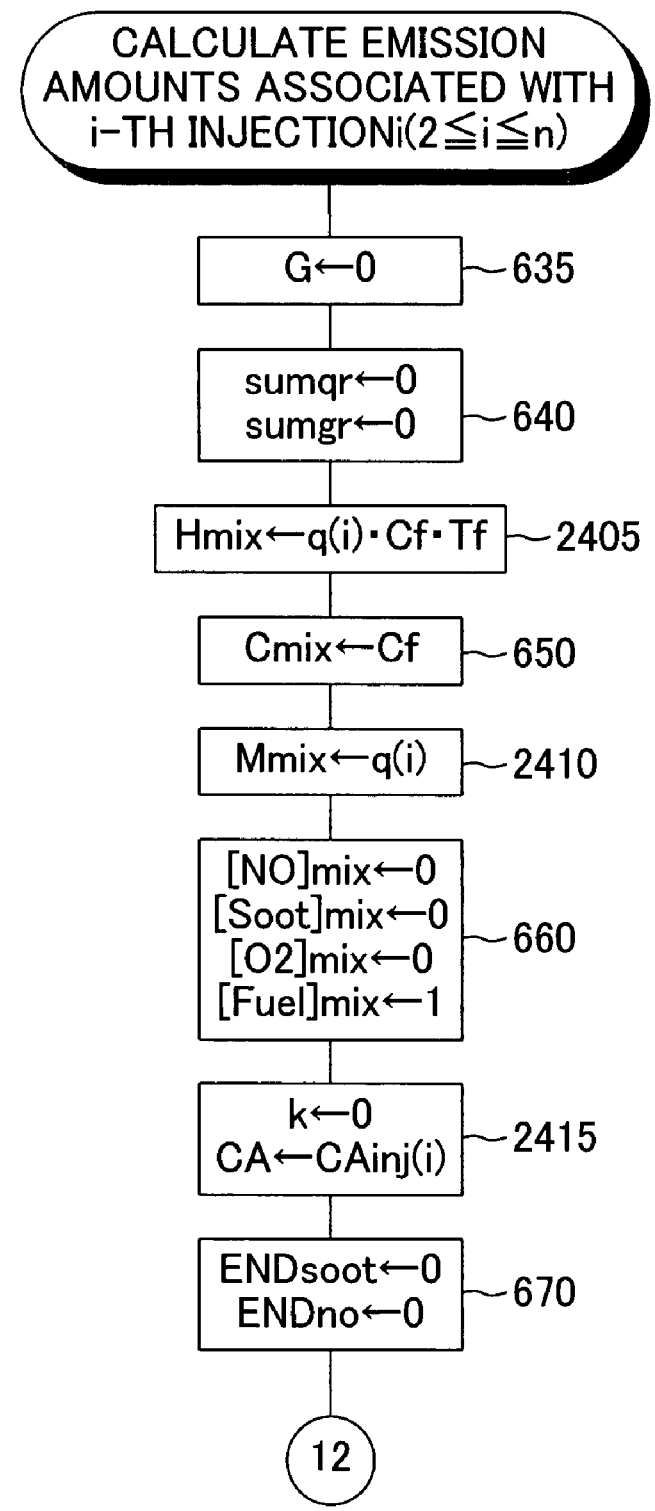
FIG. 24 is a flowchart showing a first portion of a routine which the CPU of the third embodiment executes so as to calculate emission amounts associated with the i-th injection ($2 \leq i \leq n$).

After executing step 2320 of FIG. 23, the CPU 61 proceeds, via step 2325, to the routine of FIG. 24 so as to determine various initial values associated with the i-th gas mixture ($2 \leq i \leq n$). Specifically, first, the CPU 61 successively executes the processings of steps 635 and 640, and then proceeds to step 2405. In step 2405, the CPU 61 sets the gas mixture enthalpy Hmix associated with the i-th gas mixture to an initial value (that is, the product of the first injection quantity q(i) obtained in the aforementioned step 1910, the constant-pressure specific heat Cf of fuel, and the fuel vapor temperature Tf obtained in step 550), in a manner similar to that in step 2025 of FIG. 20.

Then, the CPU 61 executes the processing of step 650, and proceeds to step 2410 so as to set the gas mixture mass Mmix associated with the i-th gas mixture to the above-described i-th injection quantity q(i) (initial value). Subsequently, the CPU 61 executes the processing of step 660, and then proceeds to step 2415 so as to set the crank angle CA associated with the i-th injection to the crank angle CAinj(i) at the time of the i-th injection (initial value), in a manner similar to that in step 2035 of FIG. 20. In addition thereto, in this step 2415, the CPU 61 sets the value of the variable k to "0." The value of this variable k represents that the time elapsed after the i-th injection is "k·$\Delta$t" (accordingly, the crank angle CA associated with the i-th injection is "CAinj(i)+k·$\Delta$CA").

Figure 25:
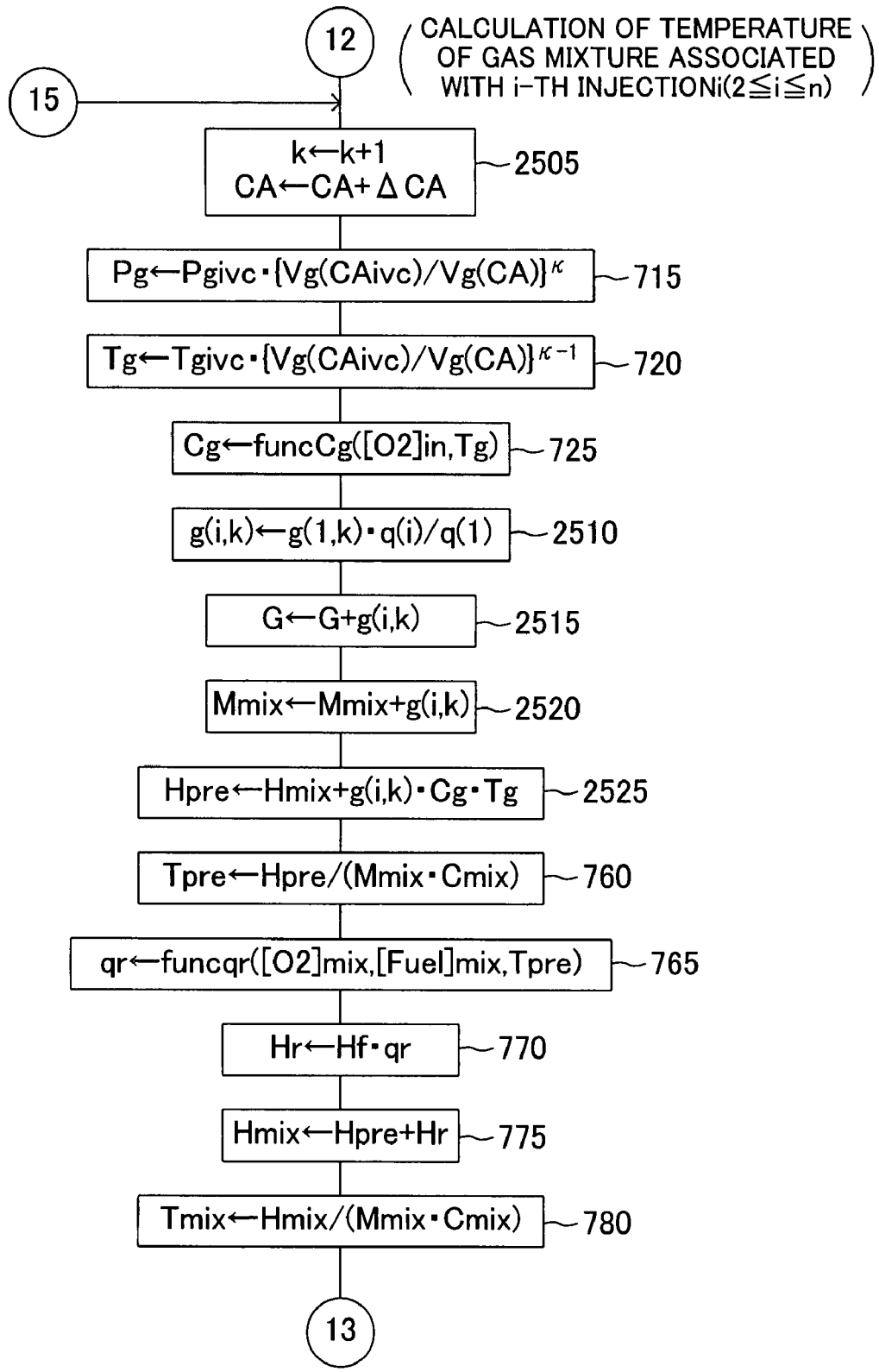
FIG. 25 is a flowchart showing a second portion of the routine which the CPU of the third embodiment executes so as to calculate emission amounts associated with the i-th injection ($2 \leq i \leq n$).

Next, the CPU 61 executes the processing of step 670, proceeds to the routine of FIG. 25, and starts processing for calculating the gas mixture temperature associated with the i-th injection ($2 \leq i \leq n$). Specifically, the CPU 61 first proceeds to step 2505, and advances the crank angle CA associated with the i-th injection by $\Delta$CA obtained in step 565 of FIG. 19, in a manner similar to that in step 2105 of FIG. 21. In addition, in this step 2505, the CPU 61 increments the value of the variable k by "1." With this processing, the value of the crank angle CA associated with the i-th injection and the value of the variable k are maintained at values corresponding to each other.

Next, the CPU 61 successively executes the processings of steps 715 to 725, and then proceeds to step 2510. In step 2510, the CPU 61 obtains the amount g(i, k) of cylinder interior gas newly taken into the i-th gas mixture ($2 \leq i \leq n$) during a period between a time point at which the post injection time t associated with the i-th gas mixture=(k−1)·$\Delta$t and a time point at which the post injection time t=k·$\Delta$t, on the basis of the "amount g(1, k) of cylinder interior gas newly taken into the first gas mixture" obtained in step 2115 of FIG. 21, q(i) obtained in step 1910 of FIG. 19, q(1) obtained in the step 1910, and the above-described Equation (34), without use of the above-described Equations (2) and (3).

The CPU 61 then proceeds to 2515, and updates the gas-mixture forming cylinder interior gas mass G to a value obtained by adding the obtained mass g(i, k) of cylinder interior gas newly taken into the i-th gas mixture to the gas-mixture forming cylinder interior gas mass G at that time point (the initial value is set to "0" by step 635 of FIG. 24), in a manner similar to that in step 2120 of FIG. 21. With this, the gas-mixture forming cylinder interior gas mass G associated with the i-th gas mixture at the time when the post injection time t=k·$\Delta$t is obtained.

The CPU 61 then proceeds to 2520, and updates the gas mixture mass Mmix to a value obtained by adding the above-described mass g(i, k) of cylinder interior gas newly taken into the i-th gas mixture to the gas mixture mass Mmix at that time (the initial value is set to "q(i)" by step 2410 of FIG. 24), in a manner similar to that in step 2125 of FIG. 21. With this, the gas mixture mass Mmix associated with the i-th gas mixture at the time when the post injection time t=k·$\Delta$t is obtained.

Subsequently, the CPU 61 proceeds to step 2525, and sets the enthalpy Hpre of the gas mixture before occurrence of chemical reactions to a value obtained by adding the "thermal energy $\Delta$Hg=g(i, k)·Cg·Tg of cylinder interior gas newly taken into the i-th gas mixture" to the enthalpy Hmix of the gas mixture at that time (the initial value is set to the value "q(i)·Cf·Tf" by the processing of step 2405 of FIG. 24), in a manner similar to that in step 2130 of FIG. 21.

Next, the CPU 61 successively executes the processings of step 760 to 780. As a result, in step 780, the temperature Tmix of the i-th gas mixture ($2 \leq i \leq n$) at a time point at which the post injection time t is k·Δt (accordingly, the crank angle CA=CAinj(i)+k·ΔCA) is obtained.

Figure 26:
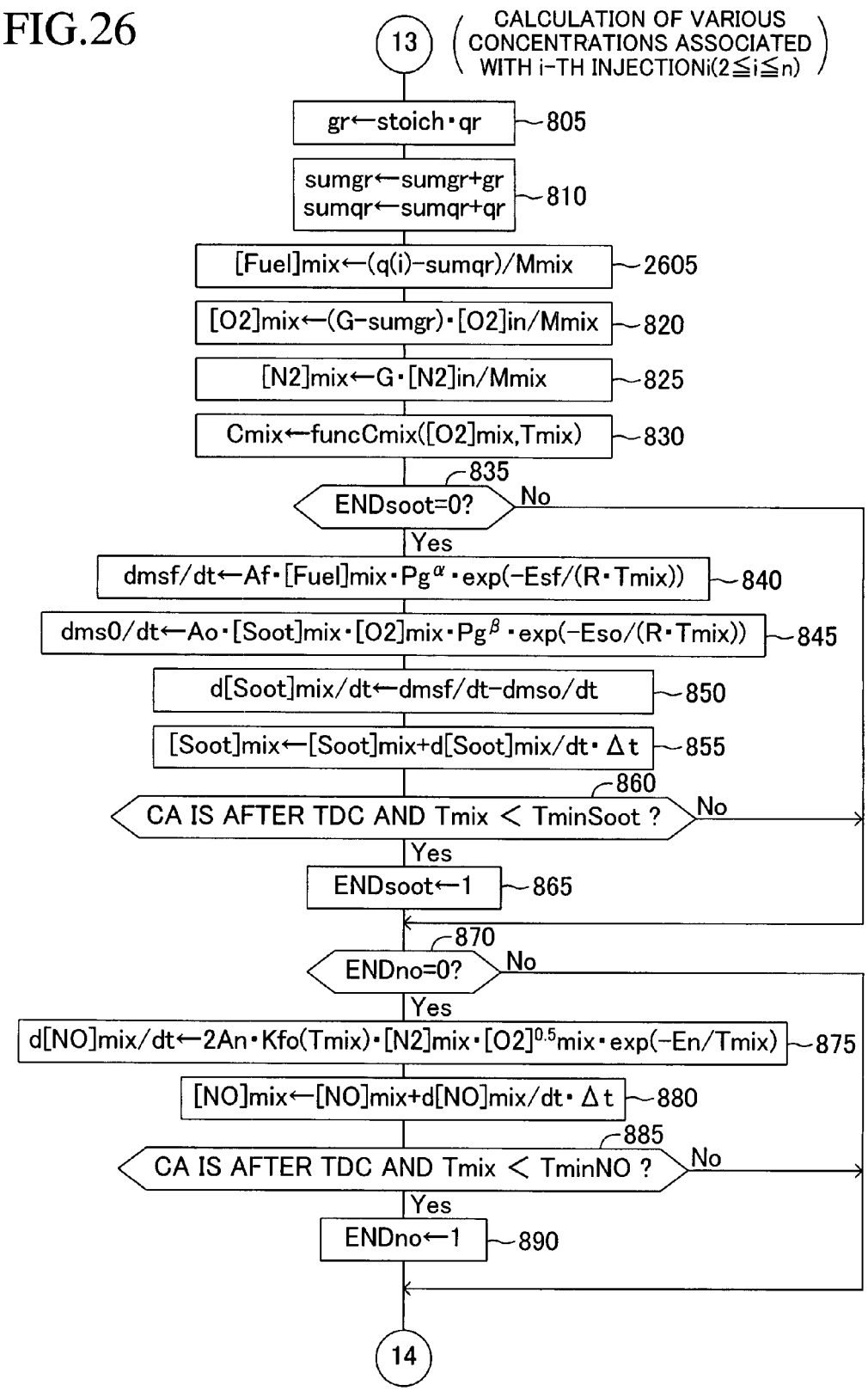
FIG. 26 is a flowchart showing a third portion of the routine which the CPU of the third embodiment executes so as to calculate emission amounts associated with the i-th injection ($2 \leq i \leq n$).

The CPU 61 then proceeds to the routine of FIG. 26, and starts the processing for calculating the various concentrations associated with the i-th injection. The routine of FIG. 26 differs from the routine of FIG. 8 only in the point that step 815 of the routine of FIG. 8 is replaced with step 2605. In step 2605, the CPU 61 obtains the fuel concentration [Fuel]mix within the i-th gas mixture at the time point when the post injection time t=k·Δt on the basis of the i-th injection quantity q(i) obtained in step 1910 of FIG. 19, the fuel-consumption-amount cumulative value sumqr obtained in step 810, the gas mixture mass Mmix obtained in step 2520 of FIG. 25, and an equation corresponding to the above-described Equation (19).

Figure 27:
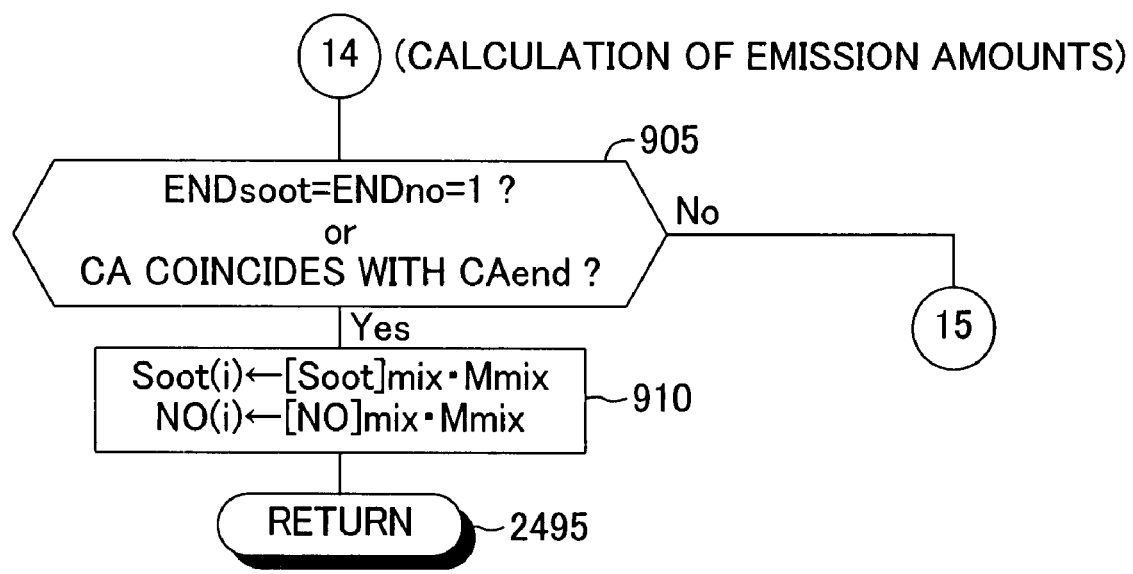
FIG. 27 is a flowchart showing a fourth portion of the routine which the CPU of the third embodiment executes so as to calculate emission amounts associated with the i-th injection ($2 \leq i \leq n$).

The CPU 61 then proceeds the routine of FIG. 27, and repeatedly executes the processings of step 2505 of FIG. 25 to step 905 of FIG. 27 every time the CPU 61 makes a "No" determination in step 905. As a result, every time a "No" determination is made in step 905, the value of the variable k is incremented by "1," and the crank angle CA associated with the i-th injection is advanced by ΔCA in step 2505 of FIG. 25.

That is, so long as a "No" determination is made in step 905, the mass g(i, k) of cylinder interior gas newly taken into the i-th gas mixture, the state (temperature Tmix, etc.) of the i-th gas mixture, and (so long as the values of the flags ENDsoot and ENDno are zero) the emission concentrations ([Soot]mix and [NO]mix) associated with the i-th gas mixture are obtained for each minute time Δt form the time of the i-th injection (that is, for each minute crank angle ΔCA from CAinj(i)).

When the above-described conditions of step 905 are satisfied, the CPU 61 makes a "Yes" determination in step 905 of FIG. 27, and proceeds to step 910. In step 910, the CPU 61 obtains the amount Soot(i) of soot generated in the i-th gas mixture and the amount NO(i) of NO generated in the i-th gas mixture. The amount Soot(i) of soot generated in the i-th gas mixture can be obtained by multiplying the present soot concentration [Soot]mix in the i-th gas mixture updated by the processing of step 855 of FIG. 26 by the present gas mixture mass Mmix updated by step 2520 of FIG. 25. Further, the amount NO(i) of NO generated in the i-th gas mixture can be obtained by multiplying the present NO concentration [NO]mix in the i-th gas mixture updated by the processing of step 880 of FIG. 26 by the above-described gas mixture mass Mmix.

The CPU 61 then proceeds to the above-described step 2330 of FIG. 23 via step 2495 (that is, after ending the execution of the series of routines shown in FIGS. 24 to 27). In this manner, every time the processing of steps 2320 to 2330 of FIG. 23 is repeatedly executed, the value of i ($2 \leq i \leq n$) is incremented by "1," and the soot generation amount Soot(i) associated with the i-th gas mixture and the NO generation amount NO(i) associated with the i-th gas mixture are successively obtained in step 910 of FIG. 27. In the above, the series of routines shown in FIGS. 24 to 27 have been described.

As described above, when the value of the variable i has reached the division number n, the CPU 61 makes a "Yes" determination in step 2335 of FIG. 23. In this case, the CPU 61 executes steps 925 to 960 so as to correct the injection pressure on the basis of the total soot generation amount Soot and the total NO generation amount NO (accordingly, the results of estimation of the total emission generation amounts) obtained in step 2330 of FIG. 23. The CPU 61 then proceeds to step 1995 so as to end the present execution of the series of routines of FIGS. 19 to 23. After this point in time, the CPU 61 makes a "No" determination every time it proceeds to step 505 of FIG. 19 until the next IVC comes.

As described above, according to the third embodiment of the gas-mixture-state estimation apparatus and the emission-generation-amount estimation apparatus of the present invention, the injection period TAU is divided into a large number of n ($=TAU/\Delta t$) periods; and it is assumed that fuel of mass q(i) for an injection period "i-th minute time Δt" corresponding to the i-th injection ($1 \leq i \leq n$) is performed at one time when (i−1)·Δt has elapsed after the fuel injection start timing CAinj. The excess air ratio $\lambda(k)$ of the first gas mixture (first-portion mixing index value) at the time point at which the post injection time t associated with the first gas mixture is equal to k·Δt is obtained by making use of the above-described Equations (2) and (3) as in the first and second embodiments, and the state (temperature Tmix, etc.) of the first gas mixture is estimated by making use of the excess air ratio $\lambda(k)$.

The excess air ratio of the i-th gas mixture (i: natural number not less than 2 and not greater than n) at the time point at which the post injection time t associated with the i-th gas mixture is equal to k·Δt is assumed to be equal to the above-described "excess air ratio $\lambda(k)$ of the first gas mixture at the time point at which the post injection time t associated with the first gas mixture is equal to k·Δt." Under such an assumption, the state (temperature Tmix, etc.) of the i-th gas mixture ($i \geq 2$) is estimated without use of the above-described Equations (2) and (3).

Accordingly, only the first gas mixture requires the calculation of the excess air ratio λ which utilizes the above-described Equations (2) and (3). As a result, the number of times of the calculation of the excess air ratio λ which utilizes the above-described Equations (2) and (3) and which entails a large calculation load can be reduced, whereby the calculation load of the CPU 61 can be reduced.

The present invention is not limited to the above-described third embodiment, and various modifications can be employed within the scope of the present invention. For example, in the above-described third embodiment, the excess air ratio of the i-th gas mixture (i: natural number not less than 2 and not greater than n) at the time point at which the post injection time t associated with the i-th gas mixture is equal to k·Δt is assumed to be equal to the above-described "excess air ratio $\lambda(k)$ of the first gas mixture at the time point at which the post injection time t associated with the first gas mixture is equal to k·Δt." However, the excess air ratio of the i-th gas mixture may be assumed to be equal to a value obtained by multiplying the excess air ratio $\lambda(k)$ by a predetermined coefficient.

That is, when the excess air ratio of the i-th gas mixture ($i \geq 2$) at the time point at which the post injection time t associated with the i-th gas mixture is equal to k·Δt is represented by $\lambda(i, k)$ (i: natural number not less than 2 and not greater than n), for example, the $\lambda(i, k)$ is set to be equal to $h(i) \cdot \lambda(k)$, where h(i) is a coefficient determined in accordance with the variable i.

In such a case, the amount g(i, k) of cylinder interior gas newly taken into the i-th gas mixture ($2 \leq i \leq n$) during a period between a time point at which the post injection time t associated with the i-th gas mixture=(k−1)·Δt and a time point at which the post injection time t=k·Δt can be obtained in accordance with an equation "$g(i, k) = \text{stoich} \cdot (\lambda(i, k) - \lambda(i, k-1)) \cdot q(i)$," which corresponds to the above-described Equation (33), rather than the above-described Equation (34) described step 2510 of FIG. 25.

Fourth Embodiment

Next, there will be described an emission-generation-amount estimation apparatus for an internal combustion engine according to a fourth embodiment of the present invention. This fourth embodiment differs from the first through third embodiments in the point that a so-called steady flame is assumed to be generated in each combustion chamber after ignition of a gas mixture, and the state (temperature, etc.) of the gas mixture and emission generation amounts are estimated by making use of characteristics peculiar to such a steady flame. The point of difference will be mainly described below.

The travel distance of injected fuel (accordingly, gas mixture) from the injection opening of the fuel injection valve 21 after the injection start timing (hereinafter referred to as "gas mixture travel distance X") can be obtained as a function of the post injection time t in accordance with the following Equations (35) and (36), which are empirical formulas introduced in the above-described Non-Patent Document 1. In Equation (36), dX/dt represents a gas mixture moving speed, which is a function of the post injection time t. Notably, the various values shown in the right side of Equation (36) are identical with those shown in right side of the above-described Equation (3).

$$X = \int \frac{dX}{dt} dt \qquad (35)$$

$$\frac{dX}{dt} = \frac{1}{2} \cdot \left(\frac{2c \cdot \Delta P}{\rho g}\right)^{0.25} \cdot \left[\frac{d}{\tan\theta}\right]^{0.5} \cdot \frac{1}{t^{0.5}} \qquad (36)$$

Here, when the both sides of the above-described Equation (3) are divided by the both sides of Equation (36), dλ/dx can be represented by making use of ρg, tan θ, and various constants. Here, if ρg and tan θ are assumed to be constant after injection, dλ/dx becomes a certain constant (positive value). Further, the excess air ratio λ is "0" when the gas mixture travel distance X is zero (accordingly, at the time of injection).

Accordingly, in this case, a linear relation as shown in FIG. 28 exists between the gas mixture travel distance X and the excess air ratio λ. That is, the excess air ratio λ increases from "0" as the gas mixture travel distance X increases from "0," and becomes 1 when X=X0.

Meanwhile, if the injection period TAU of fuel is relatively long, as shown in FIG. 28, in some cases, a so-called steady flame (or flame very similar to steady flame) may be generated within a combustion chamber after ignition of a gas mixture.

When a steady flame is generated, in a region of the steady flame in which fuel is excessive (that is, a region in which the excess air ratio λ is less than 1; hereinafter referred to as a "rich region"), oxygen has been completely consumed by combustion because oxygen contained in the cylinder interior gas taken into the gas mixture is insufficient. That is, in the rich region of the steady flame (in FIG. 28, corresponding to 0≦x≦X0), the oxygen concentration in the steady state (hereinafter referred to as "steady-state oxygen concentration [02]mixsteady") is zero. Notably, in the rich region of the steady flame, even after oxygen has been completely consumed by combustion, fuel remains there, so that the fuel concentration in the steady state (hereinafter referred to as "steady-state fuel concentration [Fuel]mixsteady") assumes a value greater than zero.

Meanwhile, when a steady flame is generated, in a region of the steady flame in which oxygen is excessive (that is, a region in which the excess air ratio λ is greater than 1; hereinafter referred to as a "lean region"), fuel has been completely consumed by combustion because the fuel is insufficient. That is, in the lean region of the steady flame (in FIG. 28, corresponding to X0≦X), the steady-state fuel concentration [Fuel]mixsteady is zero. Notably, in the lean region of the steady flame, even after fuel has been completely consumed by combustion, oxygen remains there, so that the steady-state oxygen concentration [02]mixsteady assumes a value greater than zero.

As described before, the above-descried Equation (23) for obtaining the soot generation speed d[Soot]mix/dt within the gas mixture includes a term for obtaining a soot formation speed dmsf/dt, which includes the gas mixture fuel concentration [Fuel]mix, as a factor, as shown in the above-descried Equation (24), and a term for obtaining a soot oxidation speed dmso/dt, which includes the gas mixture oxygen concentration [O2]mix, as a factor, as shown in the above-descried Equation (25).

Accordingly, when the soot generation speed d[Soot]mix/dt in the rich region of the steady flame is calculated in accordance with the above-descried Equation (23), the value of the term for obtaining the soot oxidation speed dmso/dt shown in the above-descried Equation (25) is always maintained at zero. In other words, in this case, calculation of the term for obtaining the soot oxidation speed dmso/dt can be omitted.

Similarly, when the soot generation speed d[Soot]mix/dt in the lean region of the steady flame is calculated in accordance with the above-descried Equation (23), the value of the term for obtaining the soot formation speed dmsf/dt shown in the above-descried Equation (24) is always maintained at zero. In other words, in this case, calculation of the term for obtaining the soot formation speed dmsf/dt can be omitted.

In addition, the right sides of the above-described Equations (24) and (25) include power calculations regarding variables Pg and Tmix, which change momentarily. The power calculations involve a huge calculation load. Accordingly, it is desired to reduce the number of times of calculation of Equations (24) and (25) to a possible extent.

In view of the above, in the fourth embodiment in which the soot generation speed d[Soot]mix/dt in a region occupied by a steady flame (that is, in a gas mixture) is estimated on the basis of the above-described Equation (23), in the rich region of a steady flame (λ<1), the soot generation speed d[Soot]mix/dt is obtained in accordance with "d[Soot]mix/dt=dmsf/dt," which is an equation obtained from the above-described Equation (23) by removing the term dmso/dt therefrom.

Similarly, in the fourth embodiment, in the lean region of a steady flame (λ>1; in actuality, λ≧1), the soot generation speed d[Soot]mix/dt is obtained in accordance with "d[Soot]mix/dt=−dmso/dt," which is an equation obtained from the above-described Equation (23) by removing the term dmsf/dt therefrom. Whit these calculations, the number of times of calculation of Equations (24) and (25) can be reduced, and as a result, the calculation load of the CPU 61 can be reduced.

Next, there will be successively described methods of obtaining the temperature of gas mixture (specifically, a gas-mixture-temperature increase amount by combustion in the steady state; hereinafter referred to as "steady-state gas-mixture-temperature increase amount ΔTmixsteady"), the above-described steady-state fuel concentration [Fuel]mixsteady, the above-described steady-state oxygen concentration [02]mixsteady, which are necessary to obtain the soot generation speed d[Soot]mix/dt in the region occupied by a steady flame (that is, in a gas mixture) by making use of the above-described Equation (23), as well as a method of obtaining a nitrogen concentration in the steady state (hereinafter referred to as "steady-state nitrogen concentration [N2]mixsteady"), which is necessary to obtain the NO generation speed d[NO]mix/dt in the region occupied by the steady flame (that is, in a gas mixture) by making use of the above-described Equation (27).

The excess air ratio λ, which becomes necessary in the descriptions of the abovementioned methods, is defined in accordance with the following Equation (37) by use of the above-described cylinder-interior-gas stoichiometric air-fuel ratio stoich, fuel quantity (mass) Q, and gas-mixture forming cylinder interior gas mass G.

$$\lambda = \left(\frac{1}{stoich}\right) \cdot \frac{G}{Q} \quad (37)$$

<Steady-State Gas-Mixture-Temperature Increase Amount ΔTmixsteady>

The steady-state gas-mixture-temperature increase amount ΔTmixsteady can be represented by the following Equation (38). In the following Equation (38), Qreac represents the amount (mass) of fuel consumed through combustion in a gas mixture, Cg represents the constant-pressure specific heat of cylinder interior gas, and Cf represents the constant-pressure specific heat of fuel. Hf is a coefficient for converting the Qreac to a reaction heat Hr (=Hf·Qreac). This Equation (38) is based on the assumption that "the reaction heat Hr generated as a result of combustion of fuel of the mass Qreac in a gas mixture is consumed to increase the temperature of the gas mixture containing fuel of the mass Q and cylinder interior gas of the mass G by the steady-state gas-mixture-temperature increase amount ΔTmixsteady."

$$\Delta Tmixsteady = \frac{Hf \cdot Qreac}{G \cdot Cg + Q + Cf} \quad (38)$$

Here, in the rich region of a steady flame (λ<1), the amount Qreac of fuel consumed through combustion in the gas mixture is equal to the amount of fuel consumed as a result of reaction with all oxygen contained in cylinder interior gas in the gas mixture, and therefore can be obtained by the following Equation (39).

$$Qreac = \frac{G}{stoich} \quad (39)$$

When Q, G, and Qreac are eliminated from the above-described Equations (37) to (39), and a resultant equation is arranged, the steady-state gas-mixture-temperature increase amount ΔTmixsteady in the rich region of a steady flame (λ<1) can be represented by the following Equations (40) as a function of the excess air ratio λ.

$$\Delta Tmixsteady = \frac{Hf \cdot \lambda}{stoich \cdot Cg \cdot \lambda + Cf} \quad (\lambda < 1) \quad (40)$$

Meanwhile, in the lean region of a steady flame (λ>1; in actuality, λ≧1), the fuel within the gas mixture is completely consumed through combustion, and therefore, the amount Qreac of fuel consumed through combustion in the gas mixture is equal to "Q." When Q, G, and Qreac are eliminated from the above-described Equations (37) and (38) while the relation "Qreac=Q" is used, and a resultant equation is arranged, the steady-state gas-mixture-temperature increase amount ΔTmixsteady in the lean region of a steady flame (λ>1; in actuality, λ≧1) can be represented by the following Equations (41) as a function of the excess air ratio λ.

$$\Delta Tmixsteady = \frac{Hf}{stoich \cdot Cg \cdot \lambda + Cf} \quad (\lambda \geq 1) \quad (41)$$

Figure 29:
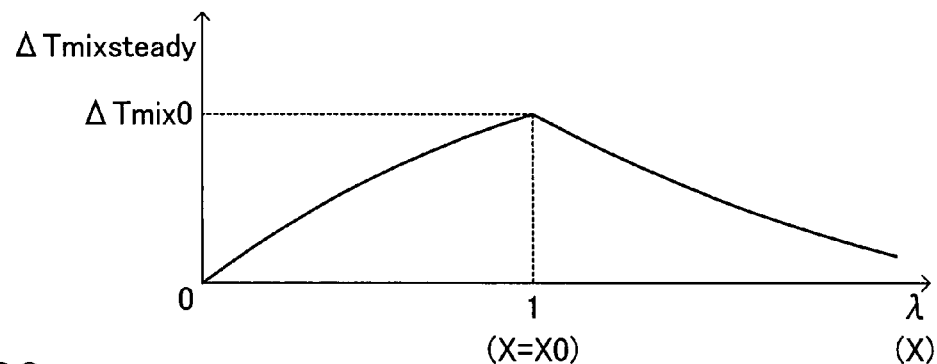
FIG. 29 is a graph showing the relation between excess air ratio (gas mixture travel distance) and steady-state gas mixture temperature increase in a region occupied by a steady flame.

FIG. 29 is a graph showing the relation between the excess air ratio λ and the steady-state gas-mixture-temperature increase amount ΔTmixsteady represented by Equations (40) and (41). Notably, in consideration of the linear relation between the gas mixture travel distance X and the excess air ratio λ as shown in FIG. 28, FIG. 29 can be said to be a graph showing the relation between the gas mixture travel distance X and the steady-state gas-mixture-temperature increase amount ΔTmixsteady. As shown in FIG. 29, the steady-state gas-mixture-temperature increase amount ΔTmixsteady assumes the maximum value ΔTmix0=Hf/(stoich·Cg+Cf) when λ=1 (that is, X=X0; see FIG. 28).

<Steady-State Fuel Concentration [Fuel]Mixsteady>

As described above, in the lean region of the steady flame, the steady-state fuel concentration [Fuel]mixsteady is maintained at zero irrespective of the excess air ratio λ (according, the gas mixture travel distance X). Meanwhile, in the rich region (λ<1) of the steady flame, the amount (mass) of fuel remaining in the gas mixture can be represented as (Q−(G/stoich)) when the above-described Equation (39) is taken into consideration. Accordingly, the steady-state fuel concentration [Fuel]mixsteady, which is the ratio of the "amount (mass) of fuel remaining in the gas mixture" to the mass (Q+G) of the gas mixture, can be represented by the following Equation (42).

$$[Fuel]mixsteady = \frac{Q - \frac{G}{stoich}}{Q + G} \quad (42)$$

Accordingly, when Q and G are eliminated from the above-described Equations (37) and (42), and a resultant equation is arranged, the steady-state fuel concentration [Fuel]mixsteady in the rich region (λ<1) of the steady flame can be represented by the following Equations (43) as a function of the excess air ratio λ.

$$[Fuel]mixsteady = \frac{1 - \lambda}{1 + stoich \cdot \lambda} \quad (\lambda < 1) \quad (43)$$

Figure 30:
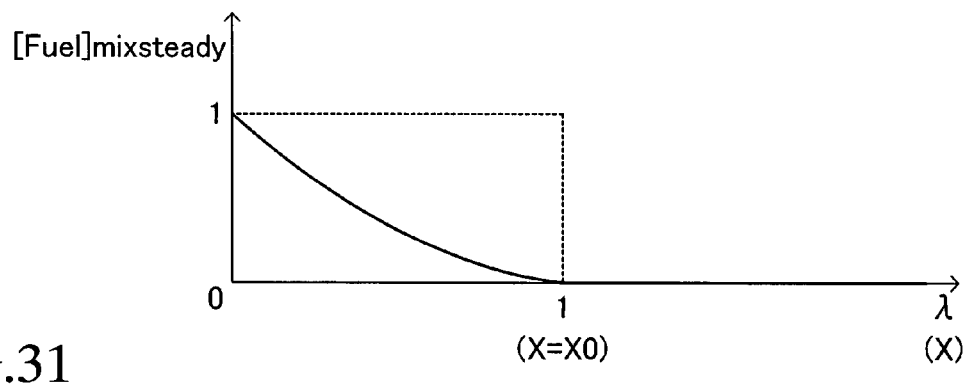
FIG. 30 is a graph showing the relation between excess air ratio (gas mixture travel distance) and steady-state fuel concentration in a region occupied by a steady flame.

FIG. 30 is a graph showing the relation between the excess air ratio λ and the steady-state fuel concentration [Fuel]mixsteady represented by Equation (43). Notably, in consideration of the linear relation between the gas mixture travel distance X and the excess air ratio λ, FIG. 30 can be said to be a graph showing the relation between the gas mixture travel distance X and the steady-state fuel concentration [Fuel]mixsteady.

<Steady-State Oxygen Concentration [O2]Mixsteady>

As described above, in the rich region of the steady flame, the steady-state oxygen concentration [O2]mixsteady is maintained at zero irrespective of the excess air ratio λ (according, the gas mixture travel distance X). Meanwhile, in the lean region (λ>1; in actuality, λ≧1) of the steady flame, the amount (mass) of oxygen remaining in the gas mixture can be represented as (G−(Q·stoich))·[O2]in when the above-described relation "Qreac=Q" is taken into consideration. Here, [O2]in represents the oxygen concentration of intake air (accordingly, the oxygen concentration of cylinder interior gas). Accordingly, the steady-state oxygen concentration [O2] mixsteady, which is the ratio of the "amount (mass) of oxygen remaining in the gas mixture" to the mass (Q+G) of the gas mixture, can be represented by the following Equation (44).

$$[O2]mixsteady = \frac{(G - Q \cdot stoich) \cdot [O2]in}{Q + G} \quad (44)$$

Accordingly, when Q and G are eliminated from the above-described Equations (37) and (44), and a resultant equation is arranged, the steady-state oxygen concentration [O2]mixsteady in the lean region (λ≧1) of the steady flame can be represented by the following Equations (45) as a function of the excess air ratio λ.

$$[O2]mixsteady = \frac{stoich \cdot (\lambda - 1) \cdot [O2]in}{1 + stoich \cdot \lambda} \quad (\lambda \geq 1) \quad (45)$$

Figure 31:
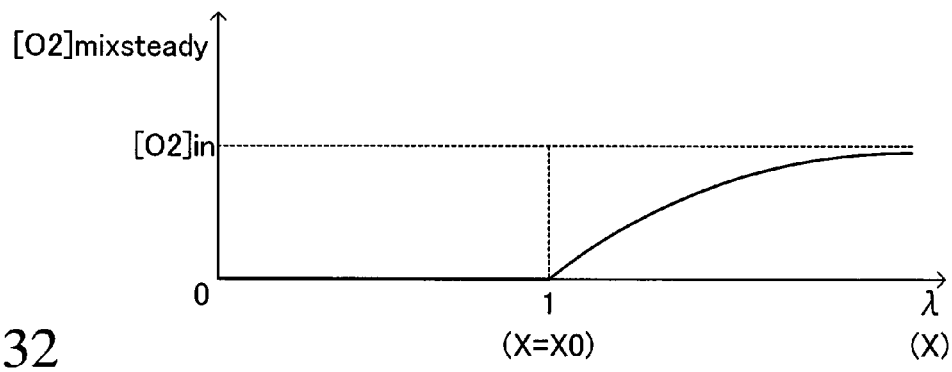
FIG. 31 is a graph showing the relation between excess air ratio (gas-mixture reaching distance) and steady-state oxygen concentration in a region occupied by a steady flame.

FIG. 31 is a graph showing the relation between the excess air ratio λ and the steady-state oxygen concentration [O2] mixsteady represented by Equation (45). Notably, in consideration of the linear relation between the gas mixture travel distance X and the excess air ratio λ, FIG. 31 can be said to be a graph showing the relation between the gas mixture travel distance X and the steady-state oxygen concentration [O2] mixsteady.

<Steady-State Nitrogen Concentration [N2]Mixsteady>

As described above, since nitrogen in the cylinder interior gas is an inert gas, nitrogen is not consumed through chemical reactions in the gas mixture. Therefore, the amount (mass) of nitrogen remaining in the gas mixture can be represented as G·[N2]in. Here, [N2]in represents the nitrogen concentration of intake air (accordingly, the nitrogen concentration of cylinder interior gas). Accordingly, the steady-state nitrogen concentration [N2]mixsteady, which is the ratio of the "amount (mass) of nitrogen remaining in the gas mixture" to the mass (Q+G) of the gas mixture, can be represented by the following Equation (46).

$$[N2]mixsteady = \frac{G[N2]in}{Q + G} \quad (46)$$

Accordingly, when Q and G are eliminated from the above-described Equations (37) and (46), and a resultant equation is arranged, the steady-state nitrogen concentration [N2]mixsteady can be represented by the following Equations (47) as a function of the excess air ratio λ.

$$[N2]mixsteady = \frac{stoich \cdot \lambda [N2]in}{1 + stoich \cdot \lambda} \quad (47)$$

Figure 32:
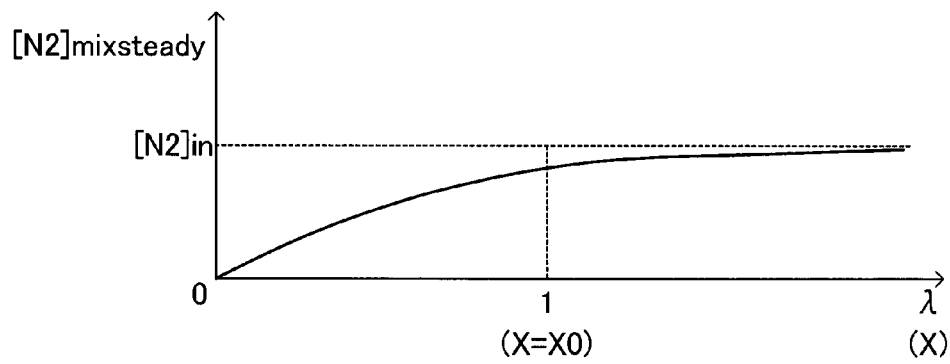
FIG. 32 is a graph showing the relation between excess air ratio (gas mixture travel distance) and steady-state nitrogen concentration in a region occupied by a steady flame.

FIG. 32 is a graph showing the relation between the excess air ratio λ and the steady-state nitrogen concentration [N2] mixsteady represented by Equation (47). Notably, in consideration of the linear relation between the gas mixture travel distance X and the excess air ratio λ, FIG. 32 can be said to be a graph showing the relation between the gas mixture travel distance X and the steady-state nitrogen concentration [N2] mixsteady.

As described above, in the region occupied by the steady flame (that is, in the gas mixture), each of the steady-state gas-mixture-temperature increase amount ΔTmixsteady, the steady-state fuel concentration [Fuel]mixsteady, the steady-state oxygen concentration [O2]mixsteady, and the steady-state nitrogen concentration [N2]mixsteady can be represented by a function of the excess air ratio λ.

Figure 33:
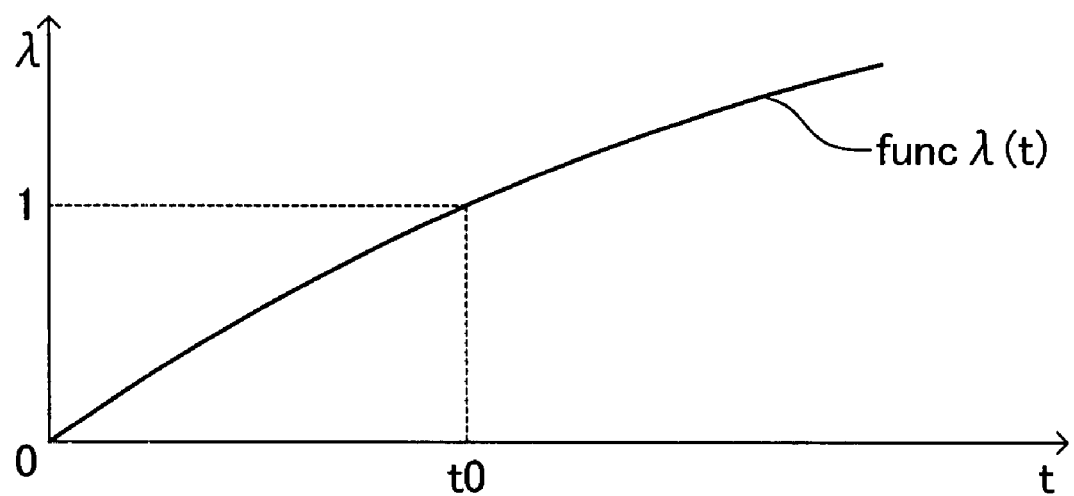
FIG. 33 is a graph showing the relation between post injection time and excess air ratio in a region occupied by a steady flame.
Figure 34:
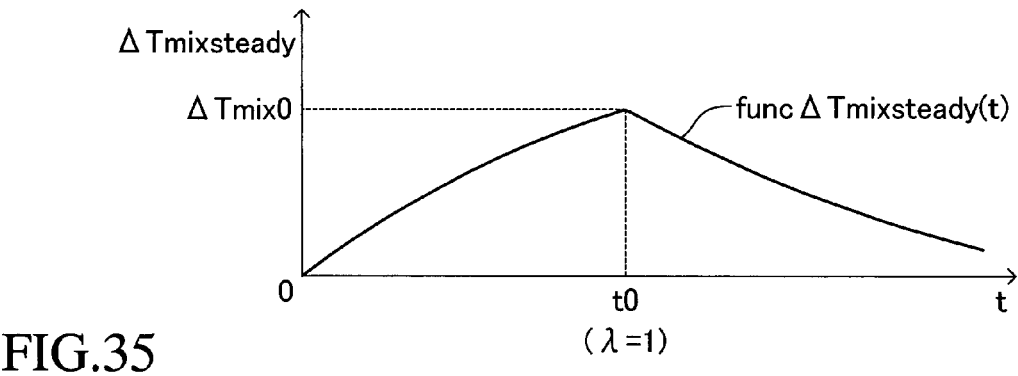
FIG. 34 is a graph showing the relation between post injection time and steady gas mixture temperature increase in a region occupied by a steady flame.
Figure 35:
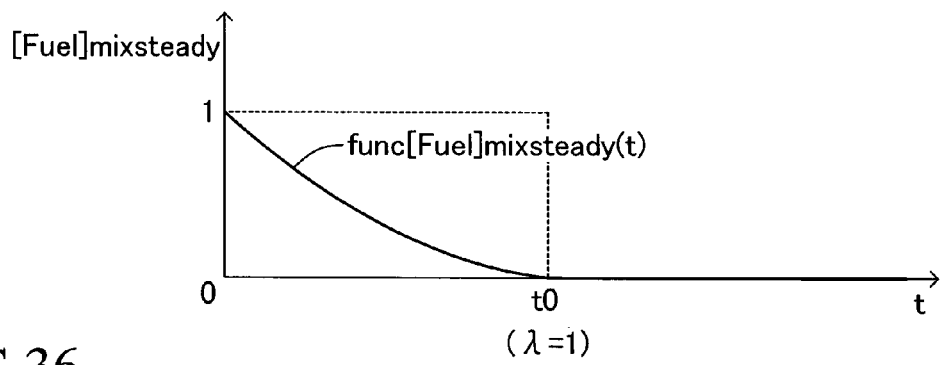
FIG. 35 is a graph showing the relation between post injection time and steady fuel concentration in a region occupied by a steady flame.
Figure 36:
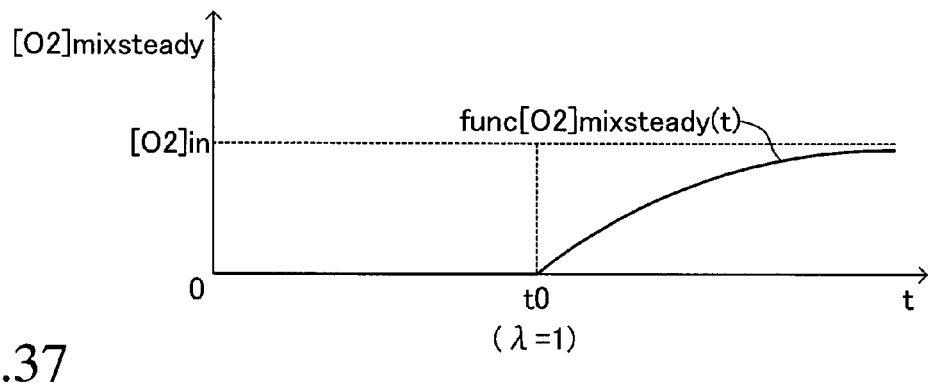
FIG. 36 is a graph showing the relation between post injection time and steady oxygen concentration in a region occupied by a steady flame.
Figure 37:
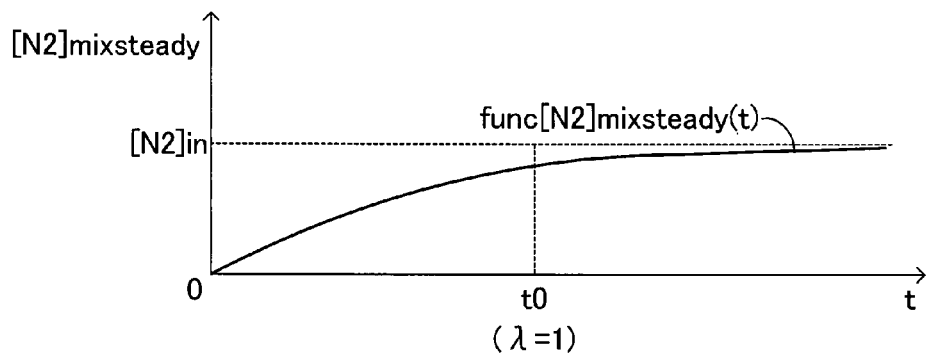
FIG. 37 is a graph showing the relation between post injection time and steady nitrogen concentration in a region occupied by a steady flame.

Meanwhile, the excess air ratio λ can be represented as a function funcλ(t) of the post injection time t by the above-described Equations (2) and (3). FIG. 33 is a graph showing the relation between the post injection time t and the excess air ratio λ obtained from the function funcλ(t). Notably, it is assumed that λ=1 when t=t0.

As can be understood from the above, through application of the relation shown in FIG. 33 and obtained from the function funcλ(t) to the relations shown in FIGS. 29 to 32, in the region occupied by the steady flame (that is, in the gas mixture), the steady-state gas-mixture-temperature increase amount ΔTmixsteady, the steady-state fuel concentration [Fuel]mixsteady, the steady-state oxygen concentration [O2] mixsteady, and the steady-state nitrogen concentration [N2] mixsteady can be represented by funcΔTmixsteady(t), func [Fuel]mixsteady(t), func[O2]mixsteady(t), and func[N2] mixsteady(t), which are functions of the post injection time t.

FIGS. 34 to 37 are graphs respectively showing the relations represented by funcΔTmixsteady(t), func[Fuel]mixsteady(t), func[O2]mixsteady(t), and func[N2]mixsteady(t). In the fourth embodiment, the soot generation speed d[Soot] mix/dt and the NO generation speed d[NO]mix/dt in the region occupied by the steady flame (that is, in the gas mixture) are obtained by making use of funcΔTmixsteady(t), func[Fuel]mixsteady(t), func[O2]mixsteady(t), and func [N2]mixsteady(t), which are functions of the post injection time t.

(Actual Operation of Fourth Embodiment)

Next, there will be described actual operation of the emission-generation-amount estimation apparatus according to the fourth embodiment. Of the series of routines shown in FIGS. 5 to 9 and the routine of FIG. 13, which are executed by the CPU 61 of the first embodiment, the CPU 61 of this apparatus executes the routine of FIG. 13 as it is, and executes a series of routines shown by flowcharts in FIGS. 38 to 41 in place of the series of routines shown in FIGS. 5 to 9.

Notably, steps of the routines shown in FIGS. 38 to 41 which are the same as those of the routines shown in FIGS. 5 to 9 are denoted by reference numerals identical to those of the corresponding steps of the routines shown in FIGS. 5 to 9. Their repeated descriptions are not omitted. The routines shown in FIGS. 38 to 41, which are peculiar to the fourth embodiment, will now be described. Notably, the routine of FIG. 38 corresponds to the routine of FIG. 5; the routine of FIG. 39 corresponds to the routine of FIG. 6; the routine of FIG. 40 corresponds to the routines of FIGS. 7 and 8; and the routine of FIG. 41 corresponds to the routine of FIG. 9.

The CPU 61 of the fourth embodiment repeatedly executes, at predetermined intervals, the series of routines shown in FIG. 38 to 41, which correspond to the series of routines shown in FIG. 5 to 9. Therefore, when a predetermined timing has been reached, the CPU 61 starts the processing from step 3800 of FIG. 38, and then proceeds to step 505. When the CPU 61 makes a "Yes" determination in step 505 (that is, IVC has come), the CPU 61 successively performs the processings of steps 510 to 530, and then successively performs the processings of steps 550 to 560.

Figure 38:
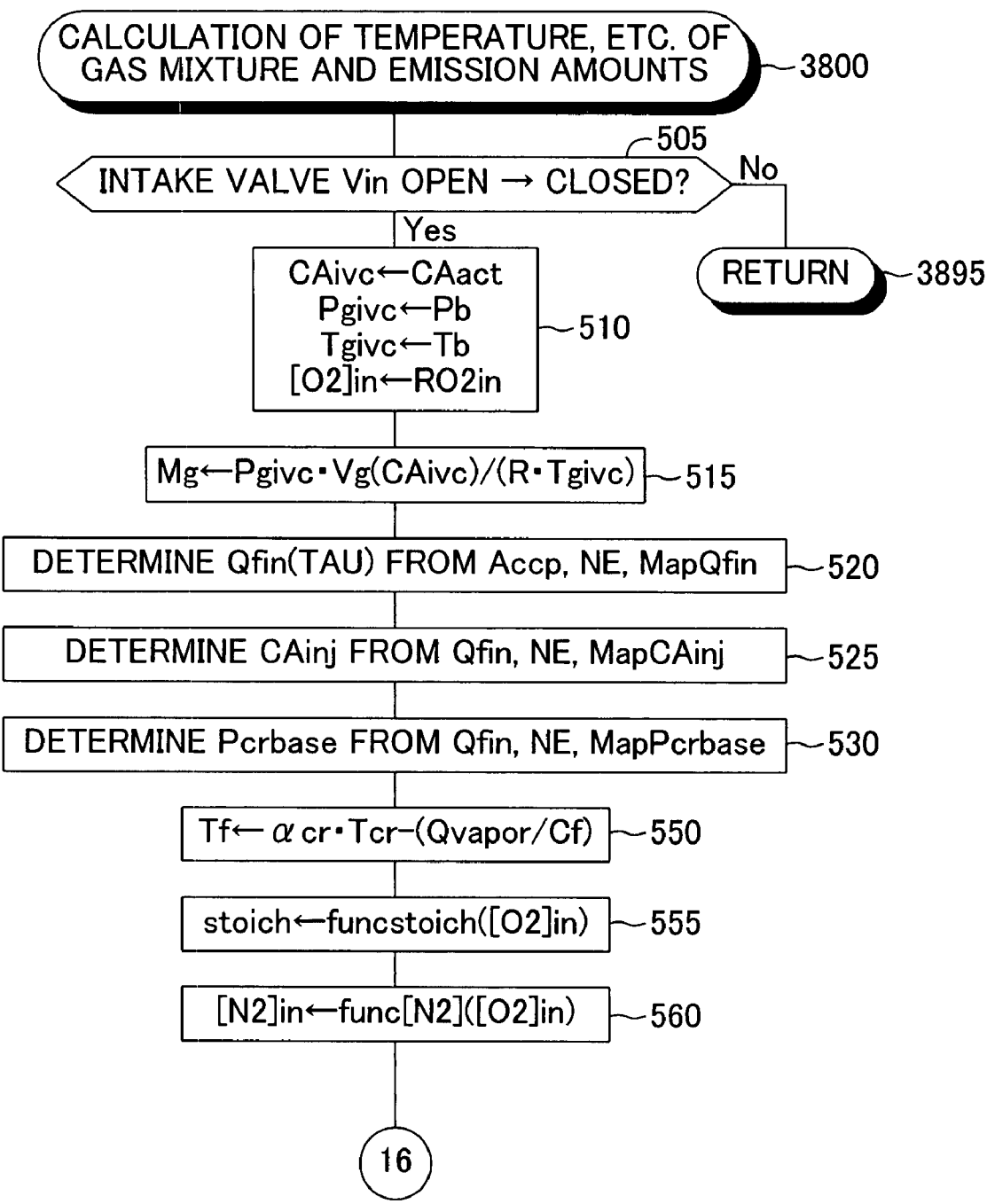
FIG. 38 is a flowchart showing a first portion of a routine which a CPU of a fourth embodiment executes so as to calculate gas mixture temperature, etc., and emission amounts.
Figure 39:
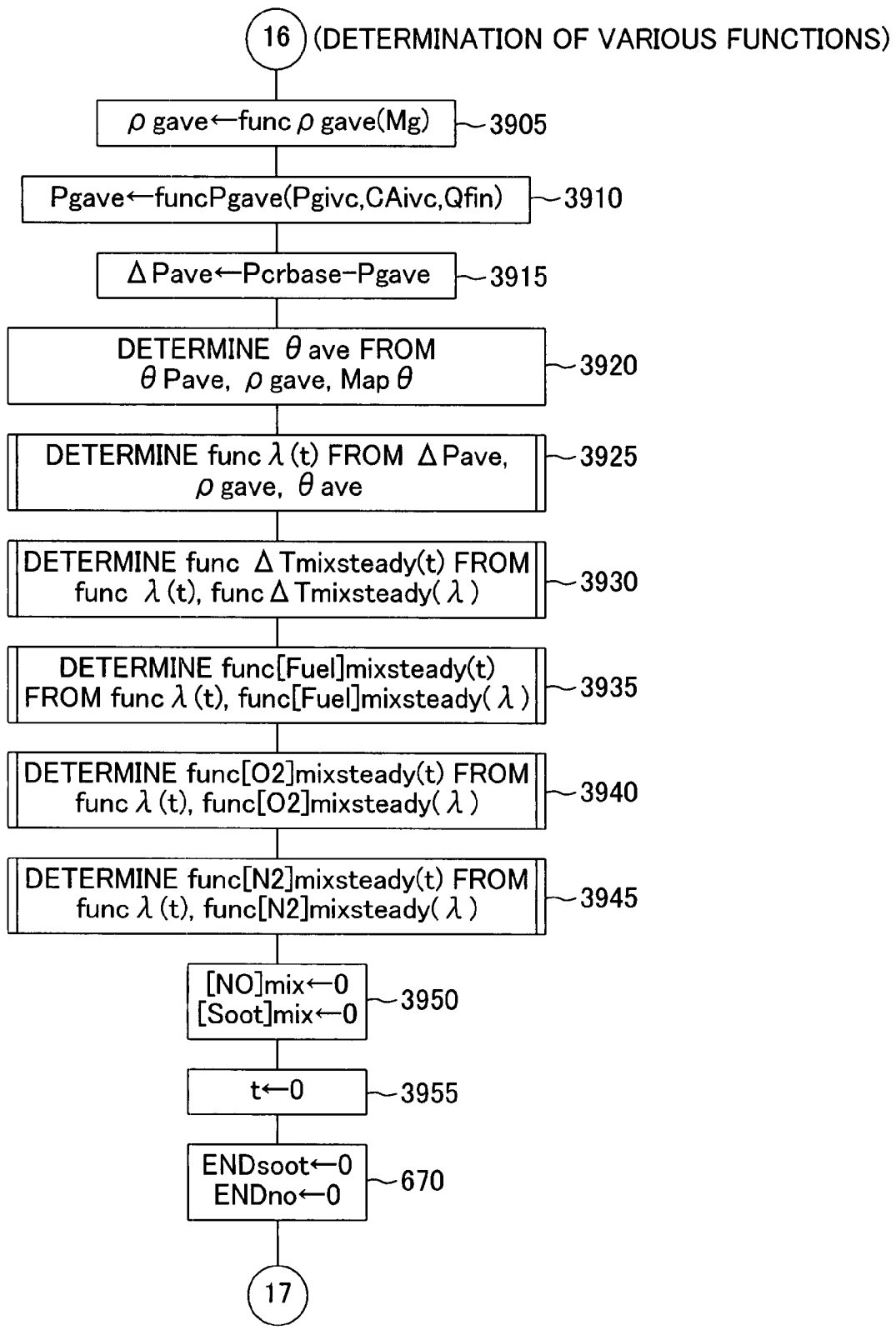
FIG. 39 is a flowchart showing a second portion of the routine which the CPU of the fourth embodiment executes so as to calculate gas mixture temperature, etc., and emission amounts.

Next, the CPU 61 proceeds to the routine of FIG. 39 so as to perform processing for determining various functions. Specifically, the CPU 61 proceeds to step 3905, and obtains a steady-flame-time average cylinder interior gas density ρgave, which is the average value of cylinder interior gas density ρg during a period in which a steady flame is generated. Since the steady-flame-time average cylinder interior gas density ρgave is determined depending on the total mass Mg of the cylinder interior gas, the steady-flame-time average cylinder interior gas density ρgave is obtained from the total mass Mg of the cylinder interior gas obtained in step 515 of FIG. 38, and a function funcρgave for obtaining ρgave while using Mg as an argument.

Subsequently, the CPU 61 proceeds to step 3910, and obtains a steady-flame-time average cylinder interior gas pressure Pgave, which is the average value of cylinder interior gas pressure Pg during a period in which a steady flame is generated. Since the steady-flame-time average cylinder interior gas pressure Pgave is determined depending on the cylinder interior gas pressure Pgivc at IVC, the crank angle CAivc at IVC, and the instruction fuel injection quantity Qfin, the steady-flame-time average cylinder interior gas pressure Pgave is obtained from the cylinder interior gas pressure Pgivc at IVC and the crank angle CAivc at IVC, which are obtained in step 510 of FIG. 38, the instruction fuel injection quantity Qfin obtained in step 520 of FIG. 38, and a function funcPgave for obtaining Pgave while using Pgivc, CAivc, and Qfin as arguments.

The CPU 61 then proceeds to step 3915, and obtains a steady-flame-time average effective injection pressure ΔPave by subtracting the steady-flame-time average cylinder interior gas pressure Pgave from the base fuel injection pressure Pcrbase obtained in step 530 of FIG. 38. In step 3920 subsequent thereto, the CPU 61 obtains a steady-flame-time average spray angle θave on the basis of the obtained steady-flame-time average effective injection pressure ΔPave, the obtained steady-flame-time average cylinder interior gas density ρgave, and the above-described table Mapθ. With this processing, the steady-flame-time average spray angle θave is determined on the basis of ΔPave and ρgave.

Subsequently, the CPU 61 proceeds to step 3925, and, by making use of the above-described Equations (2) and (3), determines the above-described function funcλ(t) (see FIG. 33), which defines the relation between the post injection time t and the excess air ratio λ, while using the steady-flame-time average effective injection pressure ΔPave, the steady-flame-time average cylinder interior gas density ρgave, and the steady-flame-time average spray angle θave as the effective injection pressure ΔP, the cylinder interior gas density ρg, and the spray angle θ of the above-described Equation (3).

Next, the CPU 61 proceeds to step 3930, and determines the function funcΔTmixsteady(t), which is used for obtaining the stead-state gas-mixture-temperature increase amount ΔTmixsteady while using the post injection time t as an argument, from the obtained function funcλ(t), and a function funcΔTmixsteady(λ) for obtaining ΔTmixsteady represented by the above-described Equations (40) and (41) in which the excess air ratio λ is used as an argument.

Subsequently, the CPU 61 proceeds to step 3935, and determines the function func[Fuel]mixsteady(t), which is used for obtaining the steady-state fuel concentration [Fuel]mixsteady while using the post injection time t as an argument, from the obtained function funcλ(t), and a function func[Fuel]mixsteady(λ) for obtaining [Fuel]mixsteady represented by the above-described Equation (43) in which the excess air ratio λ is used as an argument.

Then, the CPU 61 proceeds to step 3940, and determines the function func[O2]mixsteady(t), which is used for obtaining the steady-state oxygen concentration [O2]mixsteady while using the post injection time t as an argument, from the obtained function funcλ(t), and a function func[O2]mixsteady(λ) for obtaining [O2]mixsteady represented by the above-described Equation (45) in which the excess air ratio λ is used as an argument.

Next, the CPU 61 proceeds to step 3945, and determines the function func[N2]mixsteady(t), which is used for obtaining the steady-state nitrogen concentration [N2]mixsteady while using the post injection time t as an argument, from the obtained function funcλ(t), and a function func[N2]mixsteady(λ) for obtaining [N2]mixsteady represented by the above-described Equation (47) in which the excess air ratio λ is used as an argument.

Subsequently, the CPU 61 proceeds to step 3950 so as to set each of the gas mixture NO concentration [NO]mix and the gas mixture soot concentration [Soot]mix to an initial value "0" as in step 660 of FIG. 6. In step 3955 subsequent thereto, the CPU 61 sets the post injection time t to an initial value "0" as in step 665 of FIG. 6.

Figure 40:
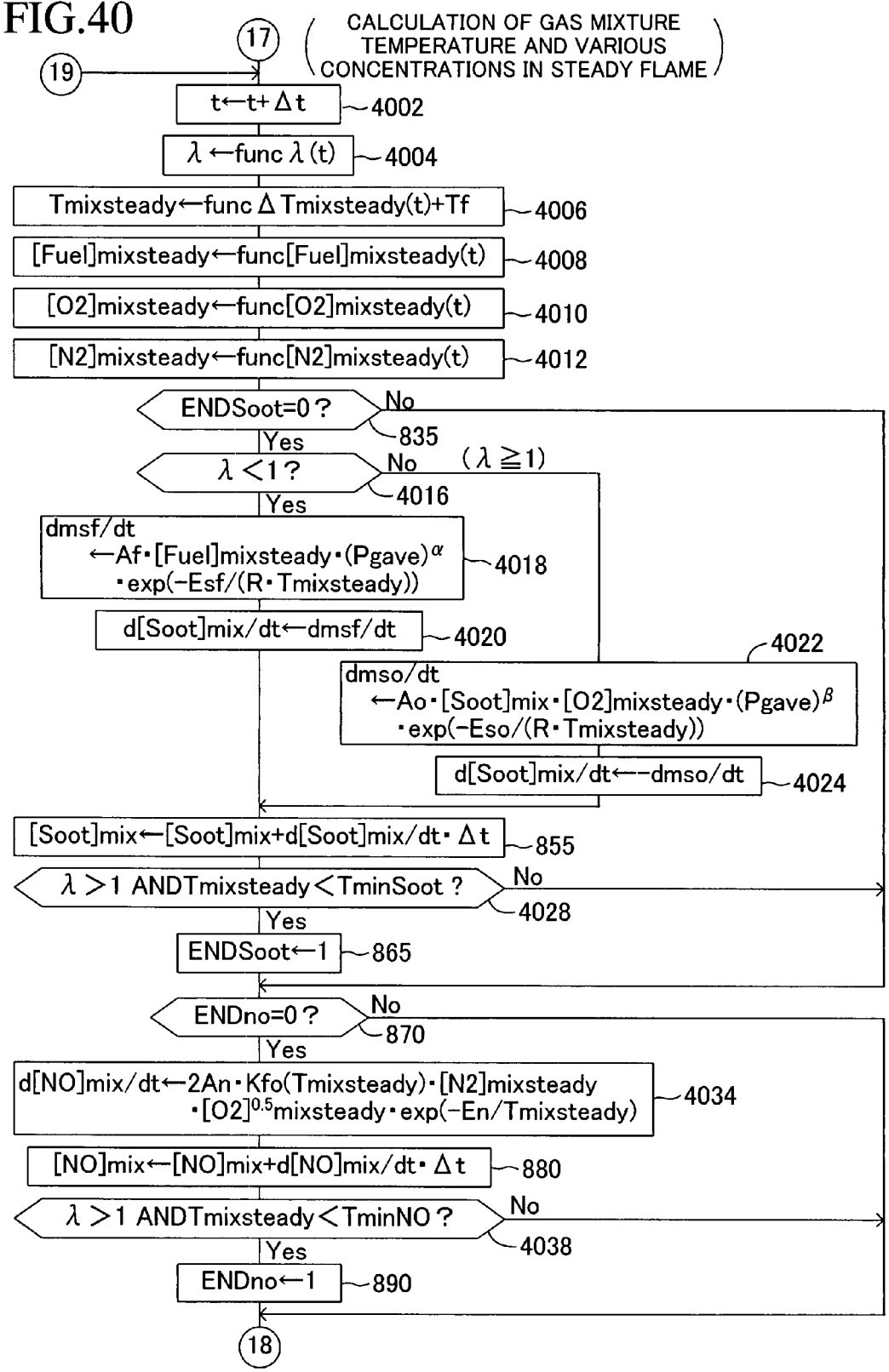
FIG. 40 is a flowchart showing a third portion of the routine which the CPU of the fourth embodiment executes so as to calculate gas mixture temperature, etc., and emission amounts.

Next, the CPU 61 executes the processing of step 670, proceeds to the routine of FIG. 40, and starts processing for calculating the gas mixture temperature, various concentrations, etc. in the region occupied by the steady flame (accordingly, in the gas mixture). Specifically, the CPU 61 first proceeds to step 4002, and advances the post injection time t (the initial value is "0" because of the processing of step 3955 of FIG. 39) by the minute time Δt (e.g., 0.1 msec). In step 4004 subsequent thereto, the CPU 61 obtains the excess air ratio λ corresponding to the post injection time t on the basis of the present value of the post injection time t and the function funcλ(t) determined in step 3925 of FIG. 39.

The CPU 61 then proceeds to step 4006, and obtains the stead-state gas-mixture-temperature increase amount ΔTmixsteady corresponding to the post injection time t on the basis of the present value of the post injection time t and the function funcΔTmixsteady(t) determined in step 3930 of FIG. 39, and obtains the stead-state gas mixture temperature Tmixsteady corresponding to the post injection time t by adding the fuel vapor temperature Tf obtained in step 550 of FIG. 38 to the obtained ΔTmixsteady.

Subsequently, the CPU 61 proceeds to step 4008, and obtains the stead-state fuel concentration [Fuel]mixsteady corresponding to the post injection time t on the basis of the present value of the post injection time t and the function func[Fuel]mixsteady(t) determined in step 3935 of FIG. 39.

Next, the CPU 61 proceeds to step 4010, and obtains the stead-state oxygen concentration [O2]mixsteady corresponding to the post injection time t on the basis of the present value of the post injection time t and the function func[O2]mixsteady(t) determined in step 3940 of FIG. 39.

Next, the CPU 61 proceeds to step 4012, and obtains the stead-state nitrogen concentration [N2]mixsteady corresponding to the post injection time t on the basis of the present value of the post injection time t and the function func[N2]mixsteady(t) determined in step 3945 of FIG. 39.

Next, the CPU 61 performs the determination of step 835. Here, it is assumed that the CPU 61 makes a "Yes" determination. In this case, the CPU 61 proceeds to step 4016 so as to determine whether or not the excess air ratio λ corresponding to the present post injection time t updated in step 4004 is smaller than "1" (that is, whether or not the present region is the rich region).

When the CPU 61 makes a "Yes" determination (that is, the present region is the rich region), the CPU 61 proceeds to step 4018, and obtains the soot formation speed dmsf/dt on the basis of the stead-state fuel concentration [Fuel]mixsteady corresponding to the present post injection time t obtained in step 4008, the steady-flame-time average cylinder interior gas pressure Pgave obtained in step 3910 of FIG. 39, the stead-state gas mixture temperature Tmixsteady corresponding to the present post injection time t obtained in step 4006, and the above-described Equation (24). Subsequently, the CPU 61 proceeds to step 4020, and obtains the soot generation speed d[soot]mix/dt corresponding to the present post injection time t, from the equation described in the box of step 4020, which can be obtained from the above-described Equation (23) by omitting the term of "dmso/dt" therefrom, and the obtained soot formation speed dmsf/dt. That is, in this case, calculation of the above-described Equation (25) is omitted.

Meanwhile, when the CPU 61 makes a "No" determination in step 4016 (that is, the present region is the lean region), the CPU 61 proceeds to step 4022, and obtains the soot oxidation speed dmso/dt on the basis of the gas mixture soot concentration [Soot]mix at that time, the stead-state oxygen concentration [O2]mixsteady corresponding to the present post injection time t obtained in step 4010, the steady-flame-time average cylinder interior gas pressure Pgave obtained in step 3910 of FIG. 39, the stead-state gas mixture temperature Tmixsteady corresponding to the present post injection time t obtained in step 4006, and the above-described Equation (25). Subsequently, the CPU 61 proceeds to step 4024, and obtains the soot generation speed d[soot]mix/dt corresponding to the present post injection time t, from the equation described in the box of step 4024, which can be obtained from the above-described Equation (23) by omitting the term of "dmsf/dt" therefrom, and the obtained soot oxidation dmso/dt. That is, in this case, calculation of the above-described Equation (24) is omitted.

Once the soot generation speed d[soot]mix/dt corresponding to the present post injection time t is obtained in step 4020 or 4024, the CPU 61 executes the processing of step 855, and then proceeds step 4028 so as to determine whither or not the excess air ratio λ corresponding to the present post injection time t is greater than "1" and the stead-state gas mixture temperature Tmixsteady corresponding to the post injection time t is lower than the above-described soot reaction limit temperature TminSoot.

When the CPU 61 makes a "Yes" determination in step 4028, as in the determination of step 860 of FIG. 8, the CPU 61 executes the processing of step 865, and then proceeds to step 870. When the CPU 61 makes a "No" determination in step 4028, it proceeds directly to step 870.

When the CPU 61 proceeds to step 870, it performs the determination of step 870. Here, it is assumed that the CPU 61 makes a "Yes" determination. In this case, the CPU 61 proceeds to step 4034, and obtains the NO generation speed d[NO]mix/dt corresponding to the present post injection time t, on the basis of the stead-state gas mixture temperature Tmixsteady corresponding to the present post injection time t obtained in step 4006, the stead-state oxygen concentration [O2]mixsteady corresponding to the present post injection time t obtained in step 4010, the stead-state nitrogen concentration [N2]mixsteady corresponding to the present post injection time t obtained in step 4012, and the above-described Equation (27).

Subsequently, the CPU 61 executes the processing of step 880, and then proceeds step 4038 so as to determine whither or not the excess air ratio λ corresponding to the present post injection time t is greater than "1" and the stead-state gas mixture temperature Tmixsteady corresponding to the post injection time t is lower than the above-described NO reaction limit temperature TminNO.

Figure 41:
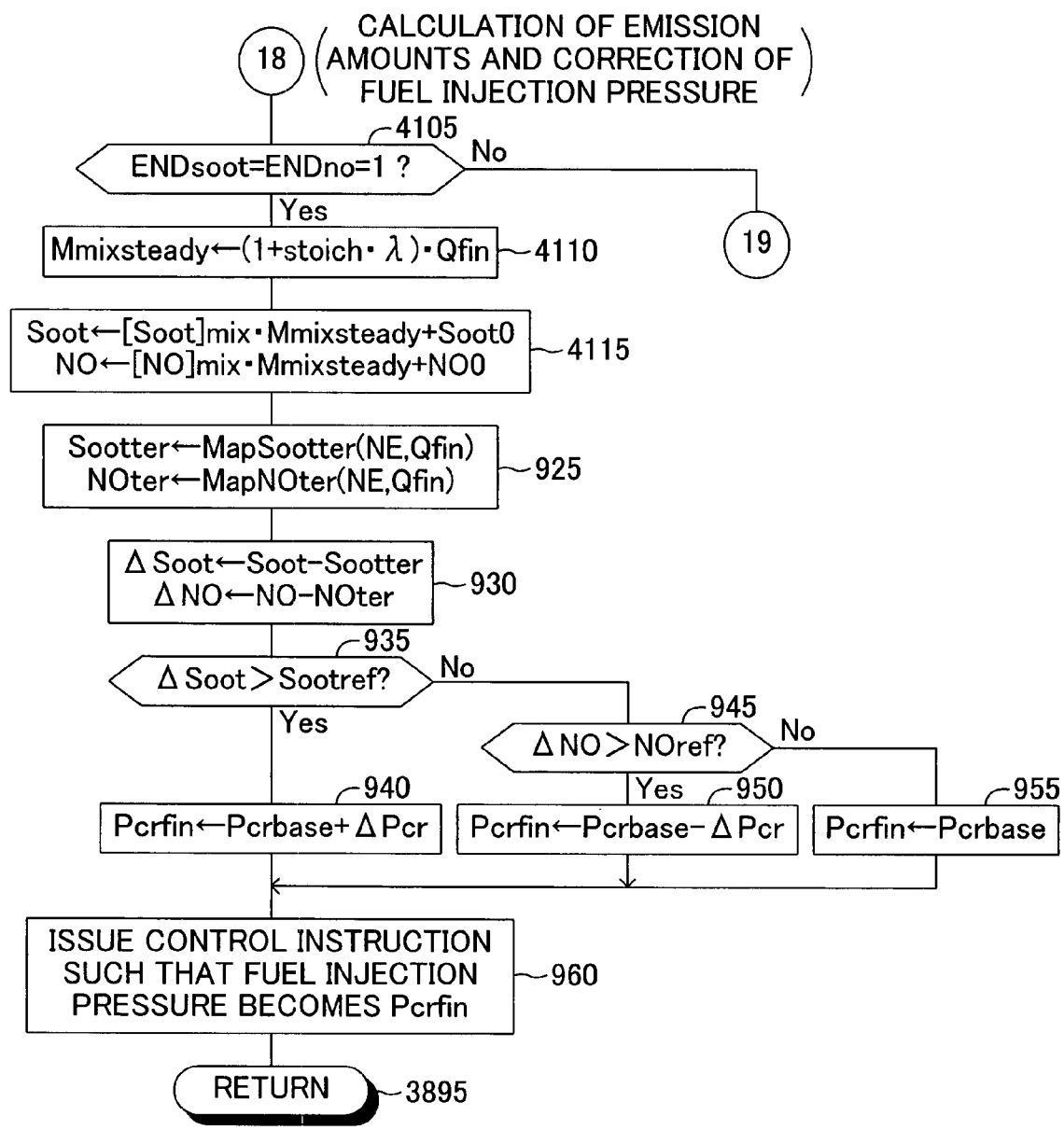
FIG. 41 is a flowchart showing a fourth portion of the routine which the CPU of the fourth embodiment executes so as to calculate gas mixture temperature, etc., and emission amounts.

When the CPU 61 makes a "Yes" determination in step 4038, as in the determination of step 885 of FIG. 8, the CPU 61 executes the processing of step 890, and then proceeds to the routine of FIG. 41. When the CPU 61 makes a "No" determination in step 4038, it proceeds directly to the routine of FIG. 41.

When the CPU 61 proceeds to the routine of FIG. 41, it performs the determination of step 4015 corresponding to step 905 of FIG. 9. The CPU 61 repeatedly executes the processings of step 4002 of FIG. 40 to step 4105 of FIG. 41 every time the CPU 61 makes a "No" determination in step 4105. As a result, every time a "No" determination is made in step 4105, the post injection time t is advanced by Δt in step 4002 of FIG. 40.

That is, so long as a "No" determination is made in step 4105, the excess air ratio λ, and (so long as the values of the flags ENDsoot and ENDno are zero) the emission concentrations ([Soot]mix and [NO]mix) are obtained for each minute time Δt of the post injection time t.

When the conditions of step 4105 are satisfied, the CPU 61 makes a "Yes" determination in step 4105 of FIG. 41, and proceeds to step 4110 and subsequent steps so as to perform processing for ending the calculation associated with the emission generation amounts.

That is, in step 4110, the CPU 61 obtains the mass (steady-state gas mixture mass Mmixsteady) of a gas mixture which contains fuel of the instruction fuel injection amount Qfin and relates to the steady flame and whose excess air ratio assumes the value λ, on the basis of the excess air ratio λ at the present time point (i.e., at the time point at which the conditions of step 4105 are satisfied), the instruction fuel injection amount Qfin obtained in step 520 of FIG. 38, and the equation described in the box of step 4110.

Next, the CPU 61 proceeds to step 4115 so as to obtain the soot generation amount in the region occupied by the steady flame, by multiplying the present value of the gas mixture soot concentration [Soot]mix updated in step 855 of FIG. 40 by the above-described steady-state gas mixture mass Mmixsteady, and then obtain the total soot generation amount Soot by adding the initial value Soot0 to the obtained soot generation amount.

Similarly, in step 4115, the CPU 61 obtains the NO generation amount in the region occupied by the steady flame, by multiplying the present value of the gas mixture NO concentration [NO]mix updated in step 880 of FIG. 40 by the above-described steady-state gas mixture mass Mmixsteady, and then obtains the total NO generation amount NO by adding the initial value NO0 to the obtained NO generation amount.

Then, the CPU 61 successively executes steps 925 to 960 so as to correct the injection pressure on the basis of the total soot generation amount Soot and the total NO generation amount NO (accordingly, the results of estimation of the total emission generation amounts) obtained in step 4115 of FIG. 41. The CPU 61 then proceeds to step 3895 so as to end the present execution of the series of routines of FIGS. 38 to 41. After this point in time, the CPU 61 makes a "No" determination every time it proceeds to step 505 of FIG. 38 until the next IVC comes.

As described above, the fourth embodiment of the emission-generation-amount estimation apparatus of the present invention assumes the case in which a so-called steady flame is generated in each combustion chamber after ignition of gas mixture. Thus, while taking advantage of the fact that the oxygen concentration in the steady state (steady-state oxygen concentration [O2]mixsteady) becomes zero in the rich region (λ<1) of the steady flame, the fourth embodiment obtains the soot generation speed d[Soot]mix/dt in accordance with the equation "d[Soot]mix/dt=dmsf/dt," which can be obtained from the above-described Equation (23) by omitting the term of dmso/dt therefrom.

Similarly, while taking advantage of the fact that the fuel concentration in the steady state (steady-state fuel concentration [Fuel]mixsteady) becomes zero in the lean region (λ≧1) of the steady flame, the fourth embodiment obtains the soot generation speed d[Soot]mix/dt in accordance with the equation "d[Soot]mix/dt=−dmso/dt," which can be obtained from the above-described Equation (23) by omitting the term of dmsf/dt therefrom. These calculations can reduce the number of times of calculation of Equations (24) and (25), whereby the calculation load of the CPU 61 can be reduced.

The invention claimed is:

1. A gas-mixture-state estimation apparatus for an internal combustion engine in which fuel is continuously injected into a combustion chamber of the internal combustion engine over a predetermined injection period from a predetermined injection start time, the gas-mixture-state estimation apparatus comprising:
   injection fuel dividing means for dividing the predetermined injection period into a plurality of periods and dividing the injection fuel into portions which are injected in the corresponding periods; and
   gas-mixture-state estimation means for individually estimating the state of each of gas mixtures formed through mixing of the plurality of portions of the injection fuel with a cylinder interior gas, which is a gas taken into the combustion chamber,
   wherein the estimating occurs by simulating a single injection over the predetermined injection period by simulating individual and successive injection of the plurality of portions of the divided injection fuel such that each portion is injected at the beginning of the corresponding period.

2. A gas-mixture-state estimation apparatus for an internal combustion engine according to claim 1, wherein the gas-mixture-state estimation means is configured to individually obtain a value representing a degree of mixing of the cylinder interior gas with each portion of the divided injection fuel, and individually estimate the state of a gas mixture formed based on each portion of the injection fuel by using the obtained value representing the degree of mixing of the cylinder interior gas with said each portion of the injection fuel.

3. A gas-mixture-state estimation apparatus for an internal combustion engine according to claim 1, further comprising ignition timing obtaining means for obtaining a value representing an ignition timing of the gas mixture,
   wherein the injection fuel dividing means divides the injection fuel into a portion injected before ignition of the gas mixture and a portion injected after the ignition of the gas mixture on the basis of the obtained value representing the ignition timing.

4. A gas-mixture-state estimation apparatus for an internal combustion engine according to claim 1, further comprising mixing index value obtaining means for obtaining a first-portion mixing index value, which is a value representing a degree of mixing of the cylinder interior gas with a first injected portion of the divided injection fuel, so that the value corresponds to advancement of the first injected portion within the combustion chamber,
   wherein the gas-mixture-state estimation means estimates the state of a gas mixture formed based on the first injected portion by making use of the obtained first-portion mixing index value, and
   wherein a value representing a degree of mixing of the cylinder interior gas with a second or later injected portion of the divided injection fuel and corresponding to advancement of the second or later injected portion within the combustion chamber is determined on the basis of the obtained first-portion mixing index value corresponding to the advancement, the gas-mixture-state estimation means estimates the state of the gas mixture formed based on the second or later injected portion by making use of the determined value representing the degree of mixing of the cylinder interior gas with the second or later injected portion.

5. A gas-mixture-state estimation apparatus for an internal combustion engine according to claim 1, wherein the state of the gas mixture estimated by the gas-mixture-state estimation means includes at least one of temperature of the gas mixture, fuel concentration within the gas mixture, oxygen concentration within the gas mixture, and nitrogen concentration within the gas mixture.

6. An emission-generation-amount estimation apparatus comprising emission-generation-amount estimation means for individually estimating generation amounts of emissions, which are harmful substances, generated as a result of combustion of each gas mixture, on the basis of the state of the corresponding gas mixture estimated by a gas-mixture-state estimation apparatus for an internal combustion engine in which fuel is continuously injected into a combustion chamber of the internal combustion engine over a predetermined injection period from a predetermined injection start time, the gas-mixture-state estimation apparatus comprising:
   injection fuel dividing means for dividing the predetermined injection period into a plurality of periods and dividing the injection fuel into portions which are injected in the corresponding periods; and
   gas-mixture-state estimation means for individually estimating the state of each of gas mixtures formed through mixing of the plurality of portions of the injection fuel with a cylinder interior gas, which is a gas taken into the combustion chamber, wherein the estimating occurs by simulating a single injection over the predetermined injection period by simulating individual and successive injection of the plurality of portions of the divided injection fuel such that each portion is injected at the beginning of the corresponding period.

7. An emission-generation-amount estimation apparatus for an internal combustion engine according to claim 6, wherein the emission-generation-amount estimation means estimates at least generation amounts of soot and NOx as the generation amounts of emissions.

8. An emission-generation-amount estimation apparatus for an internal combustion engine according to claim 6, wherein the emission-generation-amount estimation means is configured to individually calculate generation speeds of the emissions for each gas mixture or each region of the steady flame, and integrate the calculated emission generation speeds with respect to time to thereby individually estimate the generation amounts of the emissions.

9. An emission-generation-amount estimation apparatus for an internal combustion engine according to claim 8, wherein the emission-generation-amount estimation means is configured such that when the temperature of the gas mixture or the temperature within the regions of the steady flame becomes less than a predetermined temperature, the corresponding integration of the emission generation speeds with respect to time is ended.

10. An emission-generation-amount estimation apparatus for an internal combustion engine comprising emission-generation-amount estimation means for estimating generation amounts of emissions based on an assumption that a steady flame is generated in a combustion chamber of the internal combustion engine after ignition of a gas mixture formed through mixing of fuel injected into the combustion chamber with a cylinder interior gas, which is a gas taken into the combustion chamber, wherein the emission-generation-amount estimation means individually estimates amounts of emissions, which are harmful substances, generated as a result of combustion in a region of the steady flame in which the fuel is excessive, and amounts of emissions generated as a result of combustion in a region of the steady flame in which oxygen is excessive.

11. An emission-generation-amount estimation apparatus for an internal combustion engine according to claim 10, wherein the emission-generation-amount estimation means estimates at least generation amounts of soot and NOx as the generation amounts of emissions.

12. An emission-generation-amount estimation apparatus for an internal combustion engine according to claim 10, wherein the emission-generation-amount estimation means is configured to individually calculate generation speeds of the emissions for each gas mixture or each region of the steady flame, and integrate the calculated emission generation speeds with respect to time to thereby individually estimate the generation amounts of the emissions.

13. An emission-generation-amount estimation apparatus for an internal combustion engine according to claim 12, wherein the emission-generation-amount estimation means is configured such that when the temperature of the gas mixture or the temperature within the regions of the steady flame becomes less than a predetermined temperature, the corresponding integration of the emission generation speeds with respect to time is ended.

* * * * *

UNITED STATES PATENT AND TRADEMARK OFFICE
CERTIFICATE OF CORRECTION

PATENT NO. : 7,848,871 B2  
APPLICATION NO. : 11/886595  
DATED : December 7, 2010  
INVENTOR(S) : Tomomi Onishi et al.

It is certified that error appears in the above-identified patent and that said Letters Patent is hereby corrected as shown below:

| Column | Line | |
|---|---|---|
| 45 | 61-65 | Change Equation (30) |

From: " $sumg(k) = \sum_{j=1}^{k} g(l, j)$ (30) "

To: -- $sumg(k) = \sum_{j=1}^{k} g(1, j)$ (30) --.

| | | |
|---|---|---|
| 57 | 37-38 | Change Equation (38) |

From: " $\Delta Tmixsteady = \dfrac{Hf \cdot Qreac}{G \cdot Cg + Q + Cf}$ (38) "

To: -- $\Delta Tmixsteady = \dfrac{Hf \cdot Qreac}{G \cdot Cg + Q \bullet Cf}$ (38) --.

| Column | Line | |
|---|---|---|
| 65 | 44,53,62,19 | Change "A gas-mixture-state" to --The gas-mixture-state--. |
| 66 | 51,56,64 | Change "An emission-generation-amount" to --The emission-generation-amount--. |
| 67 | 5,20 | Change "An emission-generation-amount" to --The emission-generation-amount--. |
| 68 | 4,12 | Change "An emission-generation-amount" to --The emission-generation-amount--. |

Signed and Sealed this  
Twenty-sixth Day of March, 2013

Teresa Stanek Rea  
*Acting Director of the United States Patent and Trademark Office*